(12) United States Patent
Yoo et al.

(10) Patent No.: US 8,483,770 B2
(45) Date of Patent: Jul. 9, 2013

(54) MOBILE TERMINAL AND METHOD FOR PROVIDING USER INTERFACE THEREOF

(75) Inventors: Jae-Suk Yoo, Seoul (KR); Hung-Chol Chin, Seoul (KR); Man-Soo Sin, Seoul (KR)

(73) Assignee: LG Electronics Inc., Seoul (KR)

( * ) Notice: Subject to any disclaimer, the term of this patent is extended or adjusted under 35 U.S.C. 154(b) by 549 days.

(21) Appl. No.: 12/720,629

(22) Filed: Mar. 9, 2010

(65) Prior Publication Data
US 2010/0234077 A1 Sep. 16, 2010

(30) Foreign Application Priority Data

Mar. 12, 2009 (KR) .................. 10-2009-0021341
Mar. 12, 2009 (KR) .................. 10-2009-0021343

(51) Int. Cl.
*H04B 1/38* (2006.01)
*G06F 3/033* (2006.01)

(52) U.S. Cl.
USPC .................... 455/566; 455/418; 345/179

(58) Field of Classification Search
None
See application file for complete search history.

(56) References Cited

U.S. PATENT DOCUMENTS

| 6,885,878 | B1 * | 4/2005 | Borgstrom et al. | 455/556.1 |
| 2004/0070573 | A1 * | 4/2004 | Graham | 345/179 |
| 2005/0166158 | A1 * | 7/2005 | Blanchard et al. | 715/768 |
| 2006/0077188 | A1 * | 4/2006 | Byun | 345/179 |
| 2006/0250380 | A1 * | 11/2006 | Oliver | 345/179 |
| 2008/0018591 | A1 * | 1/2008 | Pittel et al. | 345/156 |
| 2008/0055279 | A1 * | 3/2008 | Osada et al. | 345/179 |
| 2010/0231558 | A1 * | 9/2010 | Kwak | 345/179 |

FOREIGN PATENT DOCUMENTS

| CN | 1339691 A | 3/2002 |
| CN | 101198124 A | 6/2008 |
| CN | 101335783 A | 12/2008 |
| CN | 201205817 A | 3/2009 |
| WO | WO 2008/133410 A1 | 6/2008 |

* cited by examiner

*Primary Examiner* — Erika A Washington
(74) *Attorney, Agent, or Firm* — Birch, Stewart, Kolasch & Birch, LLP

(57) ABSTRACT

A mobile terminal including a controller configured to execute an operation mode relating to one or more functions of the mobile terminal; a sensor configured to detect a motion of a pen unit by sensing ultrasonic waves generated by the pen unit; a display configured to display information; and a wireless communication unit configured to wireless communicate with at least one other mobile terminal. Further, the controller is further configured to compare the motion of the pen unit with a preset specific pattern, and to execute an operation corresponding to the specific pattern based on a result of the comparison.

6 Claims, 58 Drawing Sheets

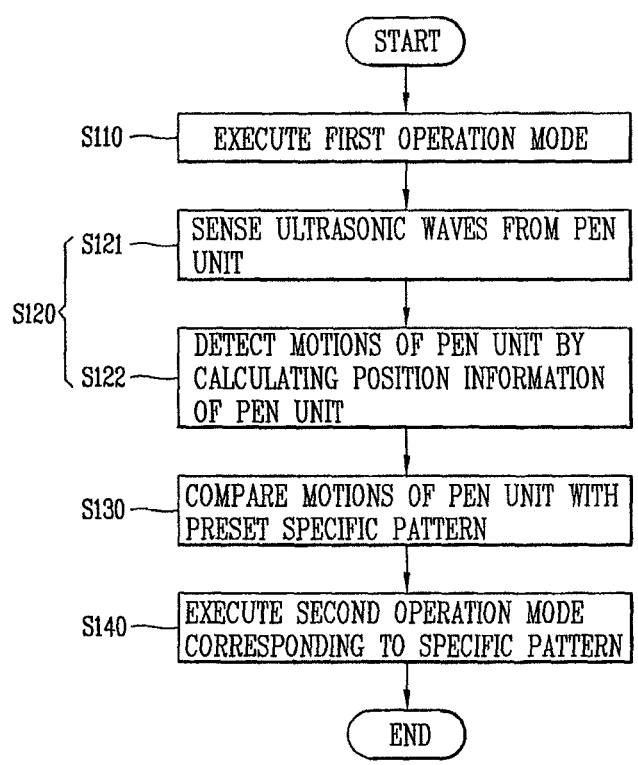

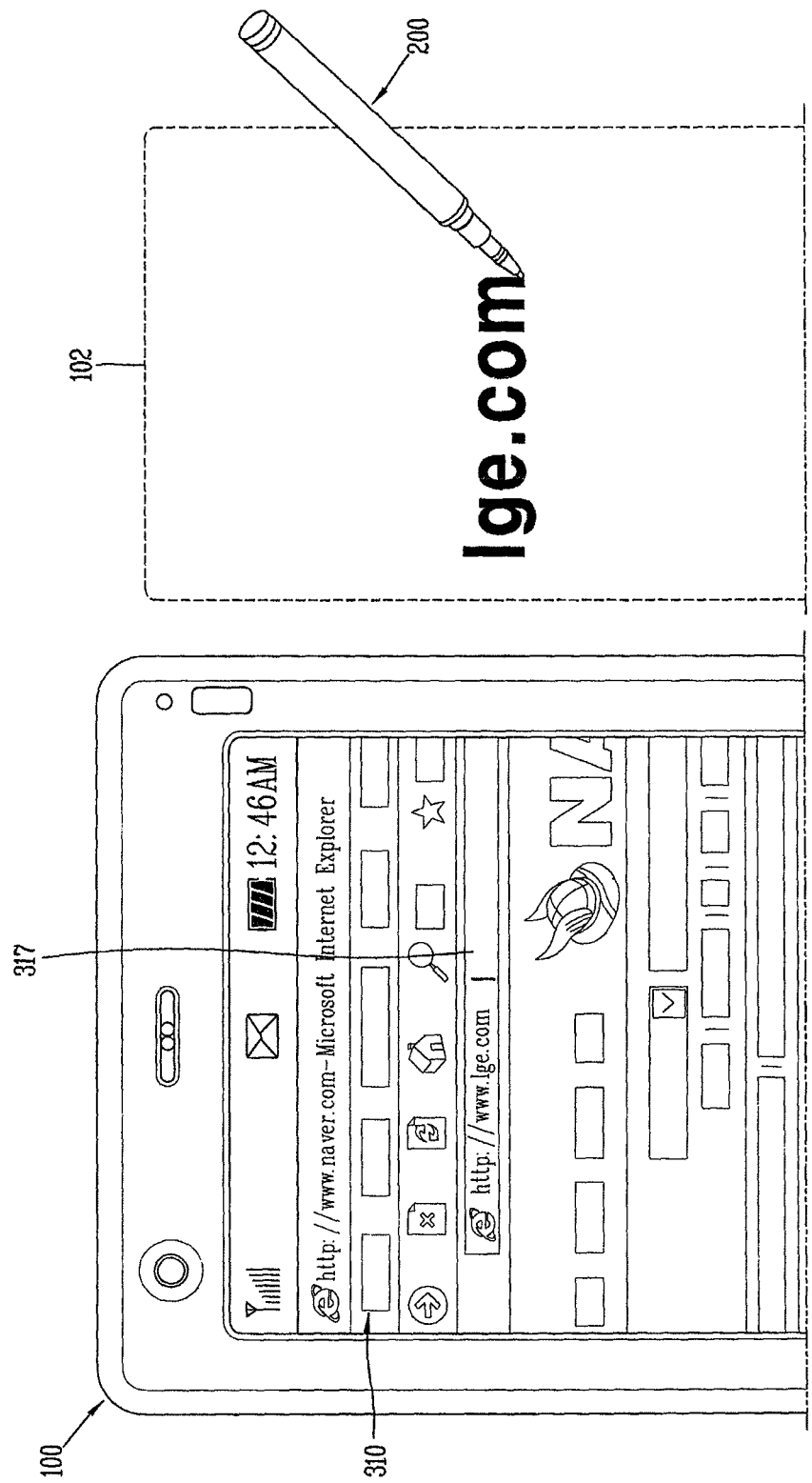

MOBILE TERMINAL AND METHOD FOR PROVIDING USER INTERFACE THEREOF

CROSS-REFERENCE TO RELATED APPLICATIONS

This application claims the benefit of priority of Korean Patent Application No. 10-2009-0021341 and Korean Patent Application No. 10-2009-0021343, both filed on Mar. 12, 2009, and both of which are herein expressly incorporated by reference in their entireties.

BACKGROUND OF THE INVENTION

1. Field of the Invention

The present invention relates to a mobile terminal, and corresponding method for controlling the operation of a mobile terminal through motions of a pen unit, and a method for providing a user interface thereof.

2. Background of the Invention

A terminal may be classified into a mobile (portable) terminal and a stationary terminal. The mobile terminal may be also classified into a handheld terminal and a vehicle mount terminal.

The terminal can also support functions such as capturing images or video, reproducing music or video files, playing games, receiving broadcast signals, and the like. The mobile terminal thus function as a multimedia player. However, because the mobile terminal is small in size, it is difficult and cumbersome to operate the many different functions.

Accordingly, a mobile terminal having a new user interface may be considered.

SUMMARY OF THE INVENTION

Therefore, an object of the present invention is to provide a mobile terminal capable of providing a user interface more convenient than the related art user interface, by using a pen unit having an ultrasonic wave technique applied thereto, and a method for providing a user interface thereof.

To achieve these and other advantages and in accordance with the purpose of the present invention, as embodied and broadly described herein, there is provided a method for providing a user interface of a mobile terminal, the method including: executing a first operation mode; detecting motions of a pen unit by sensing ultrasonic waves generated from the pen unit; comparing the motions of the pen unit with a preset specific pattern; and executing a second operation mode corresponding to the specific pattern based on a result of the comparison.

The step of detecting may include sensing the ultrasonic waves generated from the pen unit; and calculating position information of the pen unit so as to detect motions of the pen unit based on information relating to the ultrasonic waves.

The method may further include setting an input region by comparing the motions of the pen unit with a preset pattern. At least one of a position and a size of the input region may be formed by using motions of the pen unit, the motions implemented at a region rather than the display of the terminal body.

According to another aspect of the present invention, there is provided a method for providing a user interface of a mobile terminal, the method including: executing an operation mode relating to one or more functions of a mobile terminal; detecting motions of a pen unit by sensing ultrasonic waves generated from the pen unit; comparing the motions of the pen unit with a preset specific pattern; and executing an operation corresponding to the specific pattern based on a result of the comparison according to a current operation mode.

The step of detecting may include sensing the ultrasonic waves generated from the pen unit; and calculating position information of the pen unit so as to detect motions of the pen unit based on information relating to the ultrasonic waves.

The motions of the pen unit may be implemented as a touching operation on the terminal body, or on a region rather than the terminal body.

The step of executing may be implemented so as to perform different operations according to whether the pen unit makes a first motion or a second motion.

The first motion may indicate a contact motion that the pen unit contacts an object or moves in a contacted state, and the second motion may indicate a proximity motion that the pen unit moves in a state spacing from an object by a predetermined distance.

To achieve these and other advantages and in accordance with the purpose of the present invention, as embodied and broadly described herein, there is also provided a mobile terminal, including: a terminal body; a pen unit relatively movable with respect to the terminal body; a sensing unit mounted to the terminal body, and configured to detect motions of the pen unit by sensing ultrasonic waves generated from the pen unit; and a controller configured to compare the motions of the pen unit with a preset specific pattern, and executing an operation corresponding to the specific pattern according to a current operation mode.

The pen unit may include an optical generator configured to generate light; and an ultrasonic wave generator configured to generate ultrasonic waves. The sensing unit may include an optical sensor configured to sense light generated from the optical generator; and first and second ultrasonic sensors configured to sense ultrasonic waves generated from the ultrasonic wave generator, and arranged to be spacing from each other so as to generate a difference between times when detecting the ultrasonic waves.

The controller may be configured to calculate position information of the pen unit based on the time difference, and configured to execute an operation corresponding to the specific pattern based on the position information.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 is a flowchart showing a method for providing a user interface relating to conversion of a mobile terminal from a first operation mode to a second operation mode according to the present invention;

FIGS. 32A to 32C are views respectively showing a method for providing a user interface of a mobile terminal according to another embodiment of the present invention;

DETAILED DESCRIPTION OF THE INVENTION

Description will now be given in detail of the present invention, with reference to the accompanying drawings.

Hereinafter, a mobile terminal according to embodiments of the present invention will be explained in more detail with reference to the attached drawings.

The mobile terminal may be implemented in various types. For instance, the mobile terminal in the present description may include a portable phone, a smart phone, a notebook computer, a digital broadcasting terminal, Personal Digital Assistants (PDA), Portable Multimedia Player (PMP), a navigation system, etc.

Figure 1A:
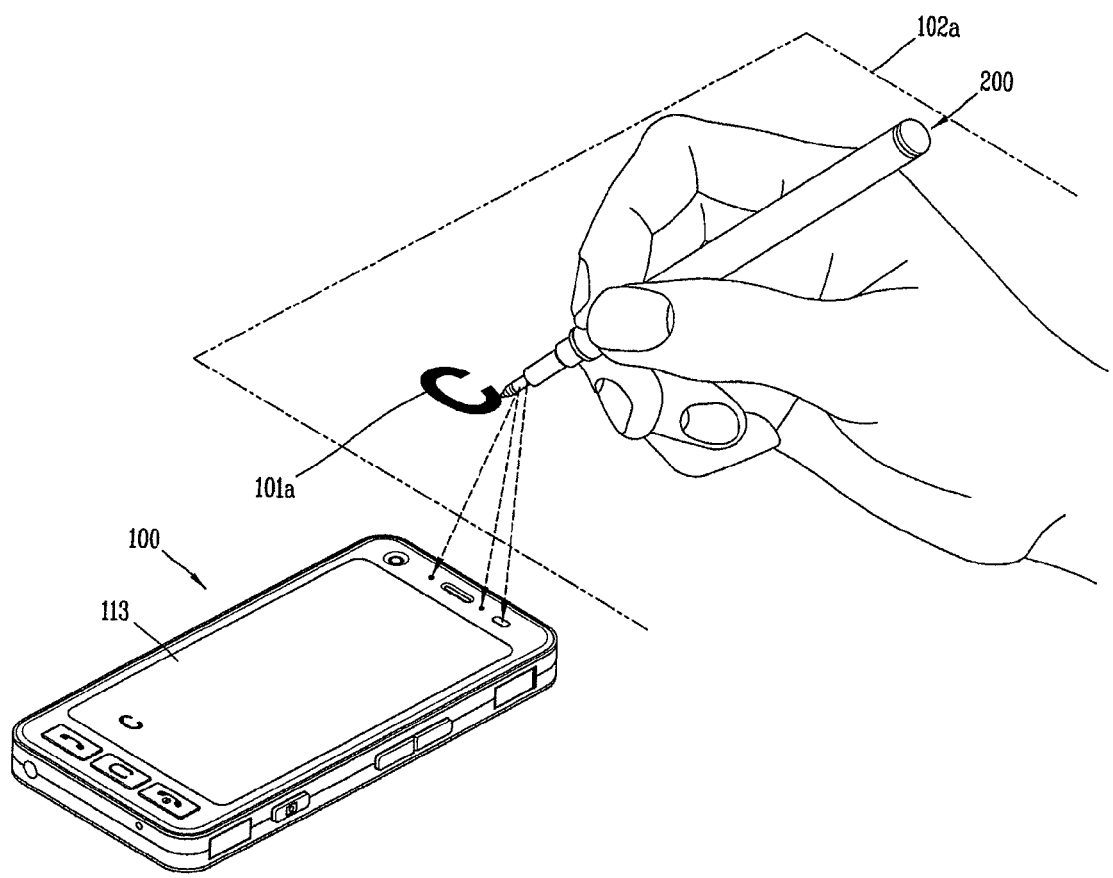
FIGS. 1A to 1C are conceptual views showing an operation of a mobile terminal 100 according to the present invention.
Figure 1B:
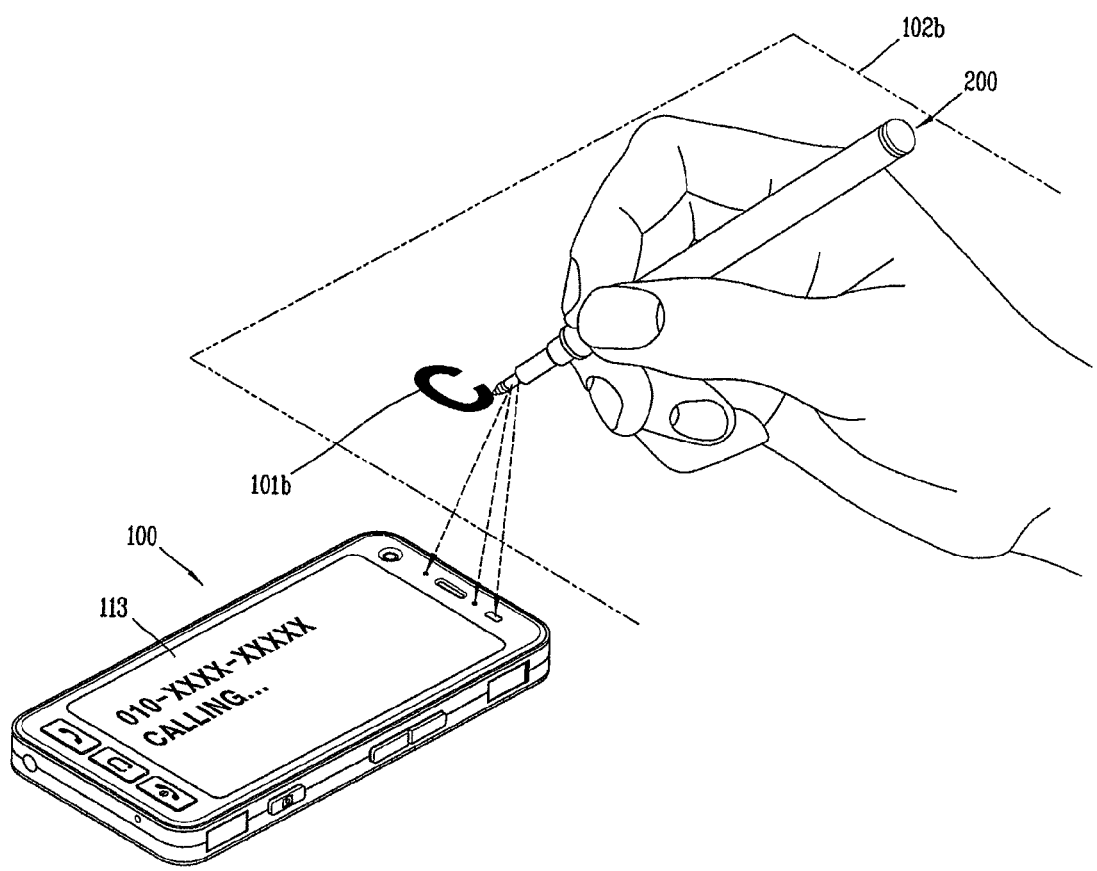
Figure 1C:
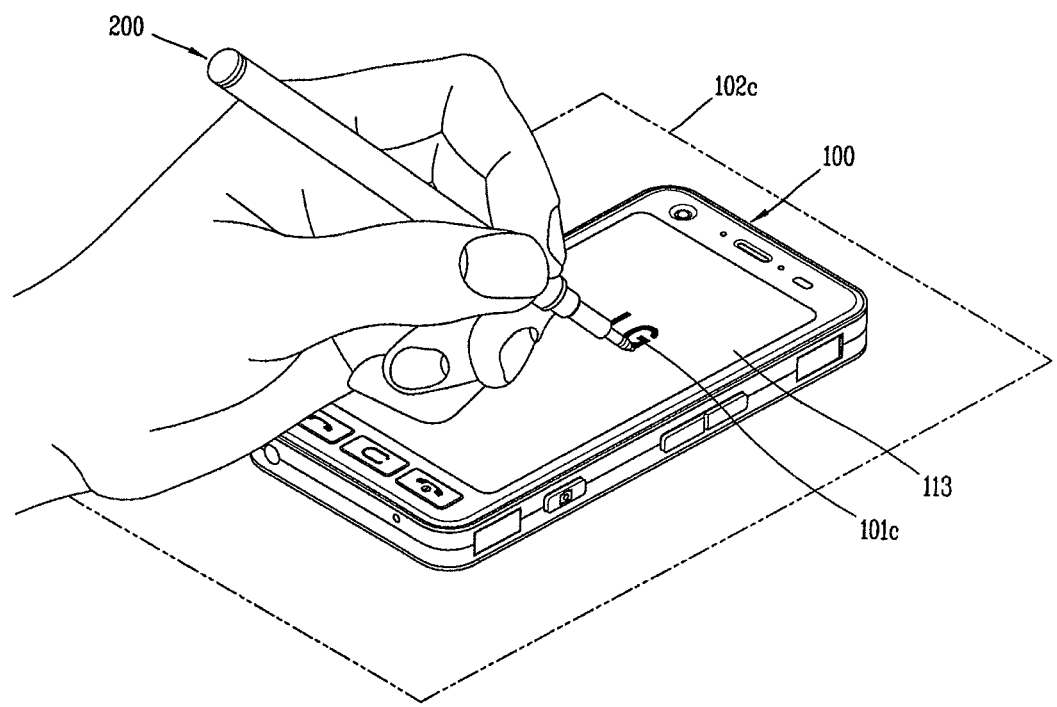

Turning first to FIGS. 1A to 1C, which are conceptual views showing an operation of a mobile terminal 100 according to an embodiment of the present invention. As shown the mobile terminal 100 is configured so that a user can input information 101a and 101b on regions other than the mobile terminal 100 by using a pen unit 200. The mobile terminal 100 is configured so as to detect motions of the pen unit 200 on regions including the region other than the mobile terminal 100. Sensing motions of the pen unit 200 are performed through transmission and reception of a wireless signal between the mobile terminal 100 and the pen unit 200. The mobile terminal 100 then recognizes a region other than the mobile terminal 100 as a touch screen.

Thus, an area where the motions of the pen unit 200 are sensed may form an input region 102a that may be a preset region so that the motions of the pen unit 200 can match an input of a control command of the mobile terminal 100. Setting of the preset region may also be changed by the user.

Further, the motions of the pen unit 200 may implement control commands according to a current operation mode. Referring to FIG. 1A, when the current operation mode is related to text input, a text "C" written on the input region 102a by the pen unit 200 is displayed on a display 113. Referring to FIG. 1B, when that the current operation mode is related to a call connection with another mobile terminal, the mobile terminal 100 performs the call connection by recognizing the text "C" written on the input region 102a by the pen unit 200 as a command relating to a call connection.

Referring to FIG. 1C, an input region 102c may be formed on the mobile terminal, more concretely, on the display 113. In this instance, a touch screen function of the mobile terminal 100 may be implemented by forming the input region. For instance, information 101c, i.e., a text "LG" written on the input region 102c by the pen unit 200 is displayed on the display 113.

Figure 2:
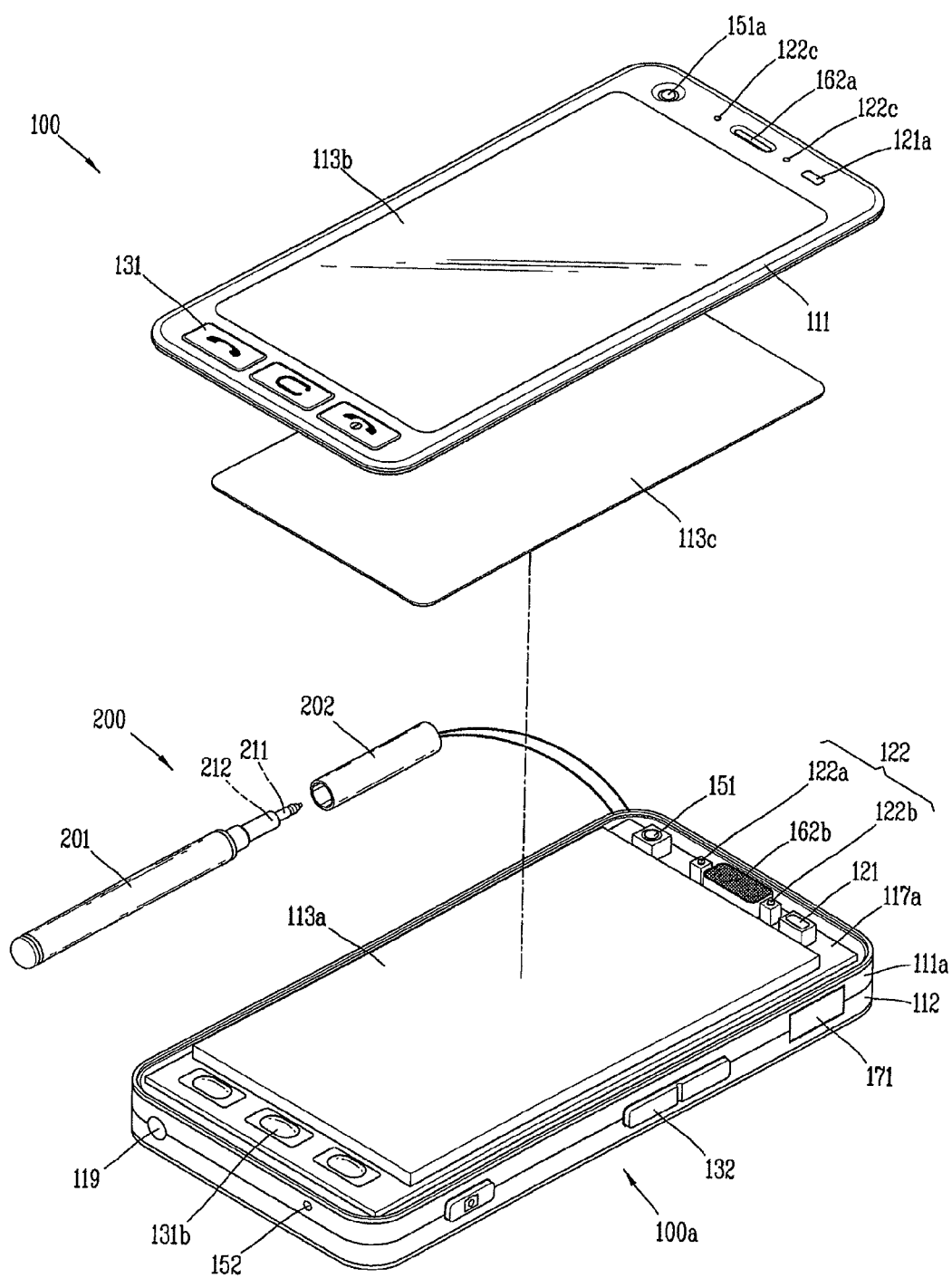
FIG. 2 is an exploded perspective view of the mobile terminal shown in FIGS. 1A to 1C.

Next, FIG. 2 is an exploded perspective view of the mobile terminal shown in FIGS. 1A to 1C. The mobile terminal 100 described is a bar type mobile terminal. However, the present invention is not limited to this, but may be applied to a slide type mobile terminal having two bodies coupled to each other to be relatively movable, or a folder type, a swing type, a swivel type and the like.

In FIG. 2, a case (casing, housing, cover, etc.) forming an outer appearance of the mobile terminal 100 includes a front case 111 and a rear case 112. A space formed by the front case 111 and the rear case 112 may accommodate various components therein. At least one intermediate case 111a may further be disposed between the front case 111 and the rear case 112. Such cases may be formed by injection-molded synthetic resin, or may be formed using a metallic material such as stainless steel (STS) or titanium (Ti).

Figure 37:
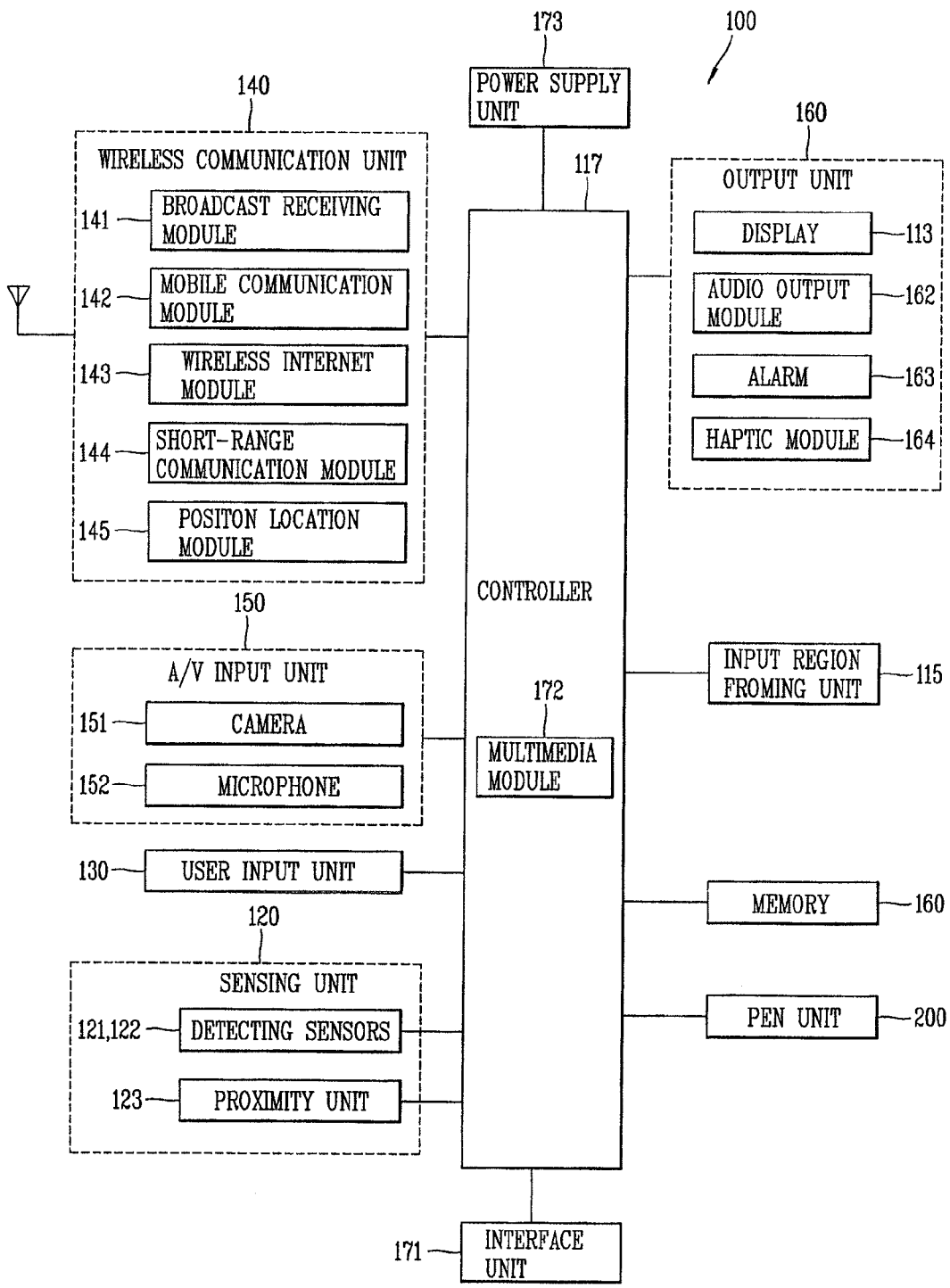
FIG. 37 is a block diagram of a mobile terminal according to an embodiment of the present invention.

Referring further to FIGS. 2 and 37, the front case 112 includes a display 113, an audio output module 162, a user input unit 130, a microphone 152, an interface unit 171, etc.

The display 113 may occupy all or parts of an outer circumference of the front case 111. In this embodiment, the audio output module 162 and the camera 151 are arranged at a region adjacent to one end of two ends of the display 113. In addition, the first user unit 131 and corresponding sensor 131b and the microphone 152 are arranged at a region adjacent to the other of the display 113. The second user input unit 132 and the interface unit 171 may also be arranged on side surfaces of the intermediate case 111a and the rear case 112. The display 113 is configured to output image information. Various types of visual information may be displayed on the display 113.

Further, the user input unit 130 may be manipulated to allow inputting of commands for controlling operations of the mobile terminal 100, and include a plurality of manipulation units 131 and 132. The manipulation units 131 and 132 may be referred to as a manipulating portion. Such manipulating portion can employ any tactile manner that a user can touch or tap for manipulation.

From the functional perspective of the first or second manipulation units 131 or 132, the first manipulation unit 131 is configured to input commands such as START, END, SCROLL or the like. Also, the second manipulation unit 132 is configured to input commands for controlling a level of sound output from the audio output unit 162, or commands for converting the current mode of the display 113 to a touch recognition mode.

A rear surface of the terminal body, i.e., the rear case 112 may further be provided with a camera 151. A flash and a mirror may additionally be disposed adjacent to the camera 151. The flash operates in conjunction with the camera 151 when taking a picture using the camera 151, and the mirror can cooperate with the camera 151 to allow a user to photograph himself in a self-portrait mode.

An audio output module may further be disposed on the rear case 112. This audio output module can cooperate with the audio output module 162 provided on the front surface of the terminal body, thereby providing stereo output. Also, this audio output module may be configured to operate as a speakerphone.

A broadcast signal receiving antenna 119 may further be disposed on a side surface of the terminal body in addition to an antenna for communications, for example. The antenna 119 may be retractable into the terminal body. In addition, a power supply for supplying power to the mobile terminal 100 may be mounted to the terminal body. The power supply may be mounted in the terminal body, or may be detachably mounted to an outer surface of the terminal body.

Referring to FIG. 2, a window 113b is coupled to one surface of the front case 111 so as to cover a display module 113a. The window 113b is formed of a transmissive material, such as transmissive synthetic resin and reinforcing glass. The window 113b may include an opaque region for covering inner components.

Further, a sound hole 162a and a camera window 151a may be formed at a side of the front case 111. The camera window 151a may be formed of a transmissive material. A printed circuit board (PCB) 117a is mounted between the front case 111 and the rear case 112 and the display module 113a, a speaker 162b, the camera 151, etc. may be mounted to the PCB 117a. Also, as shown in FIG. 2, the speaker 162b is arranged in correspondence to the sound hole 152a, and the camera 151 is arranged in correspondence to the camera window 151a.

An optical sensor 121 and an ultrasonic sensor 122 are mounted to the PCB 117a. The optical sensor 121 and the ultrasonic sensor 122 are implemented as one example of a sensing unit for detecting motions of the pen unit 200. The pen unit 200 is configured to generate ultrasonic waves, and the sensing unit is configured to detect motions of the pen unit 200 by sensing the ultrasonic waves generated from the pen unit 200.

In addition, the optical sensor 121 serves to sense light generated from the pen unit 200. As the optical sensor 121, an Infrared data association (IRDA) for sensing infrared rays may be used. The ultrasonic sensor 122 may include first and second ultrasonic sensors 122a and 122b configured to sense ultrasonic waves generated from the pen unit 200, and are arranged so as to be separated from each other. Accordingly, the first and second ultrasonic sensors 122a and 122b have a difference between times when sensing ultrasonic waves generated from the same point or points adjacent thereto.

Referring to FIG. 2, the pen unit 200 includes an optical generator 211 configured to generate light, and an ultrasonic generator 212 configured to generate ultrasonic waves. Further, the pen unit 200 may be connected to a terminal body 100a and include a cap 202 to which a body 201 is detachably mounted, and the cap 202 may be connected to the terminal body 100a by a connection line.

Openings 122c are also formed on the from case 111 through which the first and second ultrasonic sensors 122a and 122b receive ultrasonic waves. Ultrasonic waves reach the first and second ultrasonic sensors 122a and 122b through the openings 122c. Also, the openings 122c are formed at a region on the front case 111 in parallel to the window 113b. This allows motions of the pen unit 200 moving on the window 113b to be more smoothly detected.

An optical sensor window 121a is formed on the front case 111 so that the optical sensor 121 can receive light through the optical sensor window 121a. The optical sensor window 121a may be formed of a transmissive material. In addition, the optical sensor 121 and the first and second ultrasonic sensors 122a and 122b are arranged so as to be adjacent to one edge of the terminal body 100a. Accordingly, position information of the pen unit 200 on all the parts of the display 113 can be calculated.

A touch sensor 113c may also be mounted to the window 113b. The touch sensor 113c is configured to receive touch input, and is formed of a transmissive material. The display 113 having the touch sensor 113c mounted thereto forms a touch screen. Under these configurations, an input method using the touch sensor 113c, and an input method using detection of wave motions may be combined with each other. For instance, the mobile terminal 100 may be configured to detect touch input on the display 113 through the touch sensor 113c, and to detect touch input on a region rather than the display 113 through detection of wave motions.

Figure 3:
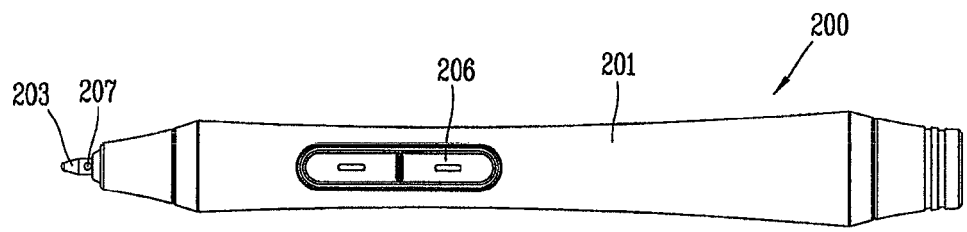
FIG. 3 is a planar view of a pen unit according to the present invention.
Figure 4:
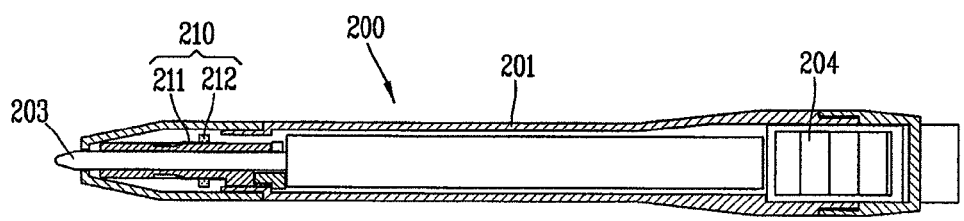
FIG. 4 is a sectional view of the pen unit of FIG. 3.

Next, FIG. 3 is a planar view of the pen unit 200 according to an embodiment of the present invention, and FIG. 4 is a sectional view of the pen unit of FIG. 3. Referring to FIGS. 3 and 4, the pen unit 200 includes the body 201, a wave motion generator 210, and a tip 203.

The body 201 is extending to one direction, and is implemented in the form of a cavity. A battery 204 and an input key 206 may be mounted to the body 201. The input key 206 is formed to receive a command for generating wave motions from the wave motion generator 210. Under these configurations, visual information 101a~101c written on the input regions 102a~102c in a state that the pen unit 200 does not come in physical contact with an object can be displayed the display 113.

Further, the wave motion generator 210 is mounted in the body 201, and is configured to generate wave motions. The wave motion generator 210 includes an optical generator 211 configured to generate light, and an ultrasonic generator 212 configured to generate ultrasonic waves. As the ultrasonic generator 212, a piezoelectric element may be used, and an infrared ray generator may be used as the optical generator 211, The tip 203 is disposed at one end of the body 201. If the tip 203 comes in contact with an object (e.g., paper surface, supporting surface, etc.), the piezoelectric element is pressurized to generate ultrasonic waves. Here, the optical generator 211 is driven together with the ultrasonic generator, thereby generating light.

Furthermore, the ultrasonic generator 212 may be configured to generate ultrasonic waves when a specific mode (e.g., web browsing mode) of the mobile terminal is executed. In this instance, the mobile terminal 100 can be controlled through motions of the pen unit 200 even in a state that the pen unit 200 does not come in contact with an object.

When the tip 203 comes in contact with an object, the ultrasonic generator 212 may generate ultrasonic waves having a wavelength different from a wavelength generated when the tip 203 does not come in contact with an object. Accordingly, when the pen unit 200 moves in a contact state with an object may be differentiated from when the pen unit 200 moves in a non-contact state with an object. Furthermore, different information may be input according to whether the pen unit 200 moves in a contacted state or non-contacted state with an object.

An opening 207 is also formed at the tip 203 of the pen unit 200 so that wave motions can pass therethrough. As wave motions are emitted to the outside through the opening 207, position information about a source of the wave motions becomes similar to position information of the tip 203. This may allow the mobile terminal 100 to more precisely detect a position of the tip 203.

Figure 5:
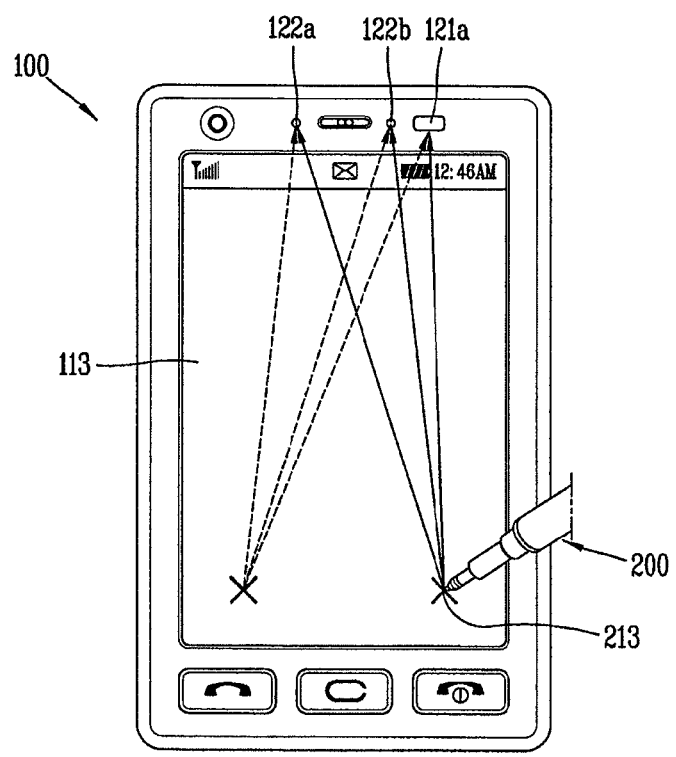
FIG. 5 is a conceptual view showing transmission and reception of wave motions for detecting motions of the pen unit 200.

Next, FIG. 5 is a conceptual view showing transmission and reception of wave motions for detecting motions of the pen unit 200. A method for calculating position information and motion information based on a detected time difference will also be explained with reference to FIG. 5.

Ultrasonic waves and light are generated from the wave motion generator 210. Because the light is much faster than the ultrasonic waves, the time taken for the light to reach the optical sensor 121 is much less than the time taken for the ultrasonic waves to reach the first and second ultrasonic sensors 122a and 122b. Accordingly, a position 213 created by the wave motion generator 210 may be calculated based on a difference of the two times. Here, the time taken for the light to reach the optical sensor 121 may serve as a reference signal.

Further, there is a difference between the time taken for the ultrasonic waves generated from the point 213 created by the wave motion generator 210 to reach the first ultrasonic sensor 122a, and the time taken for the ultrasonic waves generated from the wave motion source 213 to reach the second ultrasonic sensor 122b. Accordingly, when the wave motion source 213 is moved, the time difference is changed. Based on the detected time difference, position information and motion information of the pen unit 200 can be calculated according to a movement path of the wave motion source.

So far, an embodiment was explained as a method for calculating position information and motion information of the pen unit 200 by detecting wave motions generated from the pen unit 200 by using ultrasonic waves. However, when using 'wave motions', the sensing unit may be implemented in various manners.

Figure 6:
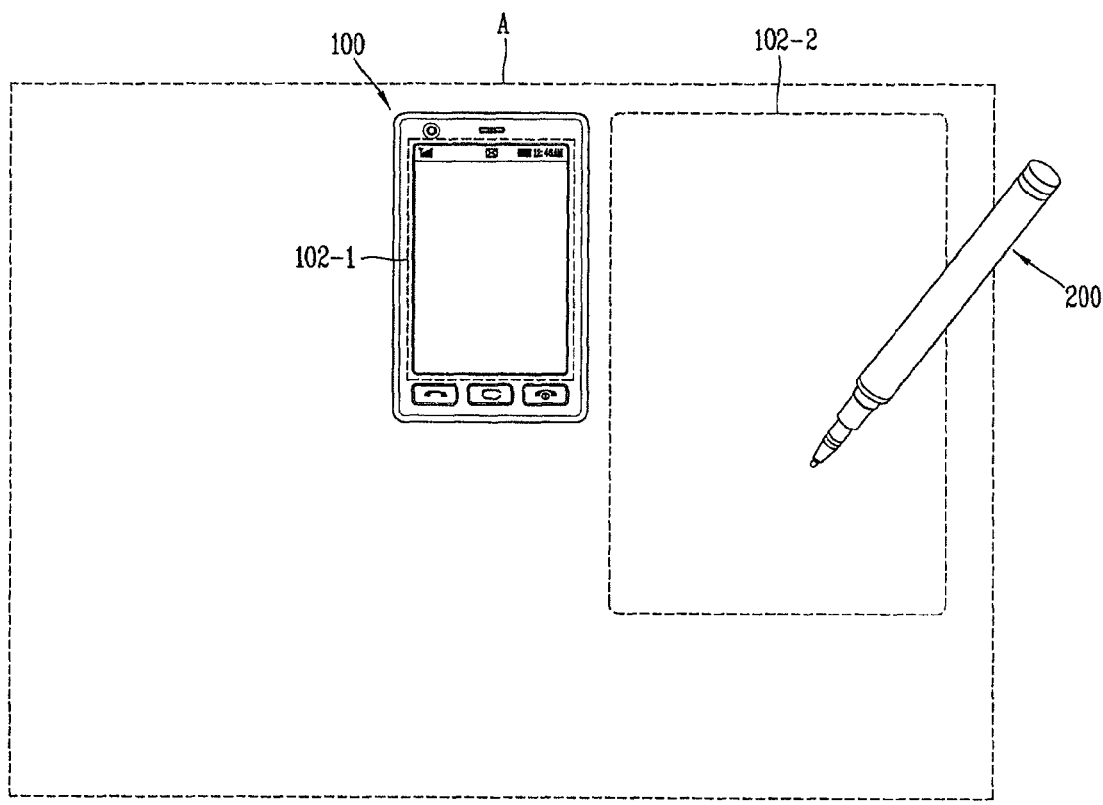
FIG. 6 is a conceptual view showing an input region recognized by a mobile terminal.

FIG. 6 is a conceptual view showing an input region recognized by the mobile terminal 100. As shown, the input region may include at least one of a region 102-1 (hereinafter, 'first input region') occupied by the display 113, and any region 102-2 (hereinafter, 'second input region') on a peripheral region (A) of the terminal body 100a.

The input region may be preset so that motions of the pen unit 200 can match an input of a control command of the mobile terminal 100. That is, if a specific motion of the pen unit 200 is performed within the input region, the mobile terminal 100 senses the specific motion and processes the motion as an input of a control command.

A size and a position of the input region may also be preset. For instance, the first input region 102-1 may have a position and a size corresponding to the display 113. In this instance, the mobile terminal 100 is configured so that the touch screen, i.e., the display 113 can be touched by the pen unit 200. Further, the second input region 102-2 may be set to have a predetermined size at a position of the peripheral region (A) in a specific mode. If a specific mode of the mobile terminal 100 is executed, the second input region 102-2 having a position and a size shown in FIG. 6 may be implemented. The user may input information to the mobile terminal 100 by relatively moving the pen unit 200 on the second input region 102-2.

Figure 7A:
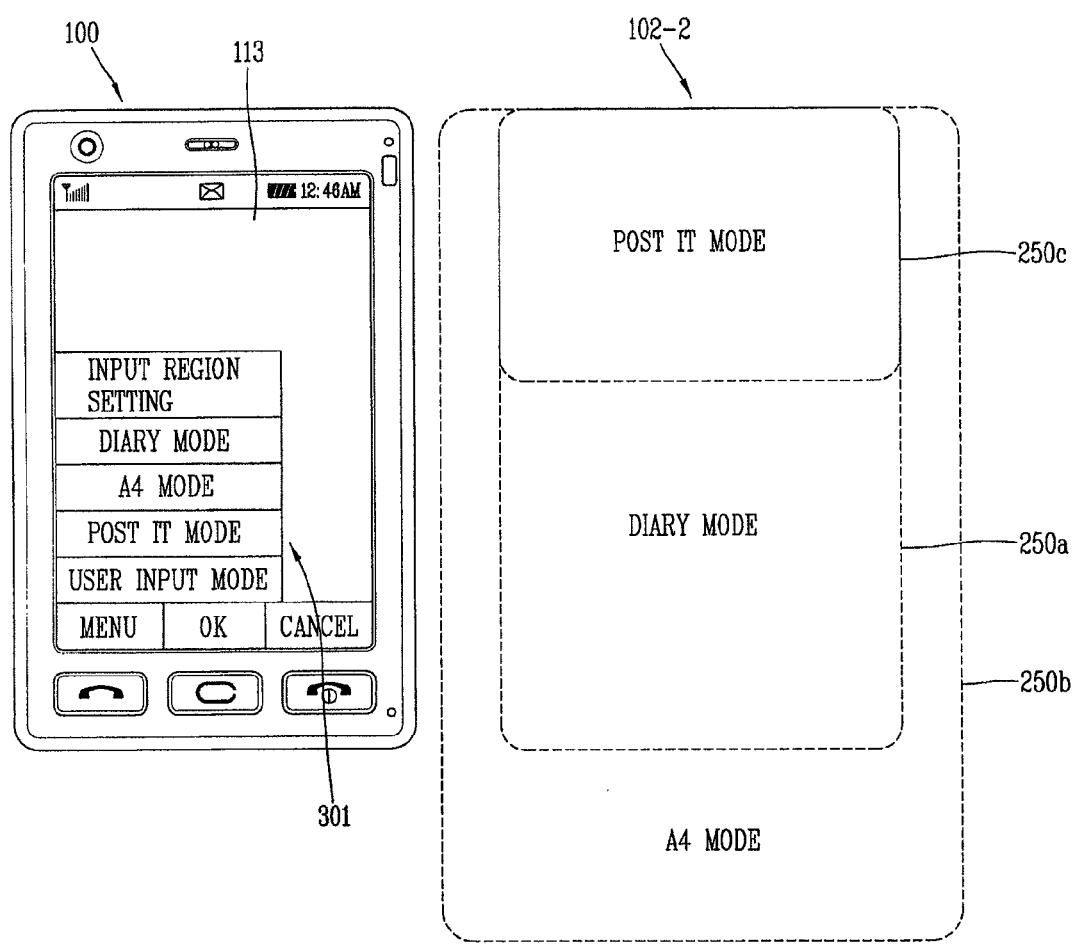
FIGS. 7A and 7B are views showing selection menus relating to sizes of the input region, and selectable input regions.
Figure 7B:
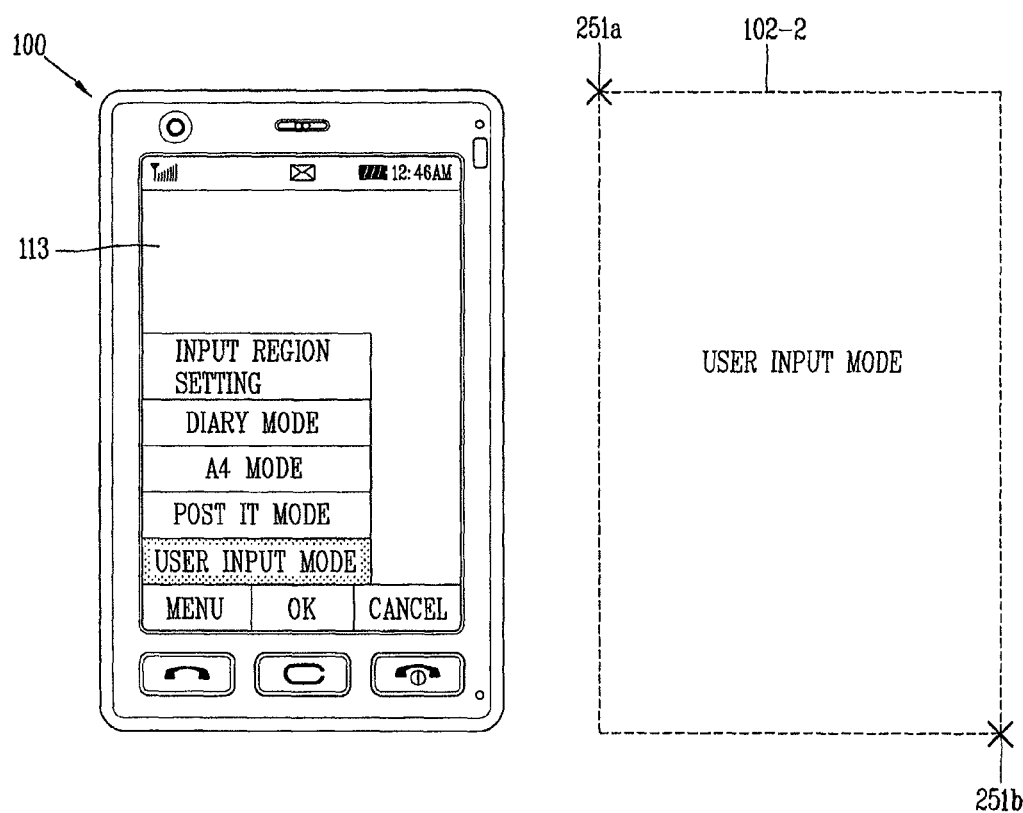

FIGS. 7A and 7B are views showing selection menus relating to sizes of the input region, and selectable input regions. In this embodiment, a size and a position of the input region may be selected by the user. For instance, the size of the second input region 102-2 may be set to be selectable. As shown in FIG. 7A, the display 113 may have a selection menu 301 including a diary mode, an A4 mode, a post it mode, and a user input mode. According to the user's selection, the second region 102-2 may be formed on one of regions 250a, 250b, 250c and 250d having sizes corresponding to the diary mode, A4 mode, post it mode, and user input mode.

Referring to FIG. 7A, in the diary mode, the second input region 102-2 may have a size similar to that of the terminal body 100a. In the A4 mode, the second input region 102-2 may have a size similar to that of A4, and in the post it mode, the second input region 102-2 may have a size smaller than that of the mobile terminal 100. Here, the size of the second input region 102-2 may be formed in proportion to the size of the display 113. For instance, the second input region 102-2 may have a size enlarged in proportion to the size of the display 113. This allows the user to perform an input operation with the pen unit 200 on the region wider than the display 113.

Referring to FIG. 7B, in the user input mode, the second input region 102-2 may have a size arbitrarily set by the user. For instance, the second input region 102-2 maybe formed based on two points 251a and 251b with the pen unit 200. The two points 251a and 251b may be two facing vertexes of the second input region 102-2 formed in a rectangular shape. Under this configuration, the user can arbitrarily set the size and the position of the second input region 102-2.

When the first input region 102-1 or the second input region 102-2 is set, the user can move the pen unit 200 within the input region so that the pen unit 200 can perform a specific motion. In addition, the mobile terminal 100 may be controlled based on the specific motion of the pen unit 200.

Next, FIG. 8 is a flowchart showing a method for providing a user interface relating to conversion of the mobile terminal 100 from a first operation mode to a second operation mode according to an embodiment of the present invention. As shown, a first operation mode relating to one or more functions of the mobile terminal is executed (S110). Then, ultrasonic waves generated from the pen unit 200 are sensed to detect motions of the pen unit 200 (S120). The motions of the pen unit 200 may be performed on the display 113 of the terminal body 100a, or on a region other than the display 113.

In this embodiment, the step of detecting motions of the pen unit 200 (S120) includes sensing ultrasonic waves generated from the pen unit 200 (S121), and calculating position information of the pen unit 200 based on the sensed ultrasonic waves (S122). In S121, the sensing unit can sense ultrasonic waves and optical waves from the pen unit 200, and in S122, position information of the pen unit 200 is calculated based on information relating to ultrasonic waves, thereby detecting motions of the pen unit 200. Further, the information relating to ultrasonic waves may include a time difference occurring when sensing ultrasonic waves, a ultrasonic wave strength, etc. The motions of the pen unit 200 may be implemented as generation of ultrasonic waves, moving of the pen unit while ultrasonic waves are generated, etc.

For instance, when a plurality of sensors are provided at the terminal body 100a, the plurality of sensors sense ultrasonic waves and optical waves generated from the pen unit 200. The pen unit 200 may also be configured to generate ultrasonic waves and optical waves when a specific part thereof is touched. In S122, position information of the pen unit 200 is calculated based on a difference between times when sensing ultrasonic waves by the plurality of sensors. However, the present invention is not limited to this. That is, in S122, position information of the pen unit 200 may be calculated based on a strength difference of ultrasonic waves sensed by the plurality of sensors.

Then, the motions of the pen unit 200 are compared with a stored specific pattern (S130). Then, a second operation mode corresponding to the specific pattern is executed based on a result of the comparison (S140). Here, the specific pattern indicates a preset pattern for converting the current mode of the mobile terminal to the second mode from the first mode. The specific pattern may be set and stored by the manufacturer, or may be set and stored by a user.

The first and second operation modes indicate modes relating to an operation associated with one or more functions of the mobile terminal. For instance, the first and second operation modes may be implemented as two modes selected from an idle mode in which the display 113 is in a deactivated state, an activation mode in which the display 113 is in an activated state, a standby screen display mode in which a standby screen is displayed on the display 113, a menu display mode in which selectable menus are displayed on the display 113, a call transmission/reception mode, a message transmission/reception mode, a text or image input mode, a camera mode, a music or moving image reproduction mode, an image information editing mode, a web browsing mode, etc.

For instance, when the first operation mode is an idle mode, the second operation mode may be a display activation mode in which the display 113 is in an activated state. Alternatively, when the first operation mode is a standby screen display mode or a menu display mode, the second operation mode may include at least one of a call transmission/reception mode, a message transmission/reception mode, a text or image input mode, a camera mode, a music or moving image reproduction mode, an image information editing mode, and a web browsing mode. Still alternatively, when the first operation mode is at least one of a camera mode, a music mode, a moving image mode, and a web browsing mode, the second operation mode may include a call transmission/reception mode and a message transmission/reception mode.

The preset specific pattern may also correspond to motions of the pen unit 200 along a locus having a specific directivity. The motions of the pen unit 200 may include dragging, dragging after holding, flicking, swirling, etc. In addition, the specific pattern may be set in the form of symbols, characters, numbers, etc. If the user performs a specific motion corresponding to the preset specific pattern by moving the pen unit 200 in the first operation mode, the current mode of the mobile terminal 100 is converted to the second operation mode.

Figure 9A:
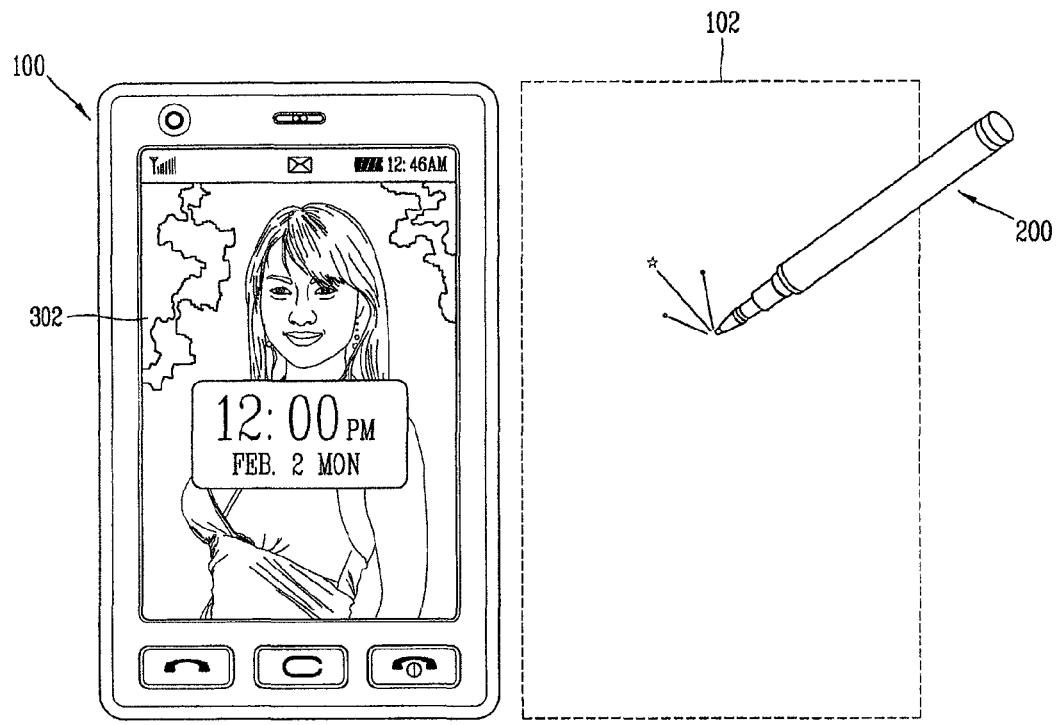
FIGS. 9A to 9C are views respectively showing a method for providing a user interface of a mobile terminal according to an embodiment of the present invention.
Figure 9B:
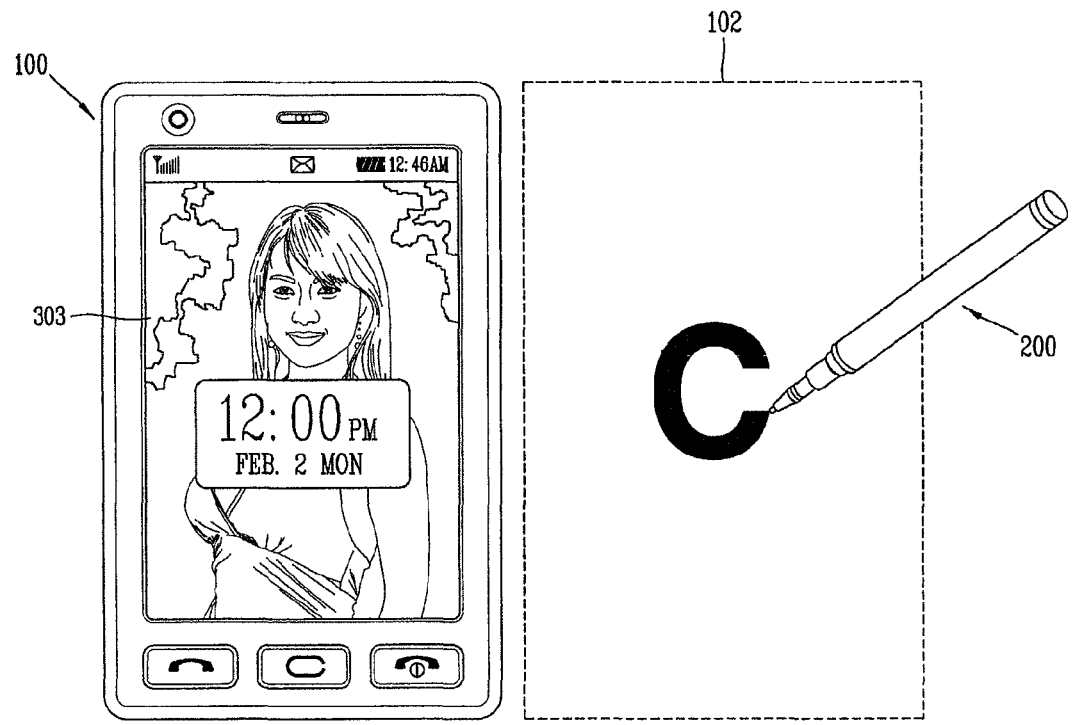
Figure 9C:
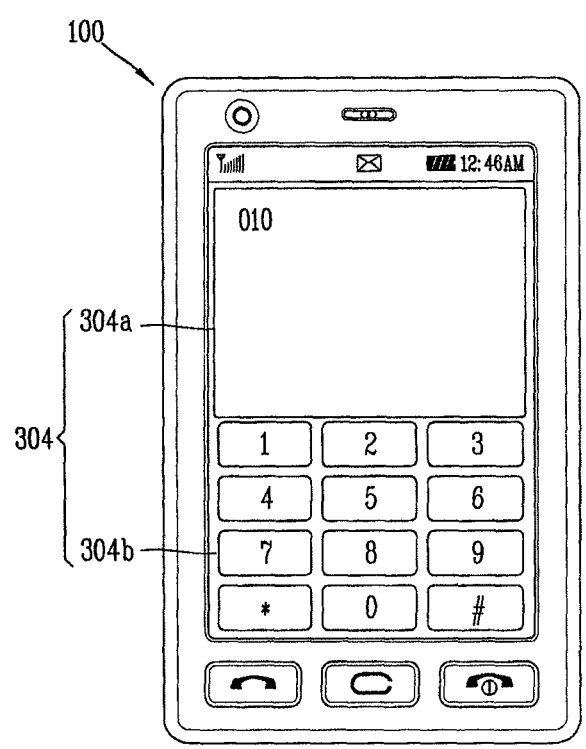

FIGS. 9A to 9C are views respectively showing a method for providing a user interface of a mobile terminal according to an embodiment of the present invention. In this embodiment, the first operation mode is implemented as a standby screen display mode, and the second operation mode is implemented as a call mode.

In particular, referring to FIG. 9A, a standby screen 302 is output to the display 113. The standby screen 203 can also include the current time, a menu icon for entering another operation mode, an icon for releasing a touch deactivated state, etc. Further, the input region 102 may be activated by a preset motion of the pen unit 200. As shown in FIG. 9A, when any region on the peripheral region (A) (refer to FIG. 6) is touched by the pen unit 200, the input region 102 may be activated. Alternatively, the input region 102 may be also activated by touching a part of the terminal body 100a or a part of the display 113, or by manipulating the input key 206 (refer to FIG. 3).

Next, as shown in FIG. 9B, the pen unit 200 is moved on the input region 102, thereby implementing a specific motion. In one embodiment, the pen unit 200 is moved so as to implement a motion corresponding to the letter "C". The mobile terminal 100 may be set so as to implement a call mode when a motion of the pen unit 200 corresponds to "C". The specific pattern may also be set so as to correspond to input of a representative character in the second operation mode. That is, for a call mode, a representative character "C" may be set as the specific pattern and for a message mode, a representative character "M" may be set as the specific pattern.

If the motion of the pen unit 200 matches the preset specific pattern, the mobile terminal 100 enters a call mode as shown in FIG. 9C. In the call mode, soft keys 304b for inputting telephone numbers, and a phone number display window 304a for displaying input telephone numbers are output to the display 113.

Figure 10A:
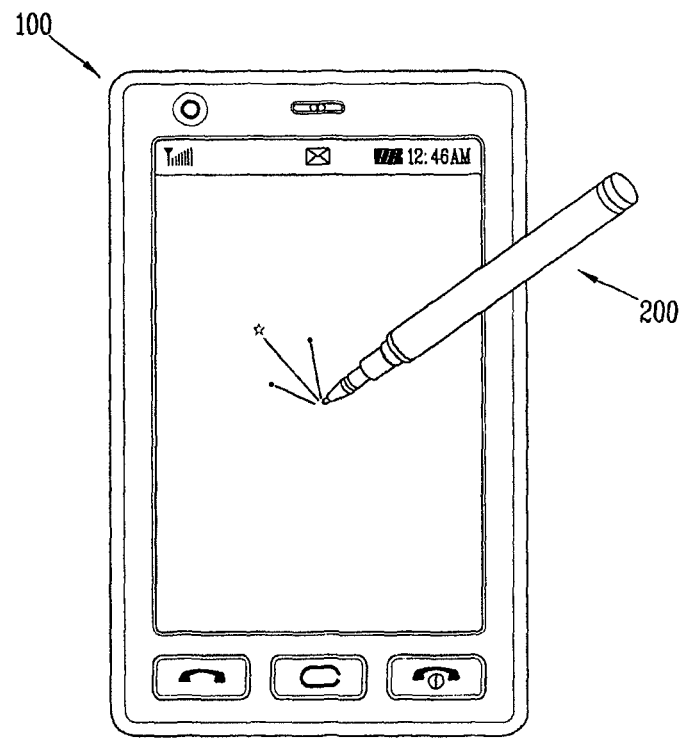
FIGS. 10A to 10C are views respectively showing a method for providing a user interface of a mobile terminal according to another embodiment of the present invention.
Figure 10B:
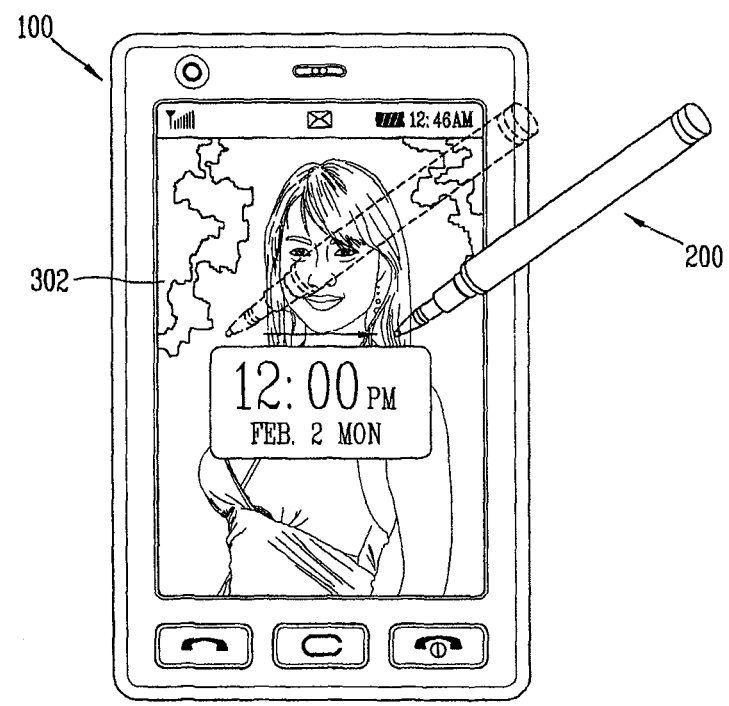
Figure 10C:
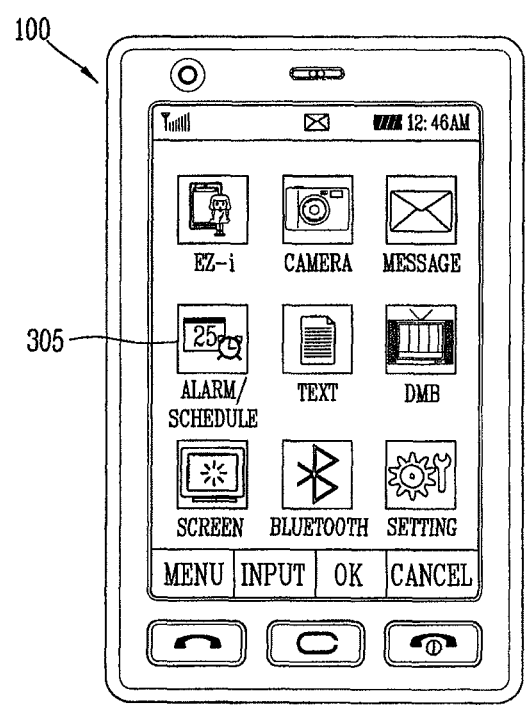

FIGS. 10A to 10C are views respectively showing a method for providing a user interface of a mobile terminal according to another embodiment of the present invention. In this embodiment, the first operation mode is implemented as an idle mode, and the second operation mode is implemented as a display activation mode (standby screen display mode).

Further, the idle mode indicates a mode in which the display 113 is in a deactivated state. In the idle mode, transmission and reception of calls or messages are allowable because a wireless communication function is in an activated state. The idle mode may also be referred to as a standby mode, because a user's input or input of wireless signals are in a standby state. In the idle mode, the mobile terminal 100 may reduce power consumption by deactivating the display 113, and may activate only a user input unit (key pad, jog wheel, keyboard, etc.). If a user's signal input has not occurred for a predetermined time when the display 113 has been activated, the mobile terminal 100 may enter the idle mode. Alternatively, the mobile terminal 100 may enter the idle mode by a user's signal input when the display 113 is activated.

FIG. 10A shows the idle mode being executed and a part of the display 113 is touched by the pen unit 200. In this embodiment, the input region 102 is formed on the display 113 and the mobile terminal 100 is set so that the display 113 can be activated when the display 113 is touched by the pen unit 200. For instance, as shown in FIG. 10B, the mobile terminal 100 enters a standby screen display mode in which the standby screen 302 is displayed on the display 113.

If a specific motion of the pen unit 200 is performed in the second operation mode, the mobile terminal 100 may implement a third operation mode different from the second operation mode. In one embodiment, the third operation mode is implemented as a menu display mode. Then, if the pen unit 200 is dragged to a specific direction on the display 113 in the standby screen display mode, the mobile terminal 100 enters a menu display mode as shown in FIG. 10C. That is, a specific motion of the pen unit 200 for entering the menu display mode is set as drag of the pen unit 200. As the pen unit 200 is dragged, icons 305 indicating menus relating to functions or applications of the mobile terminal 100 may be displayed on the display 113.

Further, in FIG. 10A, the current operation mode of mobile terminal 100 may be a locking mode where some of input keys 131 or 132 (Refer to FIG. 2) are in a deactivated state. The sensor 122 starts to detect the motion of the pen unit 200 when one of the input keys 131 or 132 is manipulated in the mobile terminal locking mode. The mobile terminal 100 enters the standby screen display mode in which the standby screen 302 is displayed on the display 113, when the display 113 is touched by the pen unit 200. Namely, one of the first and second operation modes is a mobile terminal locking mode where some of input keys 131 or 132 are in a deactivated state, and another of the first and second operation modes is executed by the motion of pen unit 200. The another of the first and second operation modes may be one of a call transmission/reception mode, a message transmission/reception mode, a text or image input mode, a camera mode, a music or moving image reproduction mode, an image information editing mode, a web browsing mode, a standby screen display mode where a standby screen is displayed on a display of the mobile terminal, and a menu display mode where one or more selectable menus are displayed on the display.

Figure 11A:
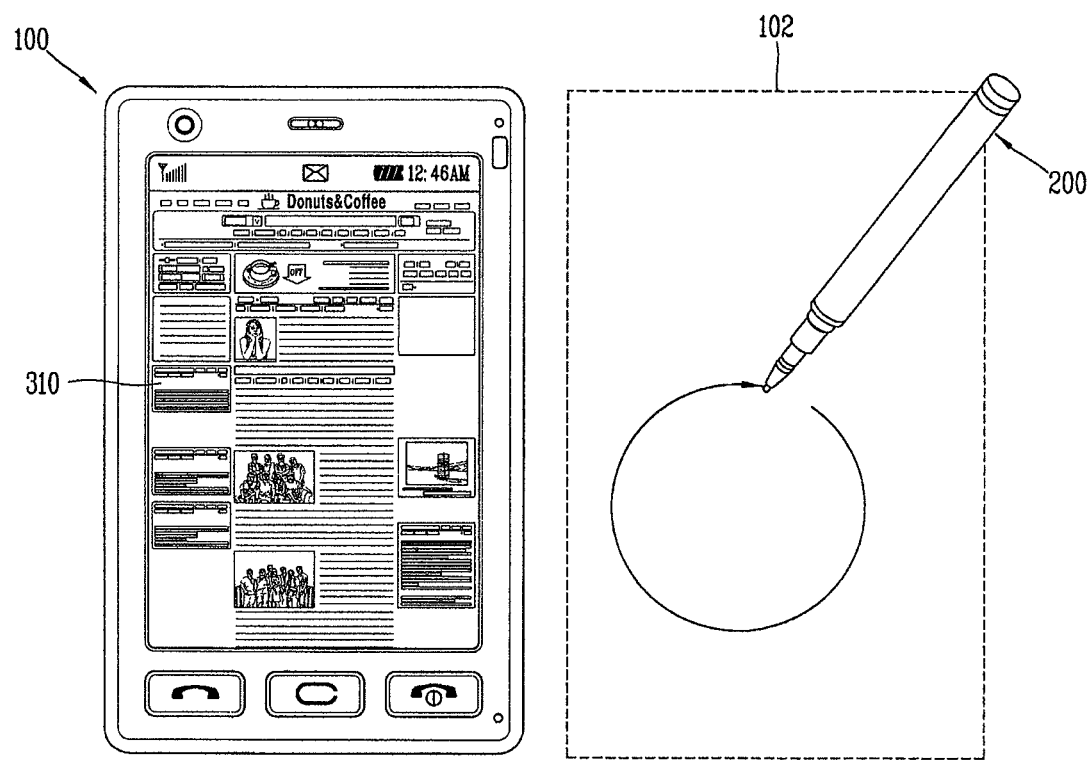
FIGS. 11A and 11B are views respectively showing a method for providing a user interface of a mobile terminal according to another embodiment of the present invention.
Figure 11B:
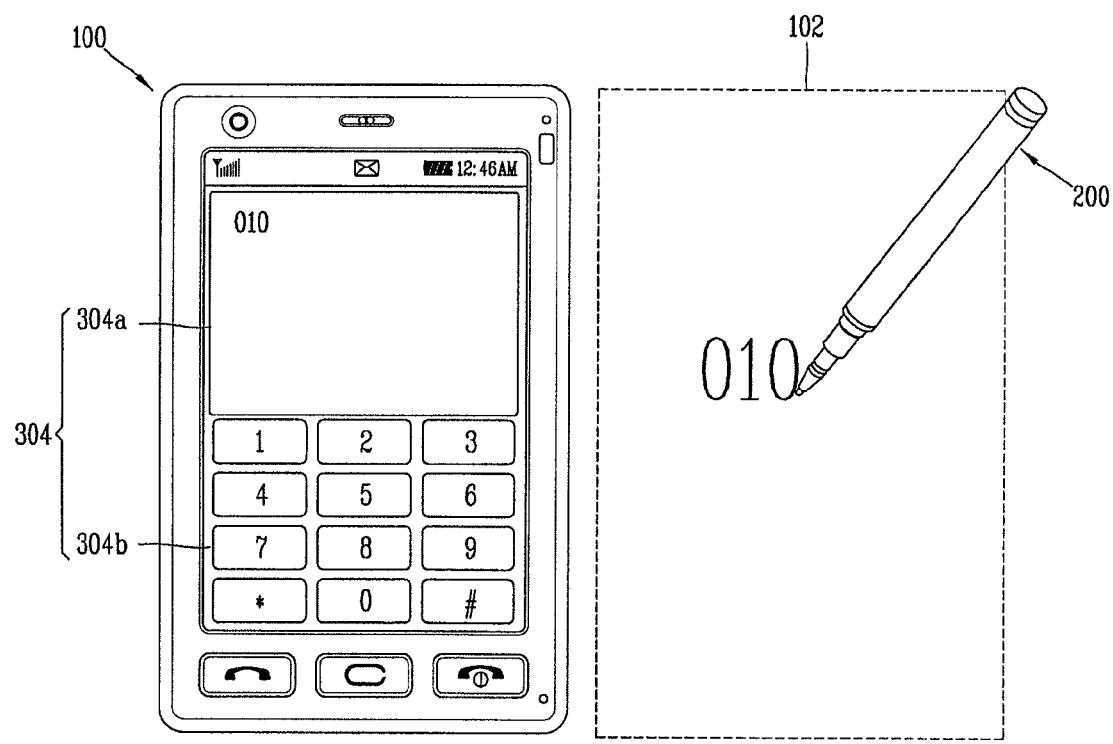

Next, FIGS. 11A and 11B are views respectively showing a method for providing a user interface of a mobile terminal according to another embodiment of the present invention. In this embodiment, the first operation mode is implemented as a web browsing mode, and the second operation mode is implemented as a call mode. In the web browsing mode, a web page 310 is displayed on the display 113, and the user controls the operation of the web page 310 by using the pen unit 200.

For example, if a specific motion (e.g., 'O' motion or 'C' motion) is performed on the input region 102 by using the pen unit 200 in the web browsing mode, a call mode may be implemented as shown in FIG. 11B. In the call mode, a telephone number may be input by touching the soft keys 304b with the user's finger or with the pen unit 200. Alternatively, as shown in FIG. 11B, a telephone number may be input by the user's writing using the pen unit 200.

Figure 12A:
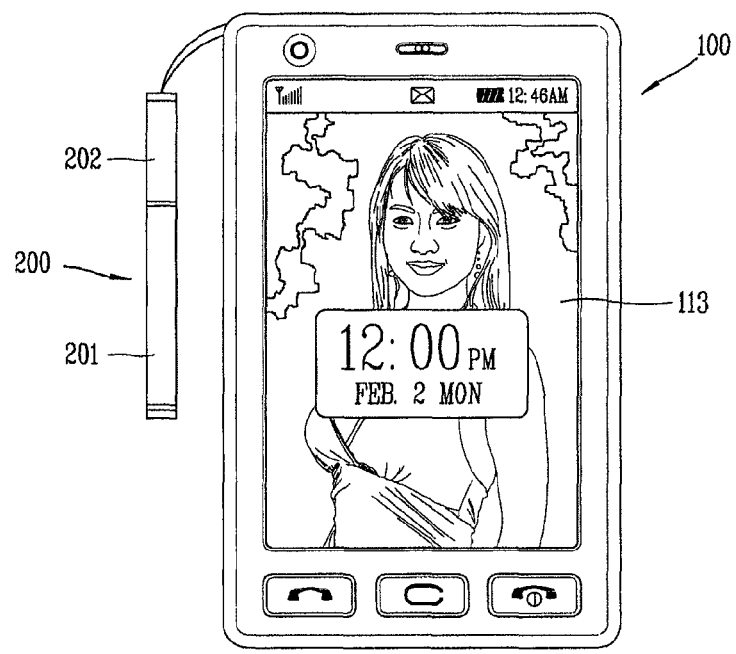
FIGS. 12A and 12B are views respectively showing a method for providing a user interface of a mobile terminal according to another embodiment of the present invention.
Figure 12B:
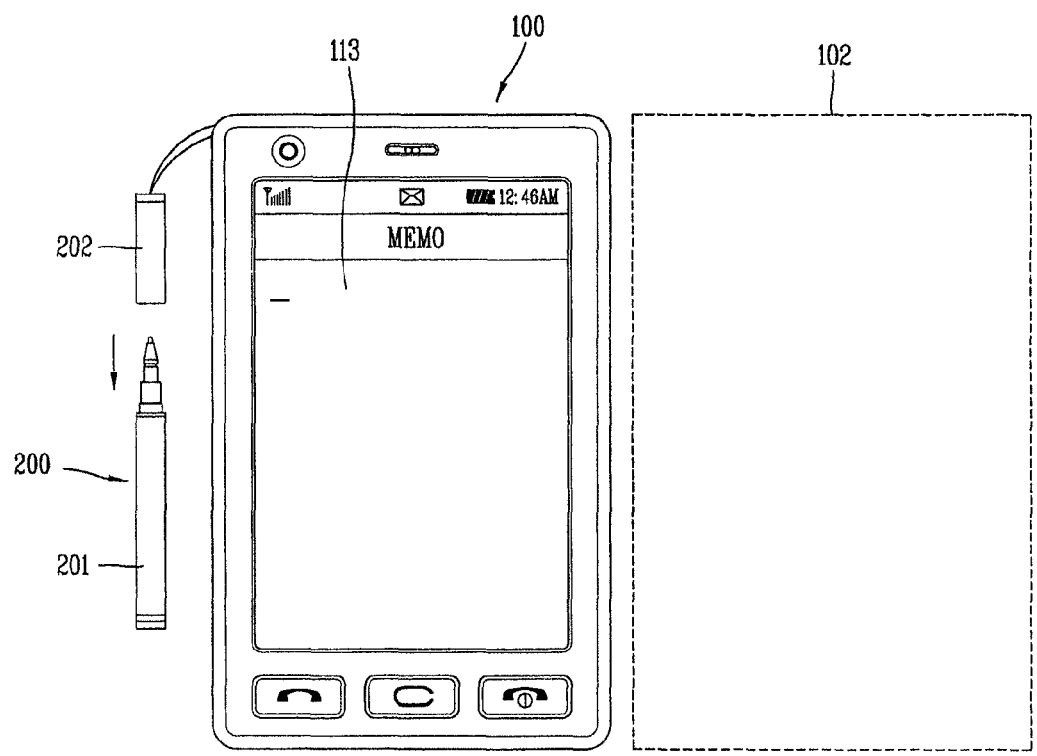

Next, FIGS. 12A and 12B are views respectively showing a method for providing a user interface of a mobile terminal according to another embodiment of the present invention. In this embodiment, the first operation mode is implemented as a standby screen display mode, and the second operation mode is implemented as a text input mode. However, even if the first operation mode is implemented as a standby screen display mode, the first operation mode may be implemented as other operation mode, e.g., a call mode, an image viewing mode, etc.

Referring to FIG. 12B, a motion of the pen unit 200 for executing the second operation mode is implemented as an operation to separate the pen unit 200 from the terminal body 100a. The separation of the pen unit 200 from the terminal body 100a indicates that the body 201 is separated from the cap 202 connected to the terminal body 100a. However, the present invention is not limited to this. For instance, the separation of the pen unit 200 from the terminal body 100a may indicate that the pen unit 200 mounted in the terminal body 100a is drawn to outside of the terminal body 100a.

If the pen unit 200 is separated from the terminal body, the controller 117 (refer to FIG. 37) displays video information relating to text input on the display 113. The video information relating to text input may include a memo input window, a message input window, etc. Upon executing the text input mode, the input region 102 is set at a region adjacent to the mobile terminal 100. The input region 102 may be formed to have a preset size and position.

Figure 13A:
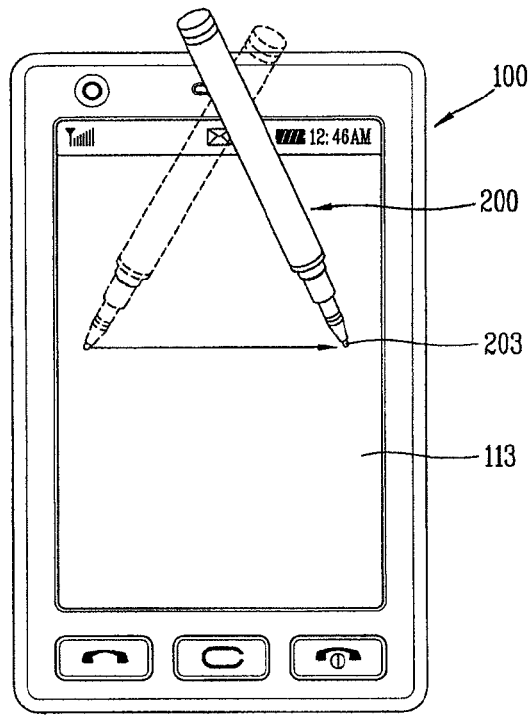
FIGS. 13A and 13B are views respectively showing a method for providing a user interface of a mobile terminal according to another embodiment of the present invention.
Figure 13B:
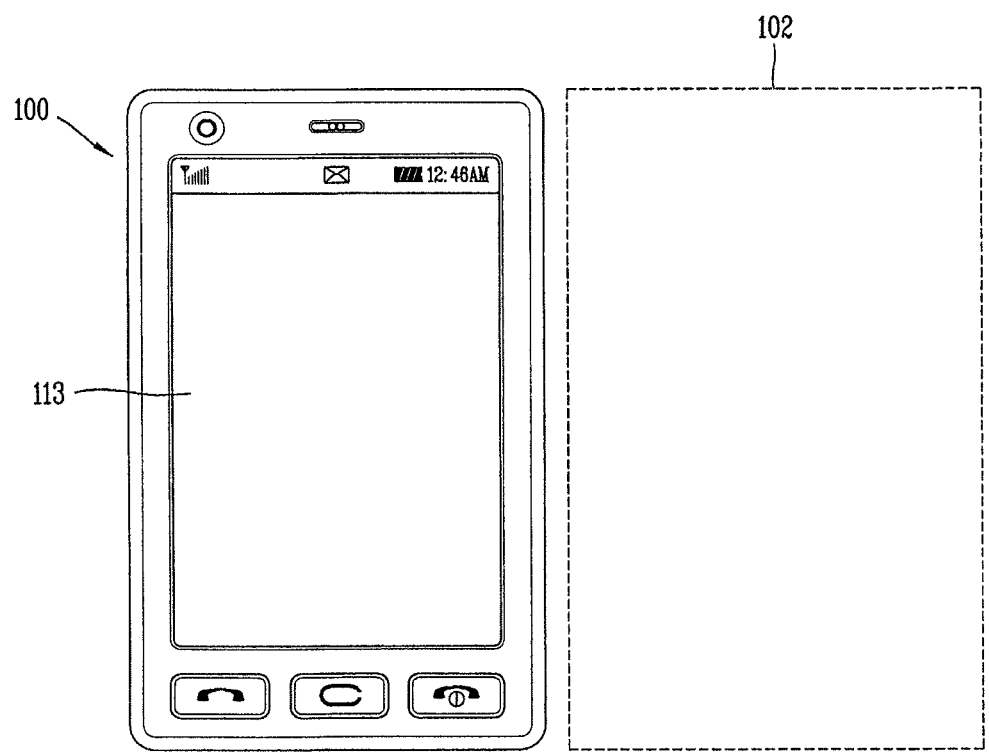

FIGS. 13A and 13B are views respectively showing a method for providing a user interface of a mobile terminal according to another embodiment of the present invention. Referring to FIG. 13A, motions of the pen unit 200 for entering the second operation mode from the first operation mode correspond to moving a part of the pen unit 200 to one direction. The one part of the pen unit 200 may be the tip 203 of the pen unit 200. Motions of a part of the pen unit 200 of one direction may be implemented as drag or flicking of the pen unit 200 on the display 113.

Referring to FIG. 13B, as the pen unit 200 is dragged, the input region 102 is formed at a position far from the display 113 along a predetermined direction. For instance, when the user drags the pen unit 200 on the display 113, the input region 102 may be formed along the dragging direction. As shown in FIG. 13B, when the pen unit 200 is dragged to the right side of the display 113, the input region 102 is formed at the right side of the mobile terminal 100. On the other hand, when the pen unit 200 is dragged to the left side of the display 113, the input region 102 is formed at the left side of the mobile terminal 100.

Figure 14A:
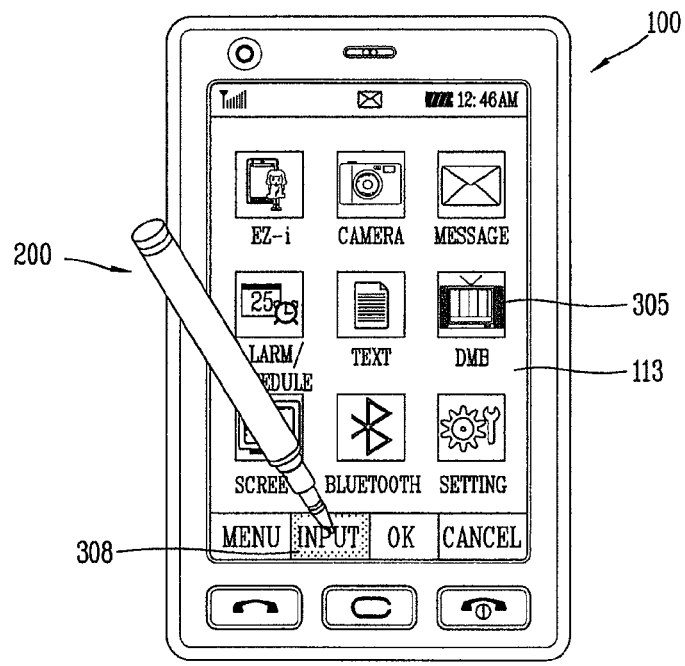
FIGS. 14A and 14B are views respectively showing a method for providing a user interface of a mobile terminal according to another embodiment of the present invention.
Figure 14B:
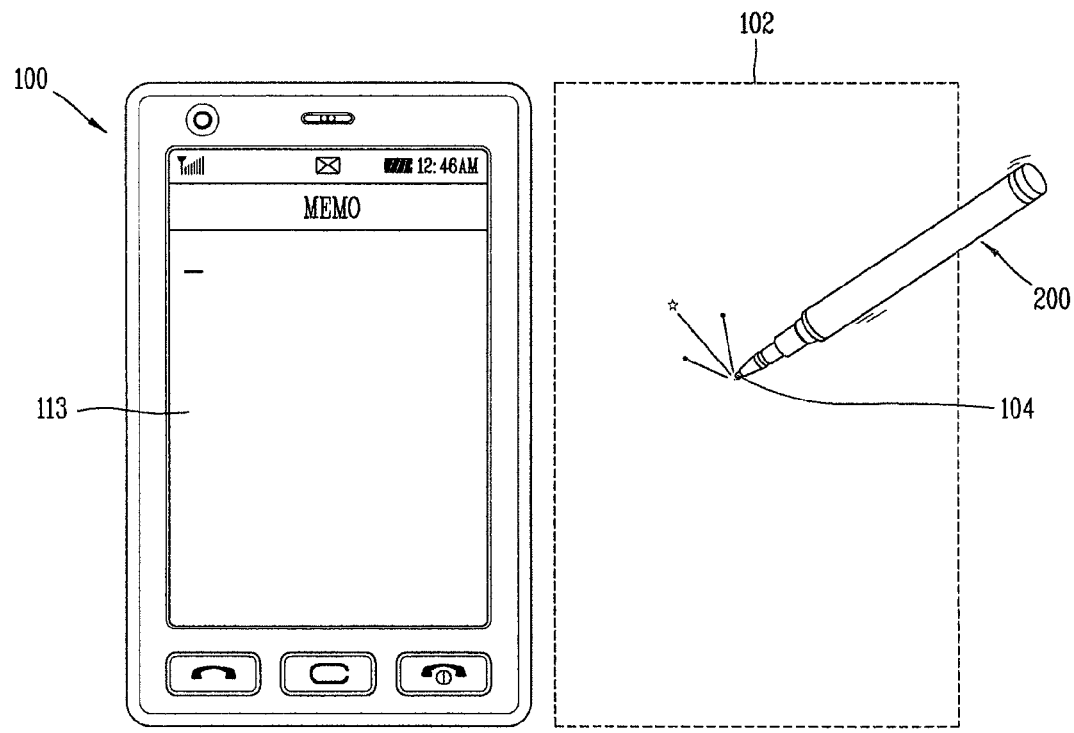
Figure 15A:
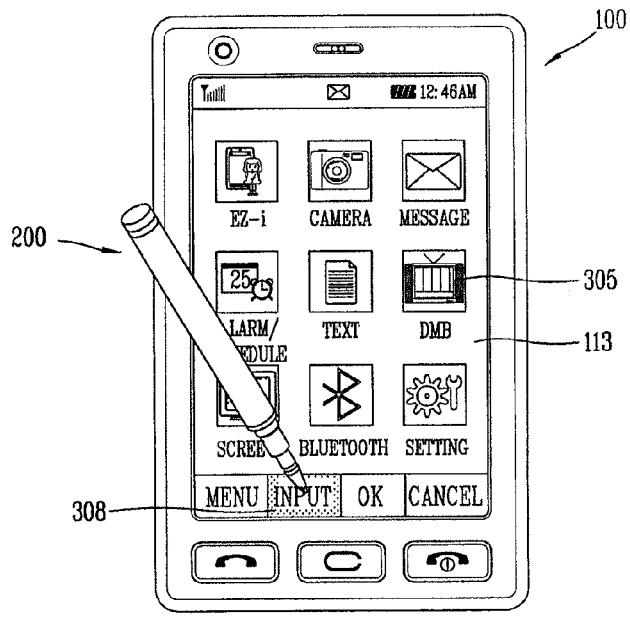
FIGS. 15A and 15B are views respectively showing a method for providing a user interface of a mobile terminal according to another embodiment of the present invention.
Figure 15B:
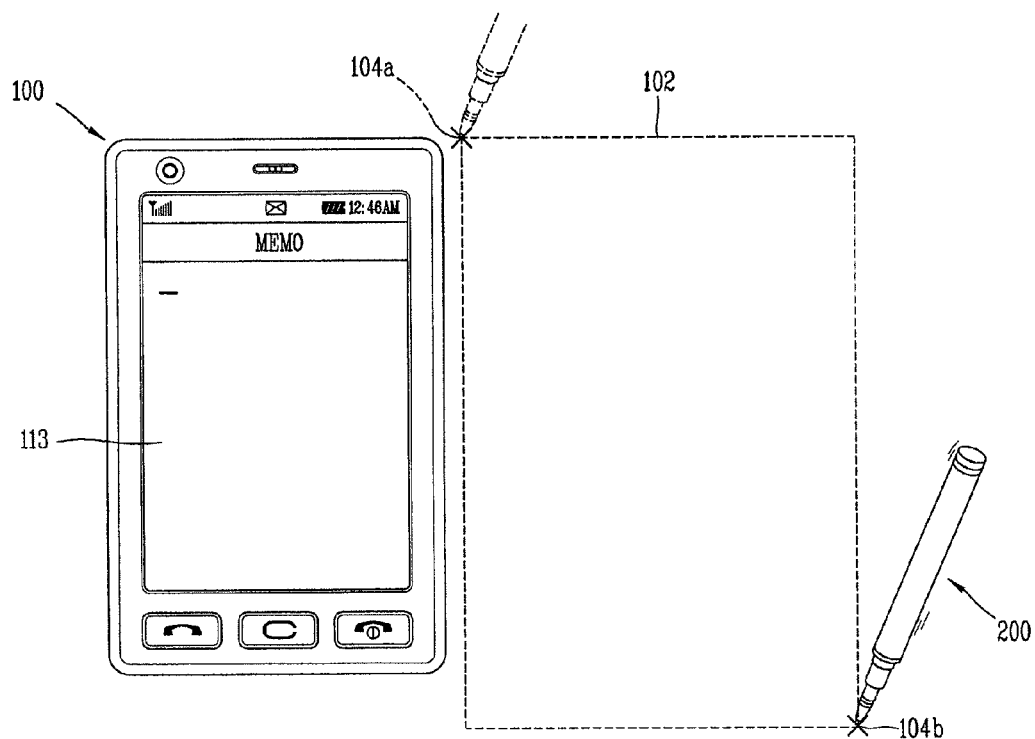

Next, FIGS. 14A and 14B are views respectively showing a method for providing a user interface of a mobile terminal according to another embodiment of the present invention, and FIGS. 15A and 15B are views respectively showing a method for providing a user interface of a mobile terminal according to another embodiment of the present invention.

In this embodiment, the first operation mode is implemented as a menu display mode, and the second operation mode is implemented as a text input mode. Also, when the second operation mode is implemented as a text input mode, the input region 102 may be set at a region other than the display 113. At least one of a position and a size of the input region 102 may also be formed by using motions of the pen unit 200, the motions implemented at a region other than the display 113.

Referring to FIGS. 14A and 15A, the mobile terminal 100 senses touch of an input item 308 displayed on the display 113, thereby entering a text input mode. Referring to FIG. 14B, if the user touches one point 104 spaced from the mobile terminal 100, the input region 102 is formed by using the touched point 104. For instance, the touched point 104 may be the center of the input region 102. Also, the input region 102 may have a position determined based on the center preset by the pen unit 200, and may be formed to have a preset size.

Referring to FIG. 15B, the input region 102 may be formed based on two points 104a and 104b set by using the pen unit 200. The two points 104a and 104b points may be two facing vertexes of the input region 102 formed in a rectangular shape. Under this configuration, the user may arbitrarily set the size and the position of the input region 102.

Figure 16A:
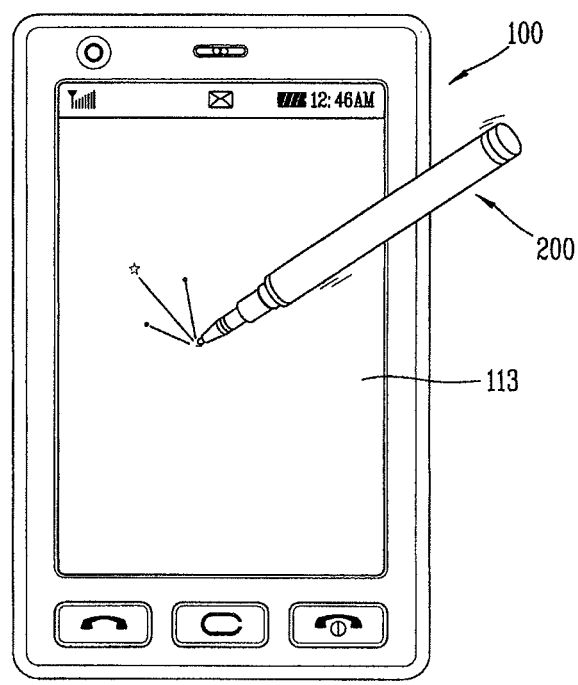
FIGS. 16A and 16B are views respectively showing a method for providing a user interface of a mobile terminal according to another embodiment of the present invention.
Figure 16B:
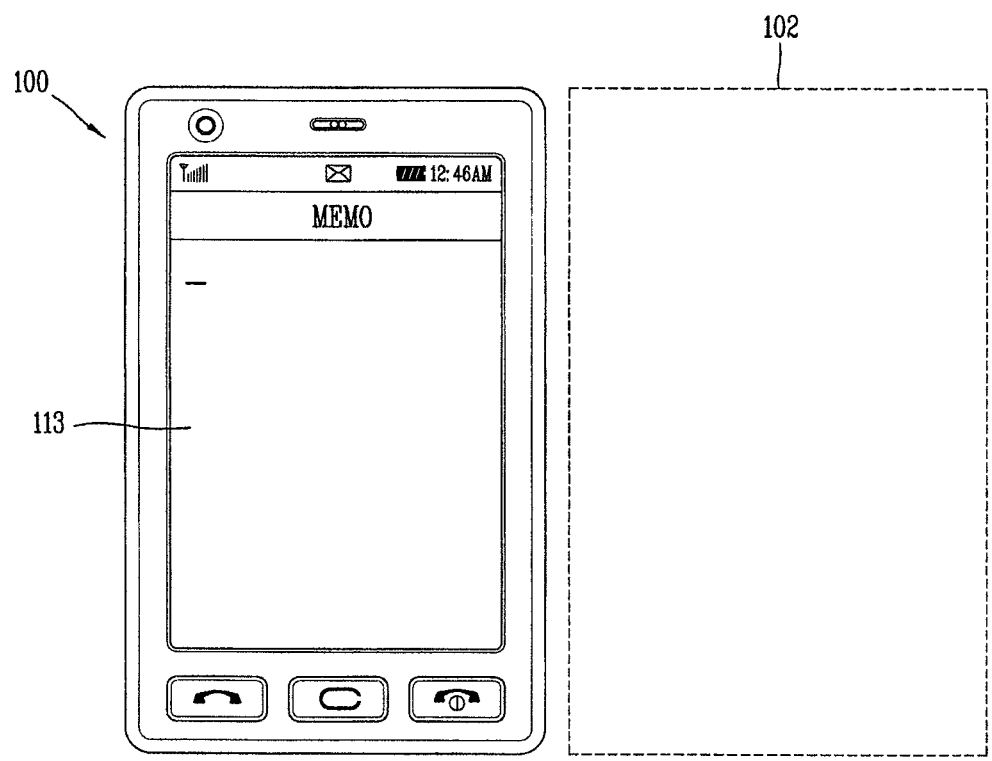

Next, FIGS. 16A and 16B are views respectively showing a method for providing a user interface of a mobile terminal according to another embodiment of the present invention. In this embodiment, the first operation mode is implemented as an idle mode, and the second operation mode is implemented as a text input mode. Furthermore, the motion of the pen unit 200 for converting the first operation mode into the second operation mode is implemented as a touch of the terminal body.

In the idle mode, if a part of the terminal body, e.g., the display 113 is touched by using the pen unit 200, video information relating to text input may be displayed on the display 113. For instance, a memo input window may be displayed on the display 113 by using the pen unit 200, so that the user can rapidly activate a memo input mode. In addition, the mobile terminal 100 may be configured to be converted into a standby screen display mode from an idle mode with respect to input not using the pen unit 200 (e.g., input through the user input unit). This allows the user to perform mode conversion within a wider range.

Figure 17:
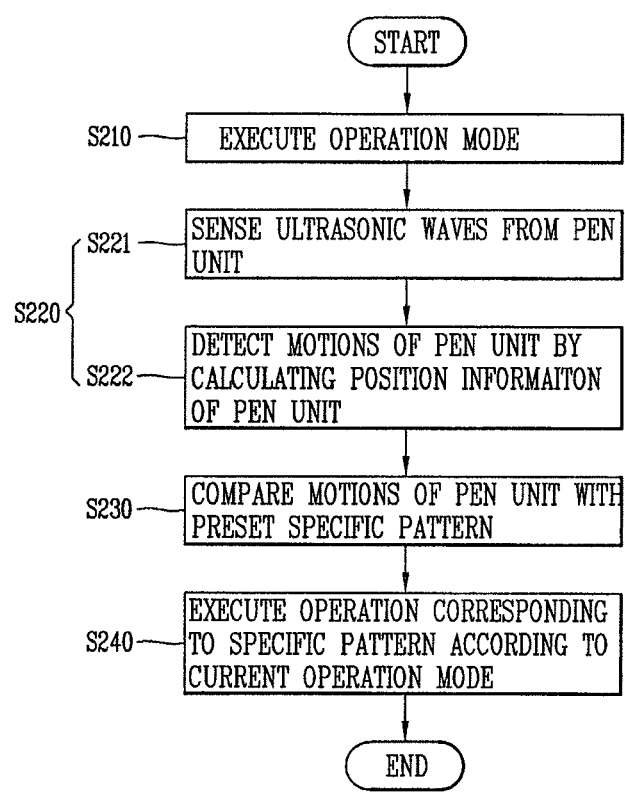
FIG. 17 is a flowchart showing a method for providing a user interface relating to execution of a specific operation in an operation mode of a mobile terminal according to the present invention.

FIG. 17 is a flowchart showing a method for providing a user interface relating to execution of a specific operation in an operation mode of the mobile terminal according to an embodiment of the present invention. As shown, an operation mode relating to one or more functions of the mobile terminal 100 is executed (S210). As aforementioned, the operation mode indicates a mode for executing various functions of the mobile terminal 100 such as the first and second operation modes. For instance, the operation mode may include an idle mode, a standby screen display mode, a menu display mode, a call mode, a message mode, a text input mode, an image input mode, a camera mode, a music mode, a web browsing mode, etc.

Then, ultrasonic waves generated from the pen unit 200 are sensed to detect motions of the pen unit 200 (S220). The process for detecting motions of the pen unit 200 is the same as the process mentioned in FIG. 8, and thus its detailed explanations are omitted. Then, the motions of the pen unit 200 are compared with a preset specific pattern (S230), are an operation corresponding to the pattern is executed based on a result of the comparison according to the current operation mode (S240). Here, the preset specific pattern indicates a pattern preset for execution of a specific operation in an operation mode.

As mentioned in FIG. 8, the preset specific pattern may correspond to motions of the pen unit 200 along a locus having a specific directivity. The motions of the pen unit 200 may include dragging, dragging after holding, flicking, swirling, etc. Further, the specific pattern may be set in the form of symbols, characters, numbers, etc. If the user performs a specific motion corresponding to the preset specific pattern by moving the pen unit 200 in a specific operation mode, a corresponding operation is executed.

Even if the user performs the same motions of the pen unit 200 in different operation modes, the motions may match different control commands according to an operation mode being currently executed. For instance, when the current operation mode is related to a text input, and a circle is drawn by the pen unit 200, a text of 'O' is displayed on the display 113. When the current operation mode is related to image input, and a circle is drawn by the pen unit 200, an image corresponding to the circle is displayed on the display 113. Also, when the current operation mode is related to photo capturing, the mobile terminal 100 may be set so that an external image input through a camera can be captured upon completing drawing a circle by the pen unit 200.

Hereinafter, various embodiments for executing a specific operation in an operation mode of the mobile terminal by using the pen unit 200 will be explained. In particular, FIGS. 18A to 18D are views respectively showing a method for providing a user interface of a mobile terminal according to another embodiment of the present invention.

This embodiment shows not only a method for converting an operation mode by using the pen unit 200, but also a method for executing a specific operation by using the pen unit 200 in a specific operation mode. Further, in this embodiment, the first operation mode is implemented as an image viewing mode, and the second operation mode is implemented as an image editing mode.

Figure 18A:
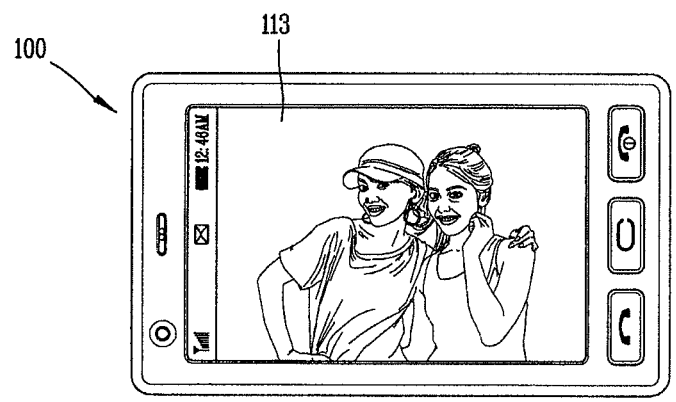
FIGS. 18A to 18D are views respectively showing a method for providing a user interface of a mobile terminal according to another embodiment of the present invention.
Figure 18B:
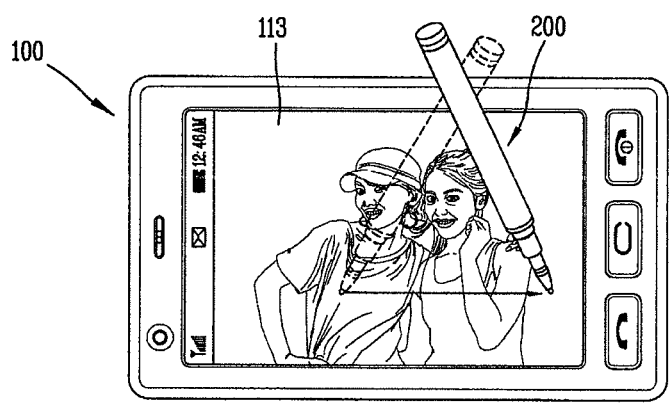

As shown in FIG. 18A, a pre-stored image is displayed on the display 113 in an image viewing mode. As shown in FIG. 18B, if a specific motion (dragging operation) of the pen unit 200 is performed, the current mode of the mobile terminal 100 is converted to an image editing mode. At the same time, the input region 102 is set at one side of the mobile terminal 100.

Figure 18C:
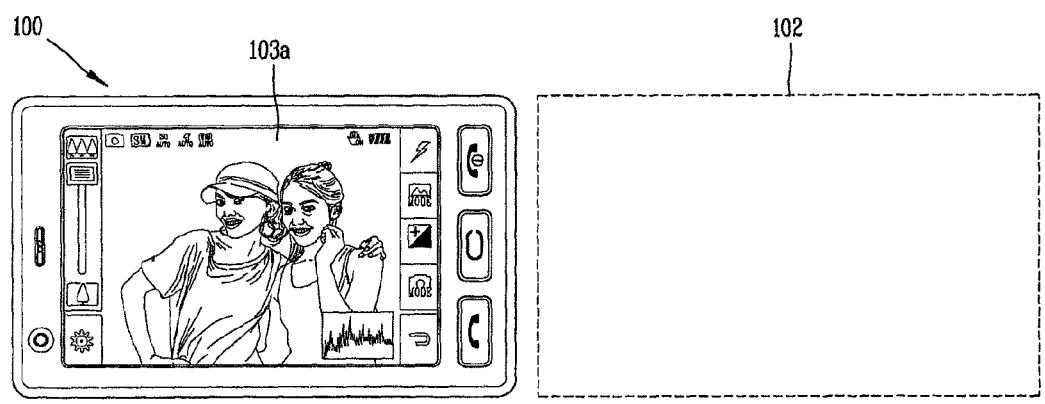

As shown in FIG. 18C, an image editing window 103a is activated on the display 113 by the motion of the pen unit 200. This allows the user to set a virtual region and to enter an editing mode for editing video information displayed on the display 113.

Figure 18D:
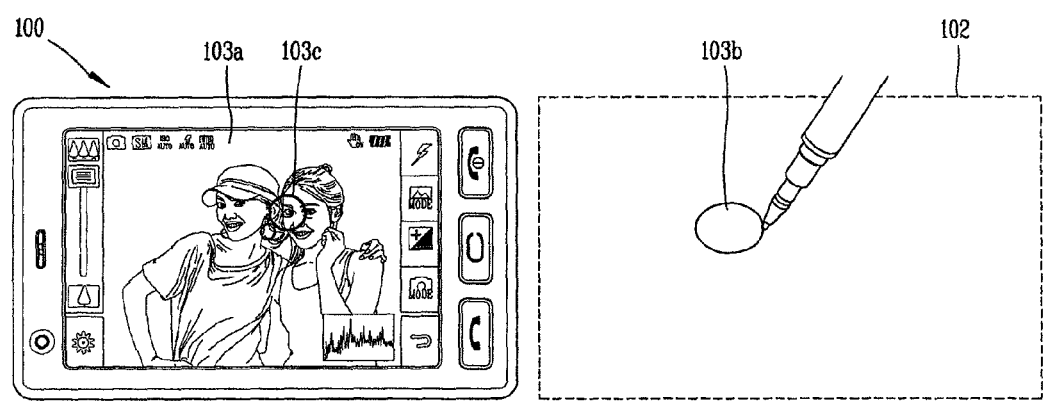

When the current operation mode (second operation mode) is an image editing mode, the controller 117 (refer to FIG. 37) converts motions of the pen unit 200 into images so that information input to the input region 102 can be displayed on the display 113. Referring to FIG. 18D, a circle 103b drawn by motions of the pen unit 200 on the input region 102 is input to the image editing window 103b as a circle 103c. This circle 103c can be displayed on a pre-stored image as shown in FIG. 18D. The circle 103c can also be dragged or changed in size or deleted by movements of the pen unit 200 either in the input region 102 or in the image editing window 103b.

Figure 19A:
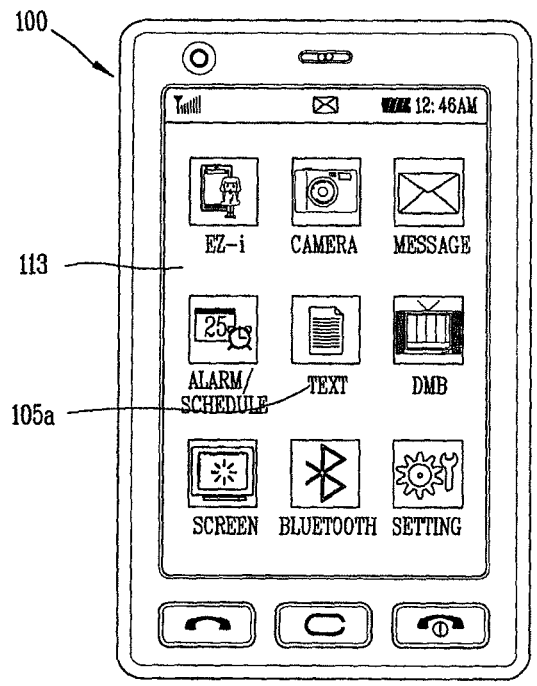
FIGS. 19A to 19C are views respectively showing a method for providing a user interface of a mobile terminal according to another embodiment of the present invention.
Figure 19B:
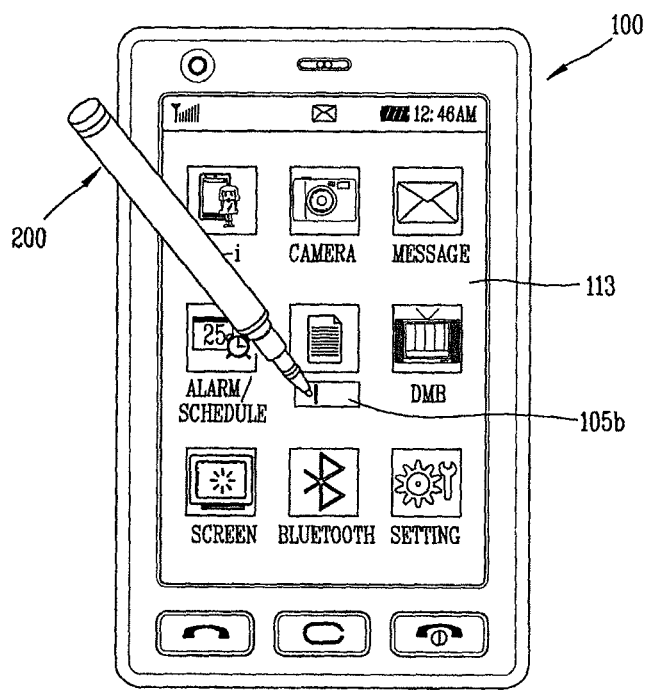
Figure 19C:
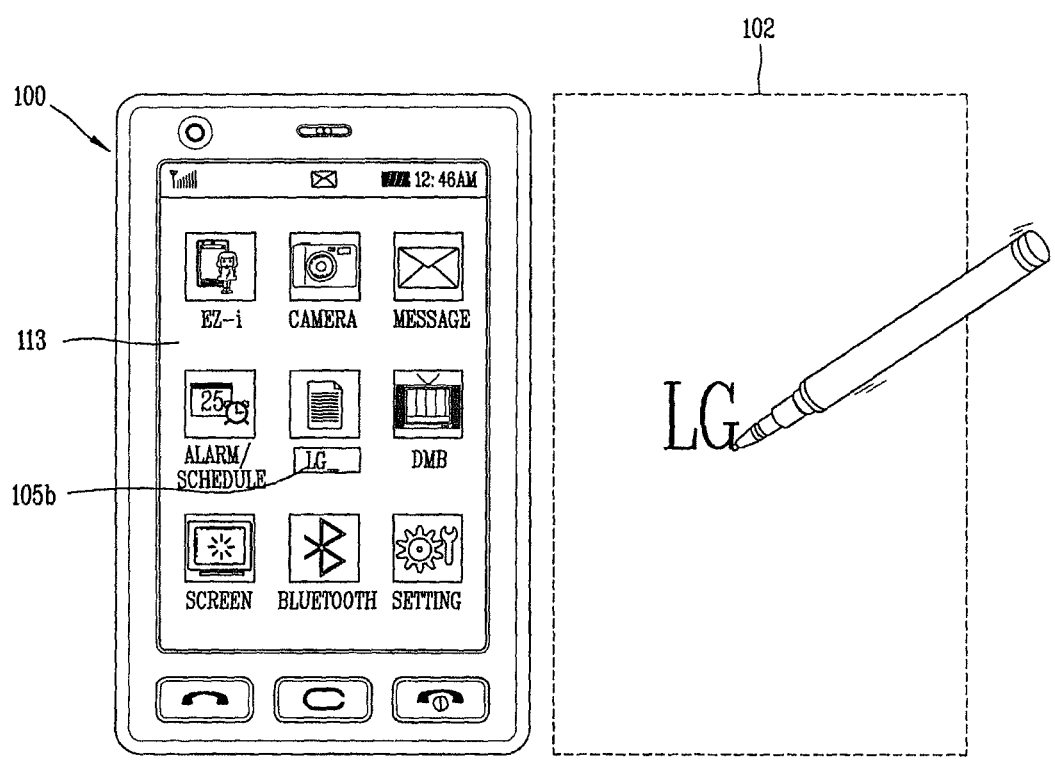

FIGS. 19A to 19C are views respectively showing a method for providing a user interface of a mobile terminal according to another embodiment of the present invention. In this embodiment, the first operation mode is implemented as a menu display mode, and the second operation mode is implemented as a menu editing mode. As shown in FIGS. 19A to 19C, menus are displayed on the display 113 and include icons, and text providing information about the icons.

If the pen unit 200 designates a text 105a in a touch manner, a text editing window 105b is activated to allow the mobile terminal to enter a text editing mode. At the same time, the input region 102 is set at one side of the mobile terminal 100. In order to display the text 105a on video information displayed on the display 113, the controller 117 (refer to FIG. 37) converts a specific pattern corresponding to motions of the pen unit 200 into text, and displays the text on the display 113. "LG" written on the input region 102 by the pen unit 200 is input to a text editing window 105b. The controller 117 can then determine whether or not the character written by the pen unit 200 has been completed. If the character "G" written by the pen unit 200 is determined as completion of a character, the written "G" is displayed on the text editing window 105b.

Figure 20A:
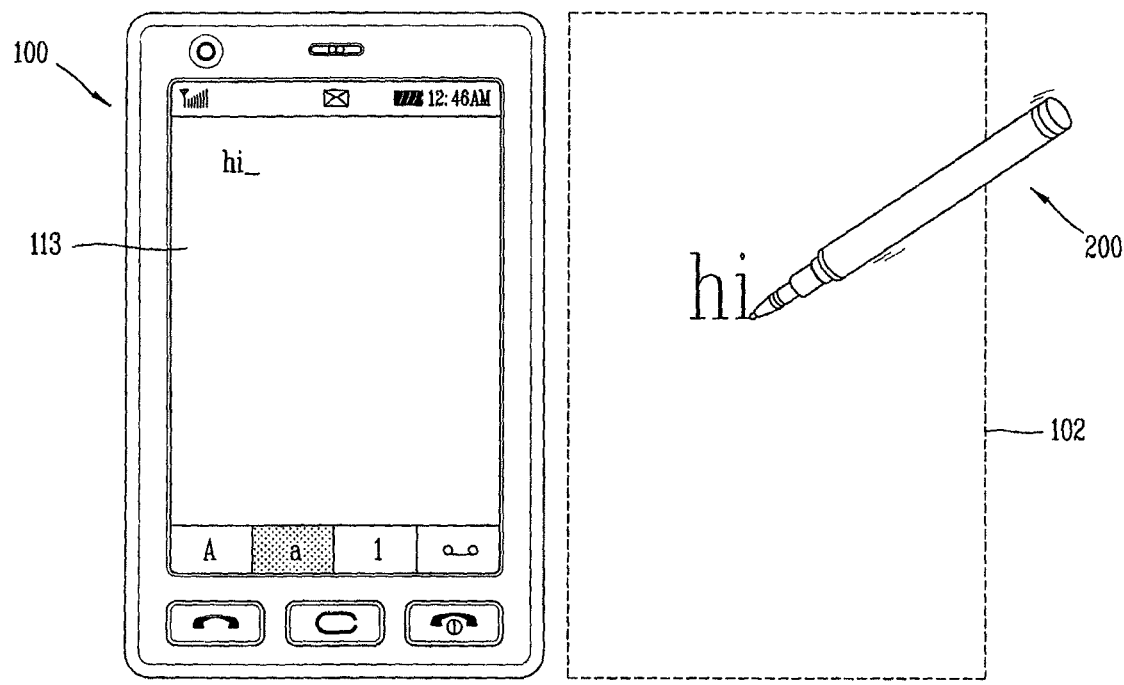
FIGS. 20A and 20B are views respectively showing a method for providing a user interface of a mobile terminal according to another embodiment of the present invention.
Figure 20B:
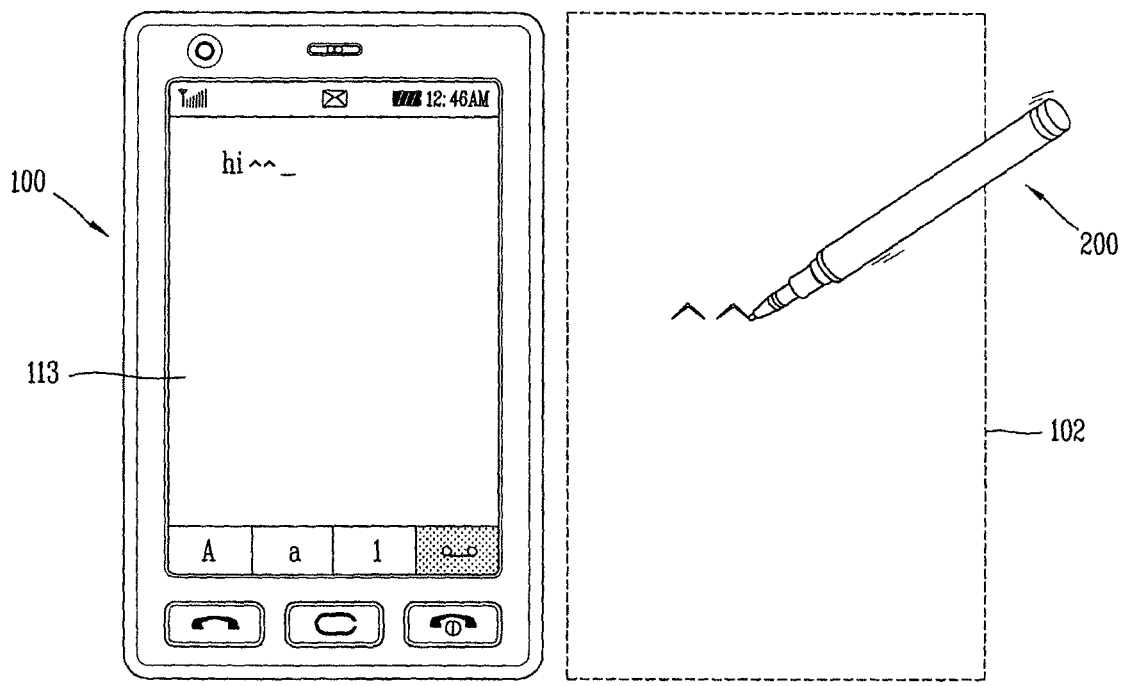

Next, FIGS. 20A and 20B are views respectively showing a method for providing a user interface of a mobile terminal according to another embodiment of the present invention. In this embodiment, the current operation mode is implemented as a text editing mode. Referring to FIGS. 20A and 20B, a text written on the input region 102 is displayed on the display 113 regardless of its type. The type of the text may include English, Korean, numbers, symbols, etc.

Referring to FIGS. 20A and 20B, English alphabets "hi" and symbols "^^" are displayed on the display 113 in a mixed manner. The English alphabets and symbols are sequentially input to the display 113 without an additional command for converting the type of the text on the input region. The controller 117 also identifies a type of text by one of motions of the pen unit 200, and displays text corresponding to the identified type on the display 113. This allows different types of texts to be real-time input without requiring a command for text conversion.

FIGS. 21A to 21D are views respectively showing a method for providing a user interface of a mobile terminal according to another embodiment of the present invention. In this embodiment, the input region 102 serves as a virtual region to which a part of video information displayed on the display 113 can be virtually moved. The input region 102 is implemented as a temporal storage space formed in a virtual manner. Further, in this embodiment, the current operation mode is implemented as an editing mode with respect to menus displayed on the display 113.

Figure 21A:
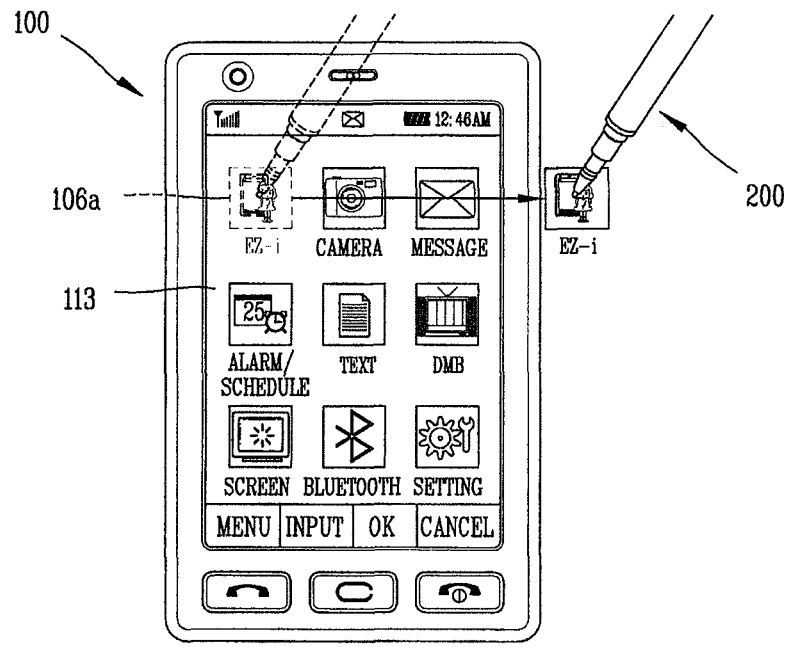
FIGS. 21A to 21D are views respectively showing a method for providing a user interface of a mobile terminal according to another embodiment of the present invention.
Figure 21B:
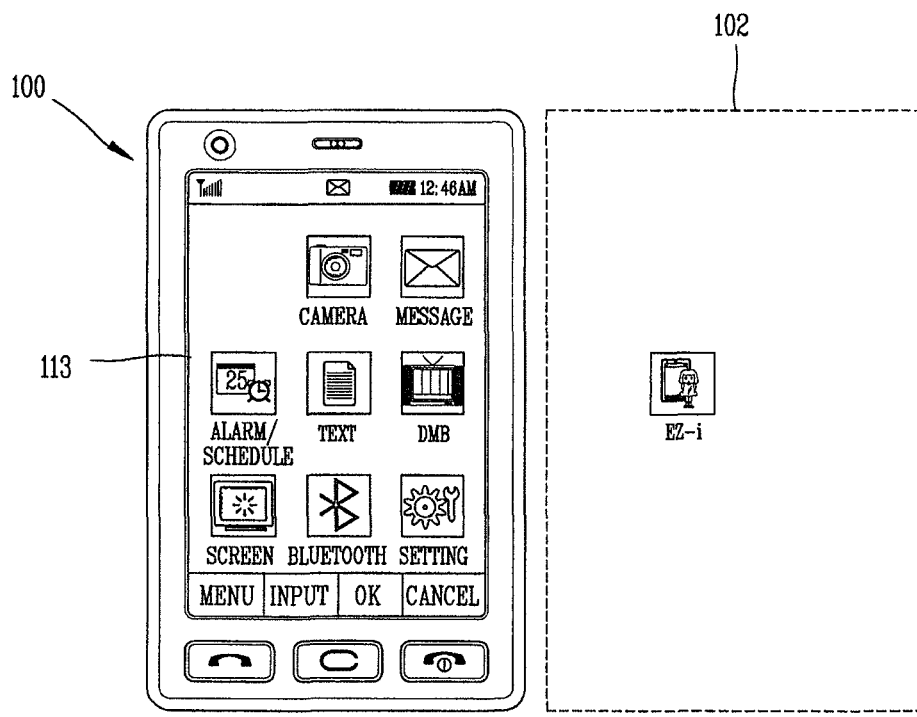

Referring to FIGS. 21A and 21B, menus are displayed on the display 113. The menus include icons each corresponding to an item or function. If the pen unit 200 touches and drags one icon 106a among the icons, the input region 102 is automatically set along the dragging direction and the dragged icon 106a is deleted from the display 113. As shown in FIG. 21D, if the pen unit 200 is dragged toward the display 113 on the input region 102, the icon 106a appears on the display 113.

Figure 21C:
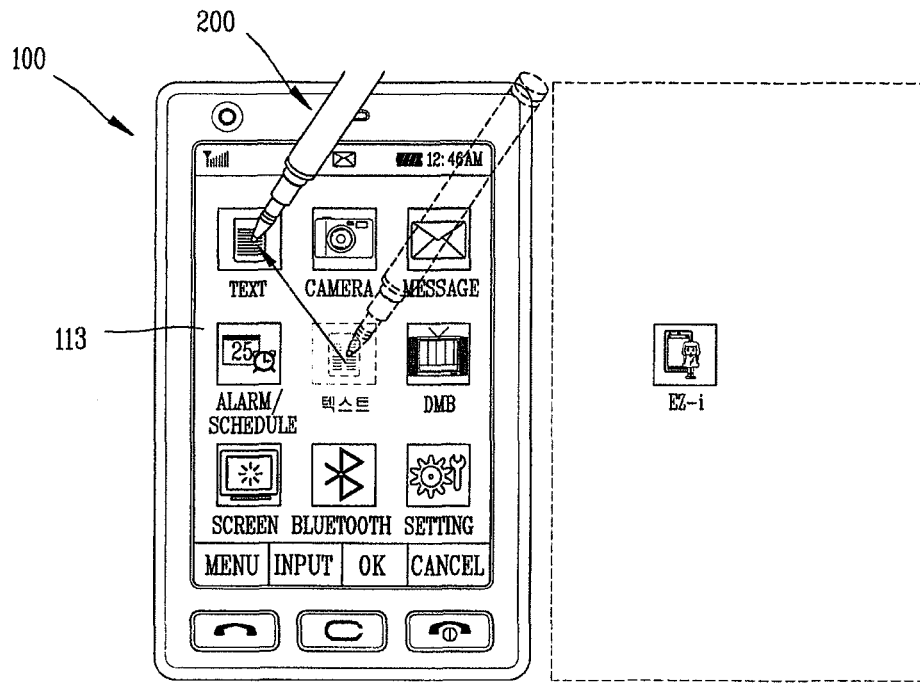
Figure 21D:
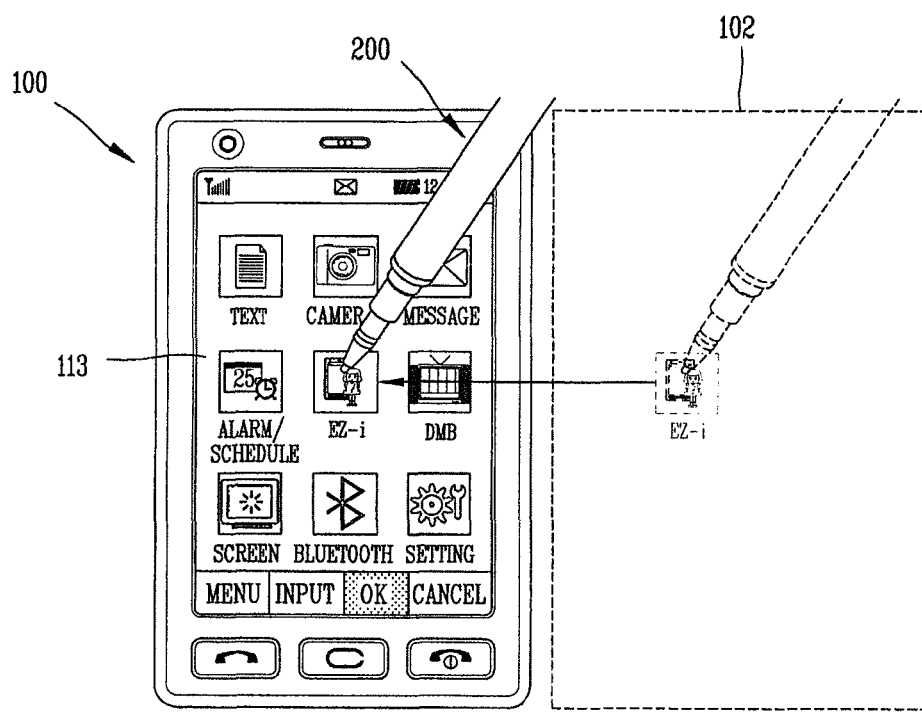

Referring to FIG. 21C, an icon 106b different from the deleted icon 106a may be edited by using the pen unit 200. This editing may correspond to moving the icon 106b. After moving the icon 106b to the position of the deleted icon 106a, the deleted icon 106a may be restored to the position of the moved icon 106b.

Also, to display information such as the icon 106a in the virtual input region 102, the mobile terminal 100 can include a projector module to project the icon into the virtual input region. When the user uses the pen unit 200, the projector module can determine that the projected image has been touched or manipulated, and then operate with the controller 117 to project the icon as if it is being moved back onto the display 113. The camera 151 including a projector chip is one example of a projector module.

Figure 22A:
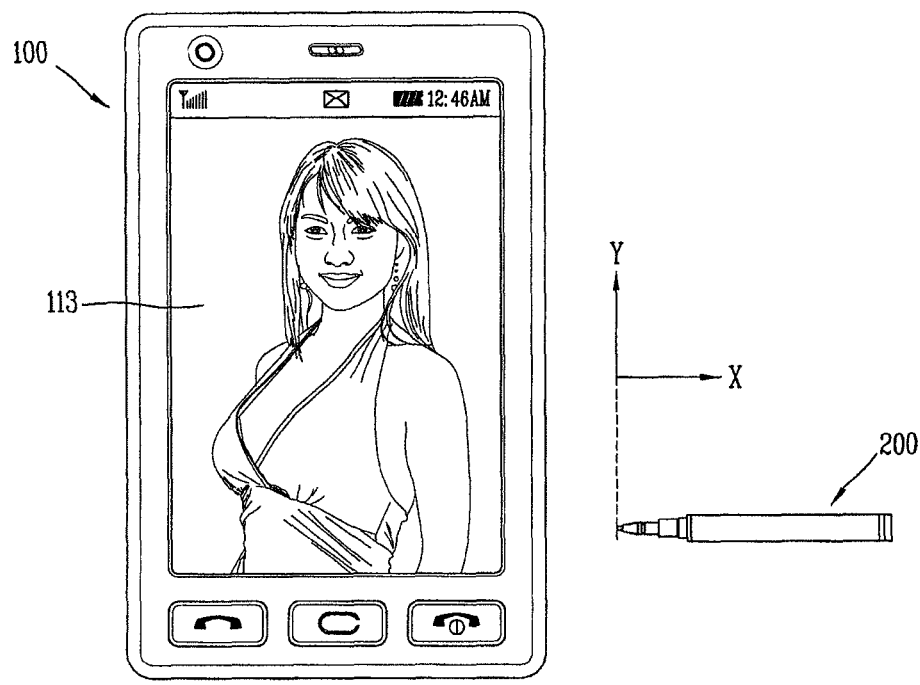
FIGS. 22A and 22B are views respectively showing a method for providing a user interface of a mobile terminal according to another embodiment of the present invention.
Figure 22B:
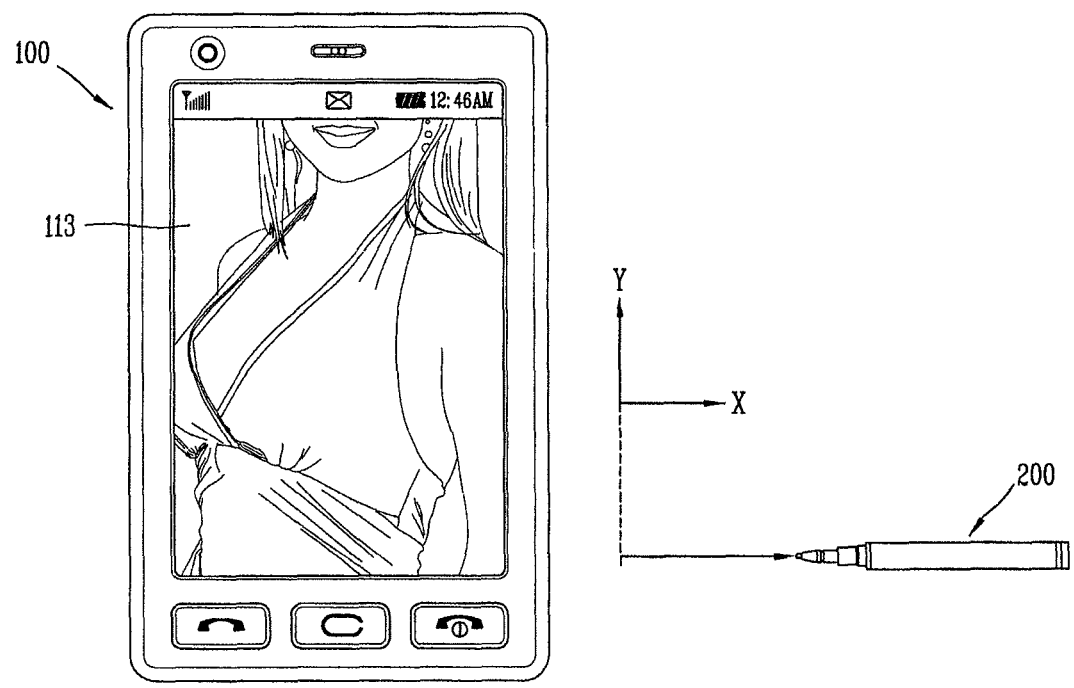

FIGS. 22A and 22B are views respectively showing a method for providing a user interface of a mobile terminal according to another embodiment of the present invention. In this embodiment, motions of the pen unit 200 may match an enlargement or contraction operation of video information displayed on the display 113 and the current operation mode is implemented as a zoom in/out mode. In another embodiment, the displayed image may be moved up/down and/or left/right in response to motions of the pen unit 200.

The X-axis direction indicates a horizontal direction of the mobile terminal 100, whereas the Y-axis direction indicates a vertical direction of the mobile terminal 100. The input region 102 (refer to FIG. 22B) is also formed in parallel to the XY plane. Video information may be enlarged or contracted by the pen unit 200 moving to the X-axis direction. In the zoom in/out mode, the controller 117 determines motions of the pen unit 200 as a command for enlarging or contracting video information. When the pen unit 200 is moved to the X-axis direction to be far from the display 113, video information of the display 113 may be enlarged (refer to FIG. 22B).

FIGS. 23A to 23D are views respectively showing a method for providing a user interface of a mobile terminal according to another embodiment of the present invention. In this embodiment, the current operation mode is implemented as an information search mode.

Figure 23A:
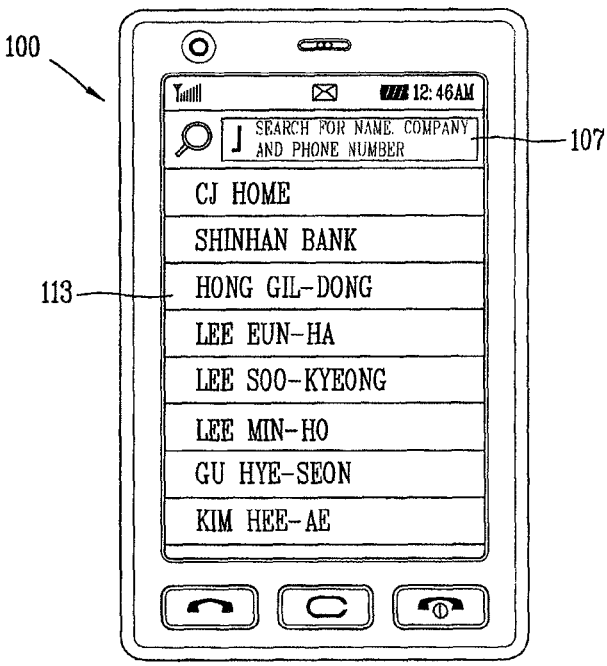
FIGS. 23A to 23D are views respectively showing a method for providing a user interface of a mobile terminal according to another embodiment of the present invention.

Referring to FIG. 23A, an information search window 107 is displayed on the display 113 in the information search mode. A state of the information search window 107 may be converted to an activated state (a state that a search word can be input) by using the pen unit 200. For instance, when the information search window 107 is touched by the pen unit 200, the information search window 107 may be activated, and the input region 102 may be formed at one side of the mobile terminal 100.

Figure 23B:
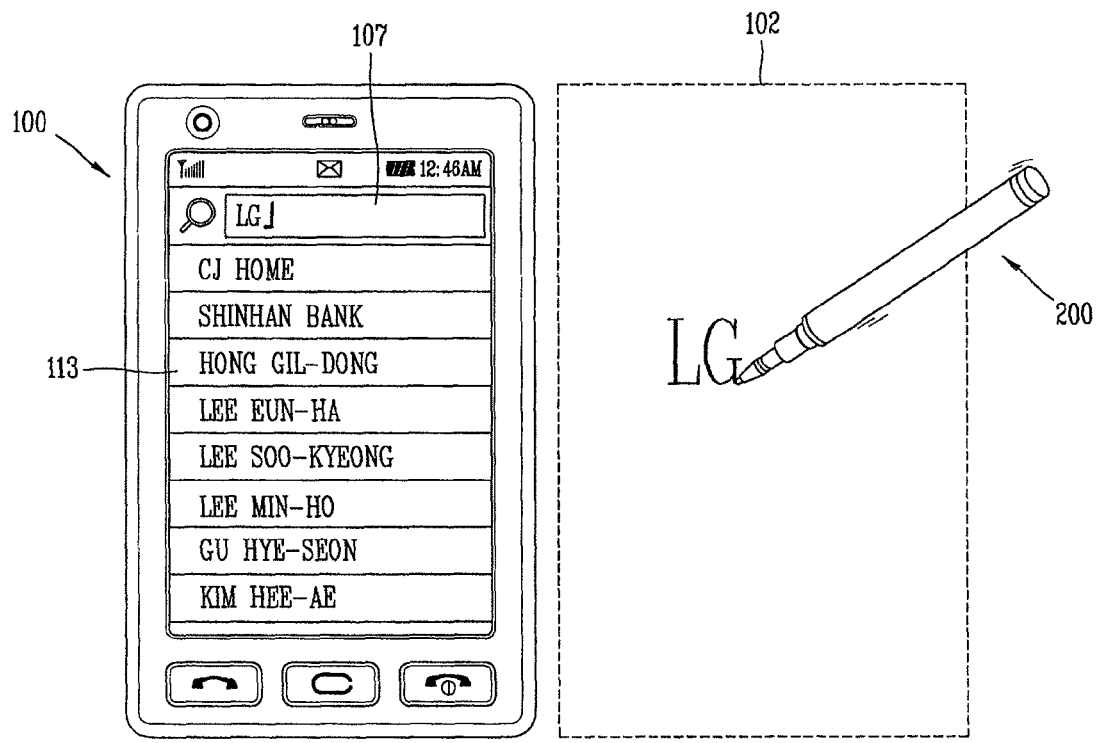
Figure 23C:
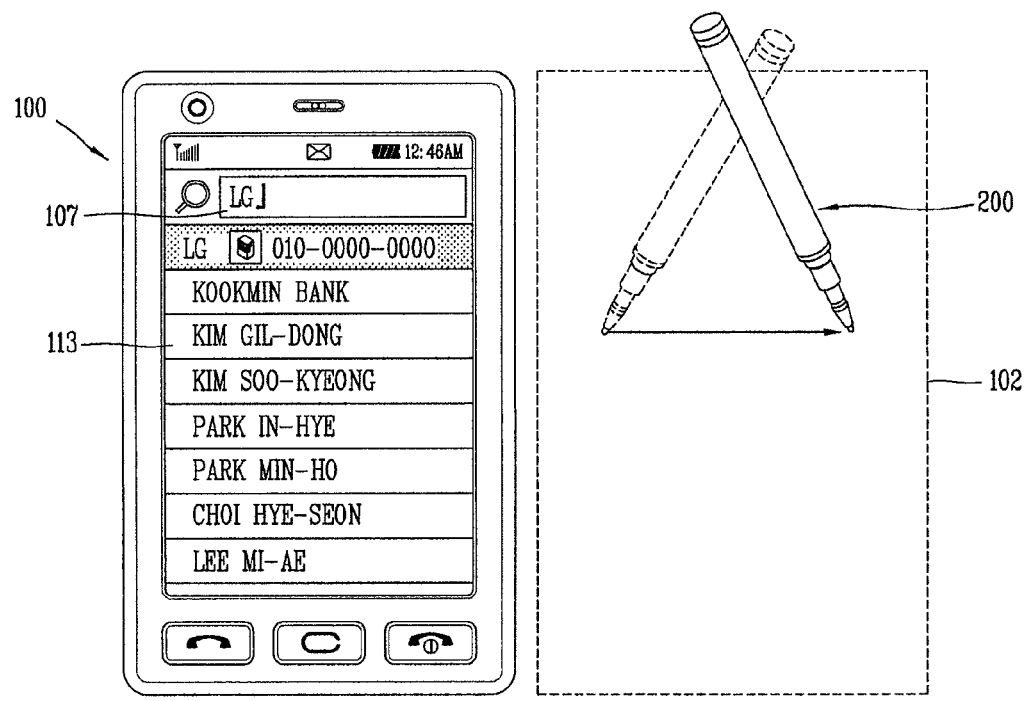
Figure 23D:
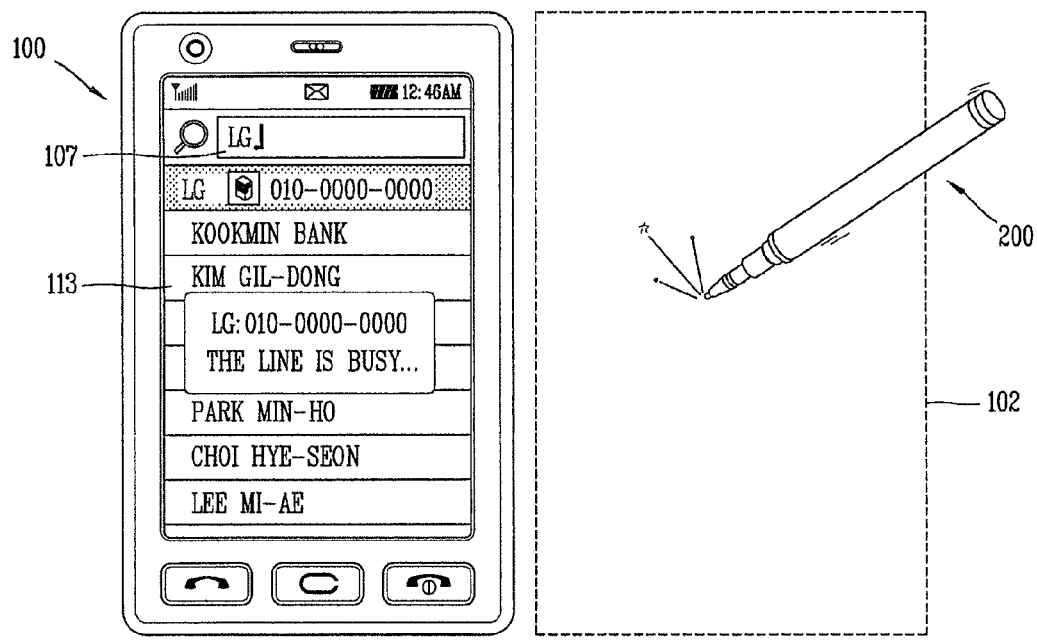

Referring to FIG. 23B, a search word may be input to the information search window 107 by using the pen unit 200 on the input region 102. "LG" written on the input region 102 by the pen unit 200 is input to the information search window 107. Referring to FIG. 23C, if the pen unit 200 is dragged on the input region 102, a phone number search for the written "LG" is performed. This allows the user to more rapidly input a search command. Referring to FIG. 23D, another control command may be input through other motions of the pen unit 200 with respect to a searched result. For instance, if the input region 102 is touched by the pen unit 200, a call connection to a searched phone number is attempted. Through these processes, the user may input communication commands more conveniently.

Figure 24A:
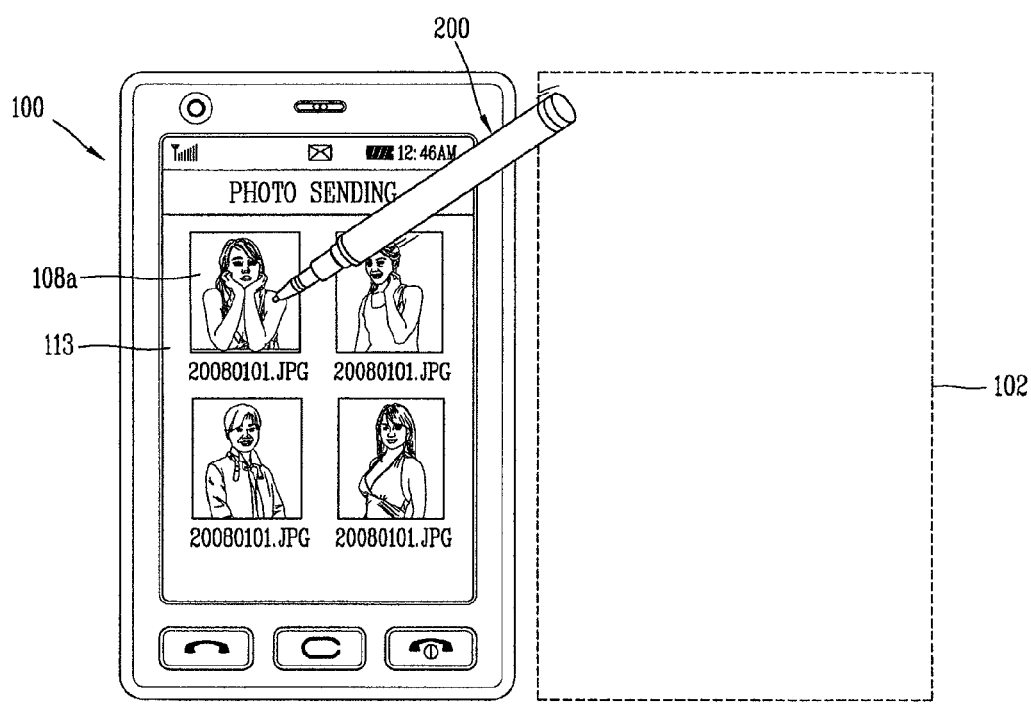
FIGS. 24A to 24C are views respectively showing a method for providing a user interface of a mobile terminal according to another embodiment of the present invention.
Figure 24B:
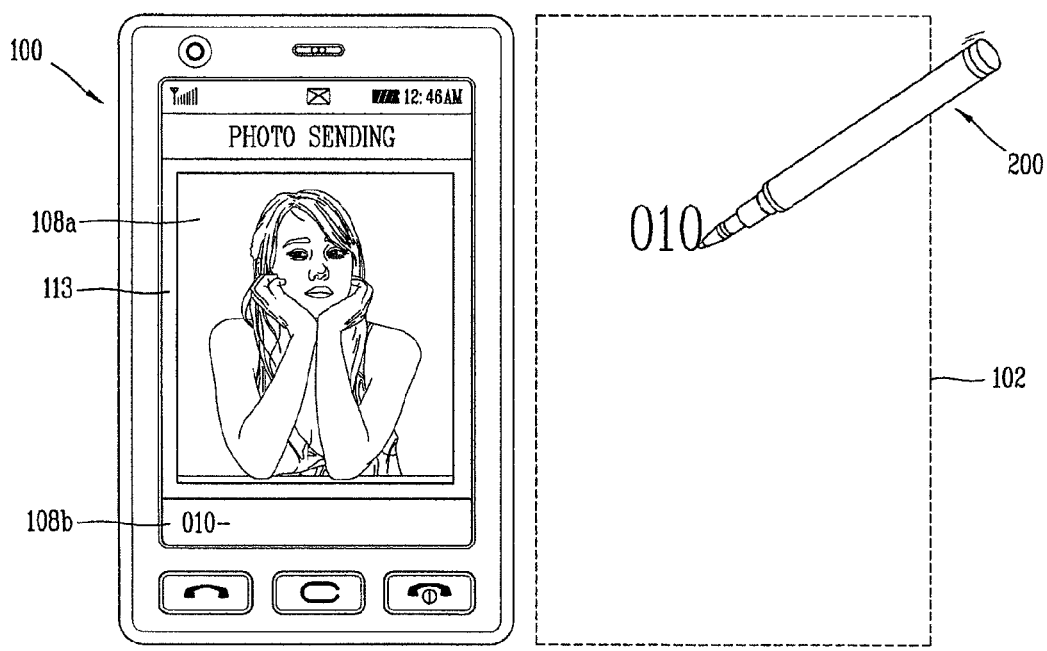
Figure 24C:
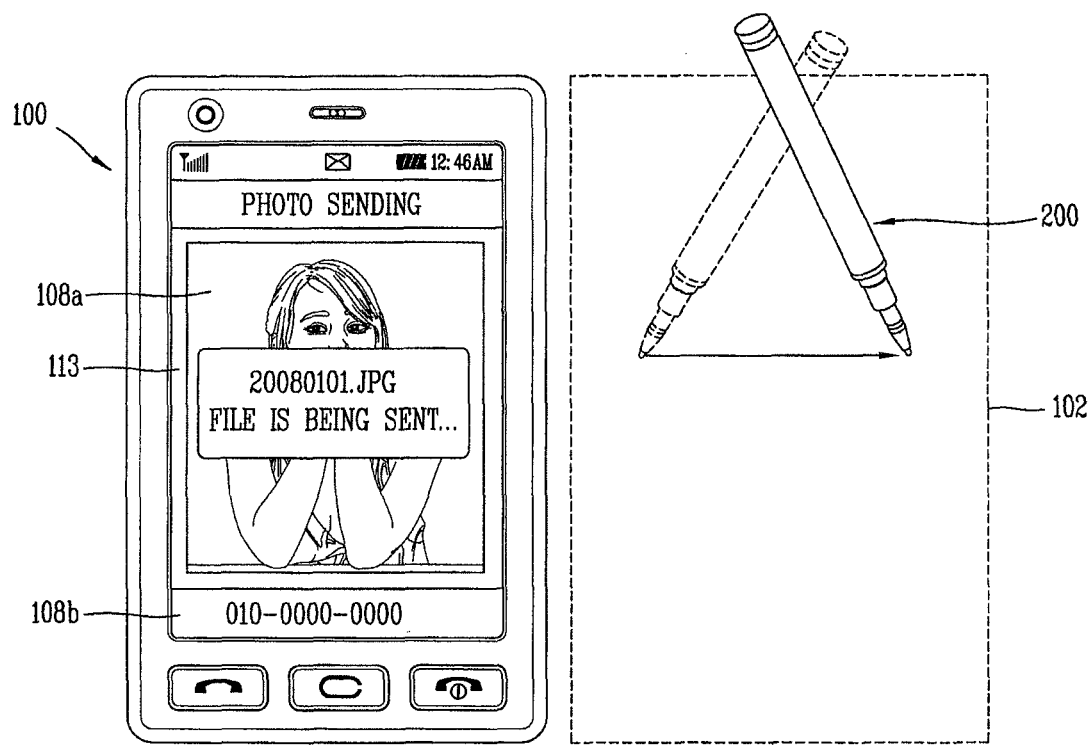

FIGS. 24A to 24C are views respectively showing a method for providing a user interface of a mobile terminal according to another embodiment of the present invention. In this embodiment, the current operation mode is implemented as a mode for sending stored information (e.g., photo sending mode).

Referring to FIG. 24A, information about photo files is displayed on the display 113 in a photo sending mode. Referring to FIG. 24B, if the pen unit 200 touches one file 108a among photo files, an information input window 108b with respect to another mobile terminal to which the photo file is to be sent is activated. Information of other mobile terminal (e.g., a phone number) is then input to the information input window 108b by motions of the pen unit 200.

Referring to FIG. 24C, a file sending command may be input to the input region 102 through motions of the pen unit 200. For instance, if the pen unit 200 is dragged on the input region 102, the file sending command is executed. As aforementioned, a file to be sent is designated on the display 113 and the designated file is sent through motions of the pen unit 200. This allows a user interface to be implemented more conveniently.

Figure 25A:
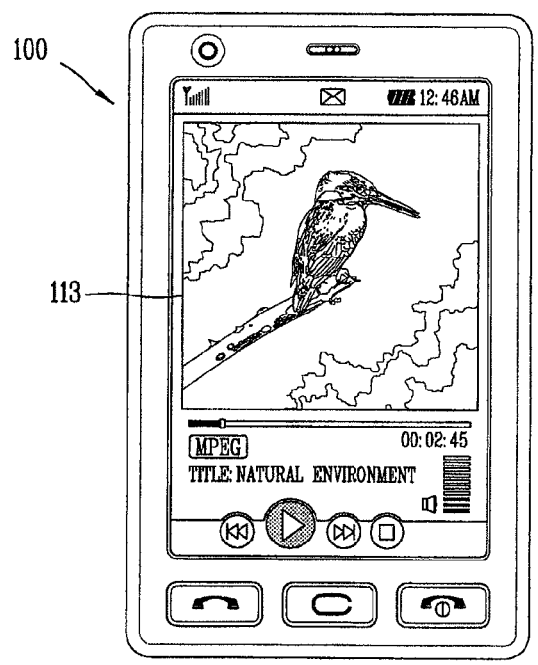
FIGS. 25A to 25C are views respectively showing a method for providing a user interface of a mobile terminal according to another embodiment of the present invention.
Figure 25B:
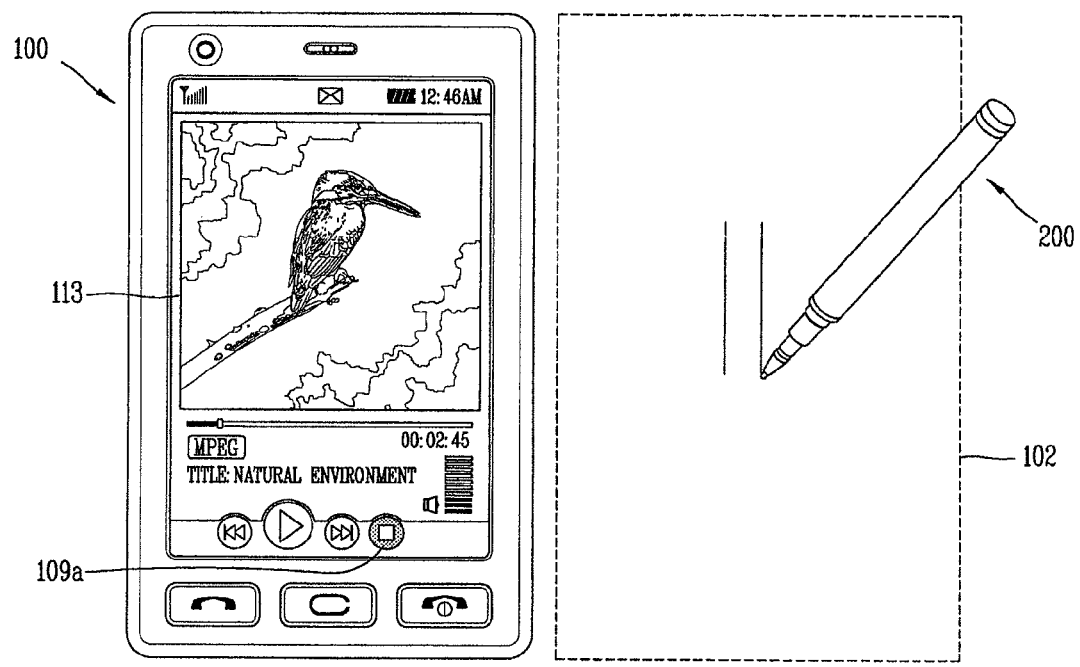
Figure 25C:
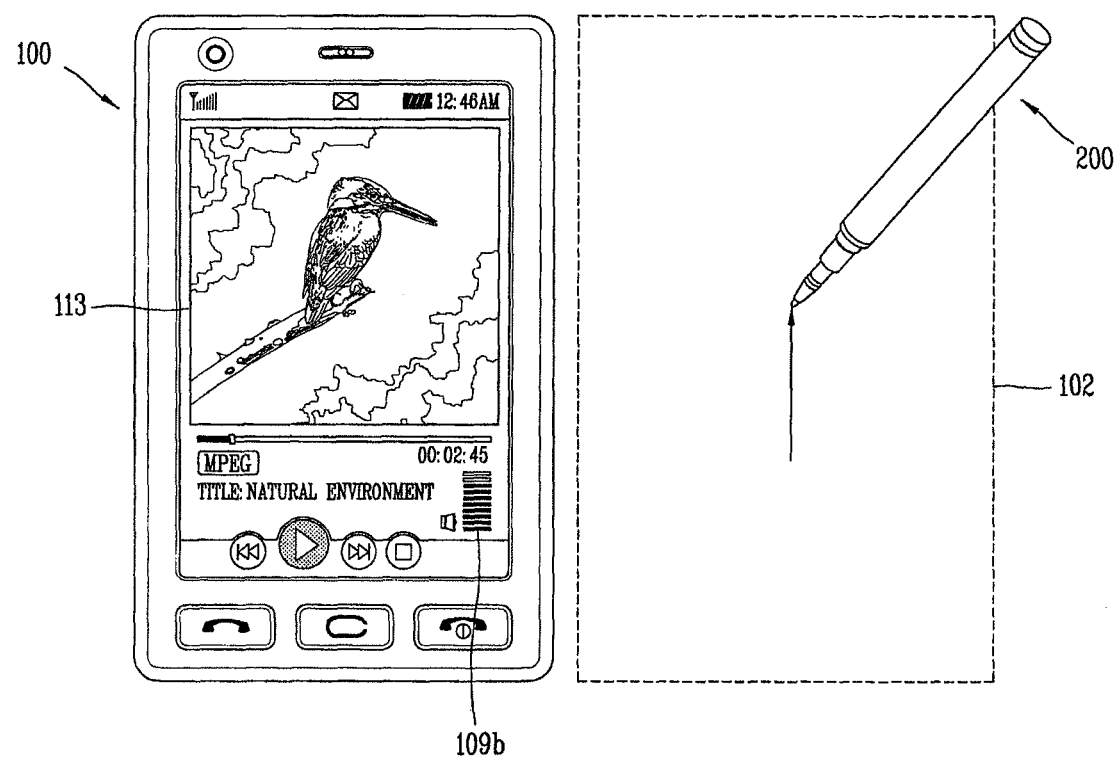

FIGS. 25A to 25C are views respectively showing a method for providing a user interface of a mobile terminal according to another embodiment of the present invention. In this embodiment, the current operation mode is implemented as a moving image reproduction mode, and a control command relating to moving image reproduction is executed through motions of the pen unit 200.

If a specific motion of the pen unit 200 is performed, the controller 117 (refer to FIG. 37) determines to which control command the motion of the pen unit corresponds among control commands related to moving image reproduction. Referring to FIG. 25A, a moving image is being reproduced on the display 113. Referring to FIG. 25B, a moving image stop command is executed by performing a specific motion of the pen unit 200. For instance, a dragging operation consecutively performed in the same direction may correspond to the moving image stop command.

Referring to FIG. 25C, a volume increase command may be executed by performing a specific motion of the pen unit 200. For instance, a dragging operation of the pen unit 200 toward an upper side of the input region can correspond to the volume increase command. Here, a volume display bar 109b visually displays the volume increase or decrease.

Figure 26A:
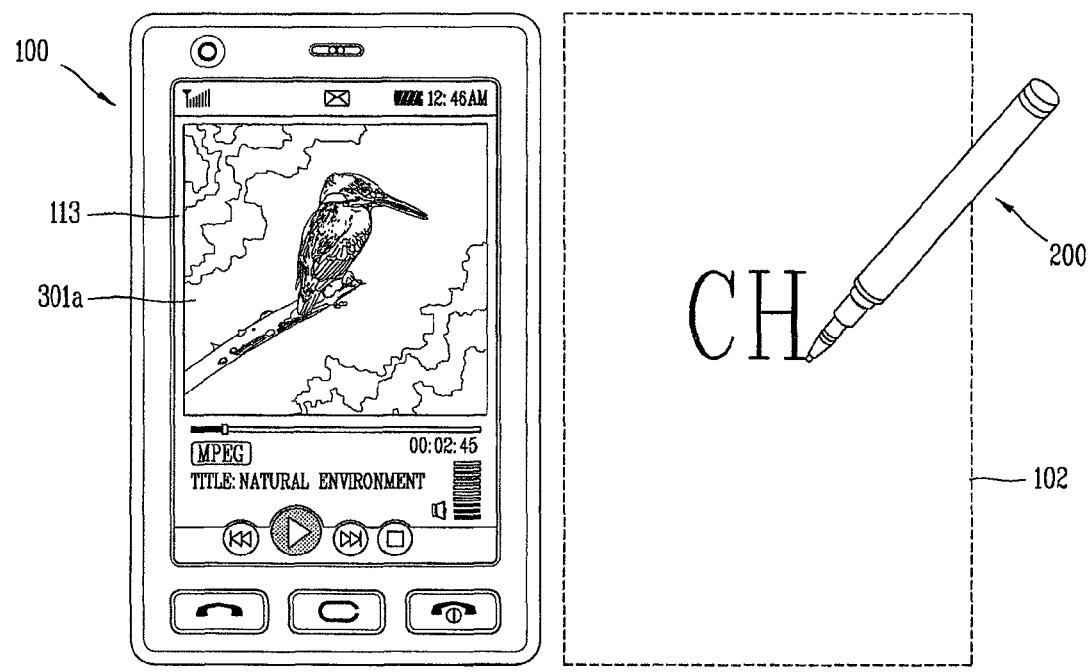
FIGS. 26A to 26C are views respectively showing a method for providing a user interface of a mobile terminal according to another embodiment of the present invention.
Figure 26B:
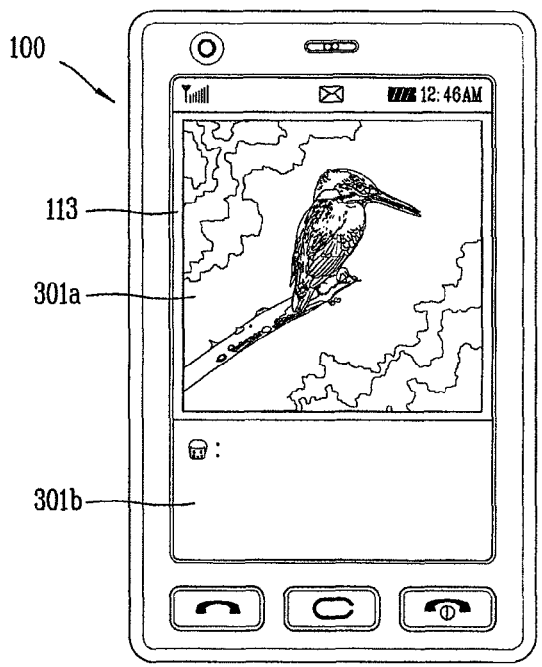
Figure 26C:
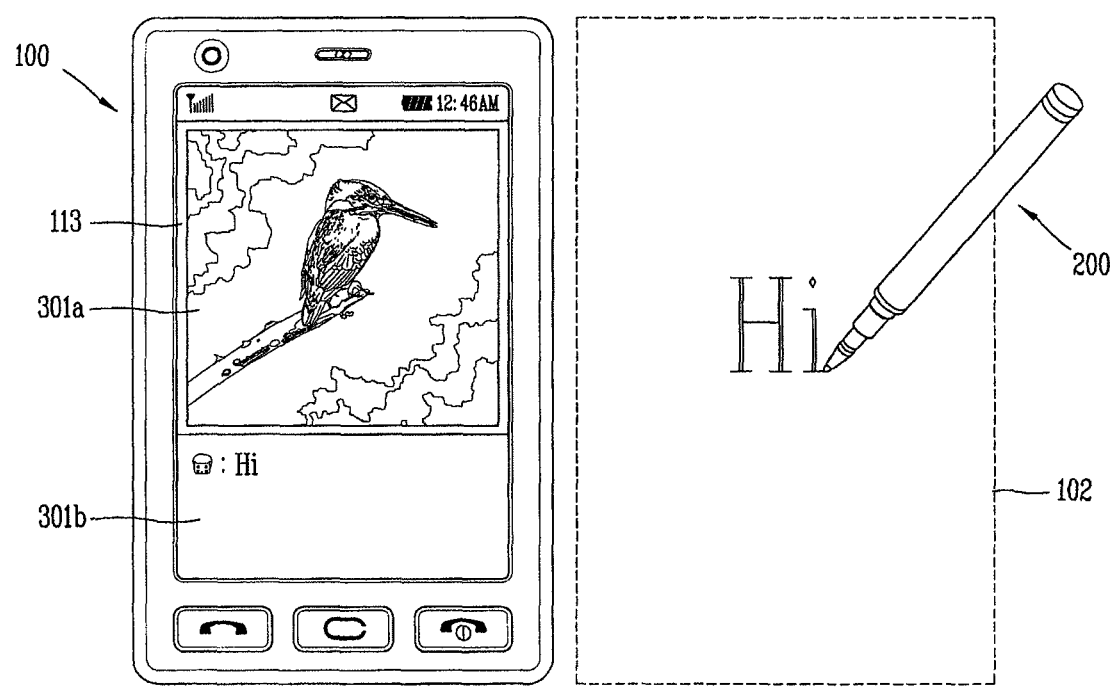

Next, FIGS. 26A to 26C are views respectively showing a method for providing a user interface of a mobile terminal according to another embodiment of the present invention. In this embodiment, the current operation mode is implemented as a moving image reproduction mode, and a chatting mode is implemented by using the pen unit 200. Further, motions of the pen unit 200 for implementing a chatting mode are performed by a representative character or characters indicating the chatting mode such as the character "C" or the characters "CH".

Referring to FIG. 26A, first image information 301a corresponding to a moving image is displayed on the display 113. While the moving image is being reproduced, a chatting mode may be implemented through motions of the pen unit 200. The chatting mode may be implemented while a moving image reproduction mode is being implemented, which is shown in FIG. 26B. Second image information 301b for text input is activated on the display 113 through motions of the pen unit 200. The first and second image information 301a and 301b may be simultaneously displayed on the display 113. For instance, the second image information 301b may be a chatting window. Referring to FIG. 26C, the user can input a text on the chatting window through motions of the pen unit 200.

Figure 27A:
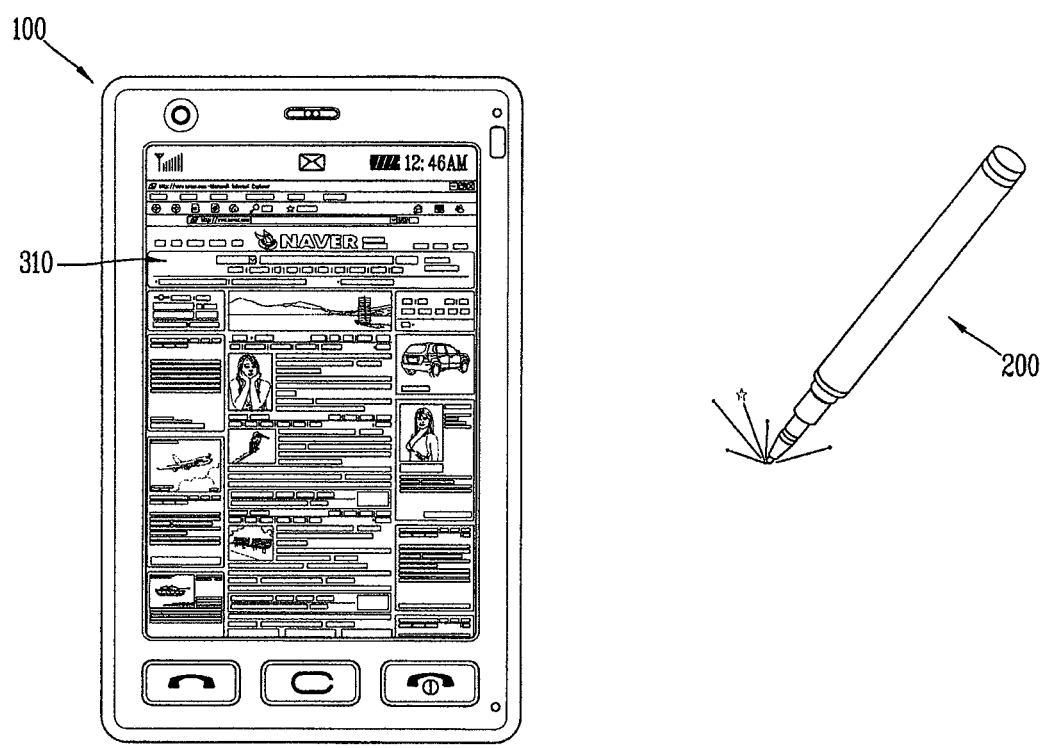
FIGS. 27A to 27E are views respectively showing a method for providing a user interface of a mobile terminal according to another embodiment of the present invention.

FIGS. 27A to 27D are views respectively showing a method for providing a user interface of a mobile terminal according to another embodiment of the present invention. In this embodiment, the current operation mode is implemented as a web browsing mode. Referring to FIG. 27A, a web page 310 for web browsing is output to the display 113.

The input region may be activated through a preset motion of the pen unit 200. For instance, the input region 102 may be set to be activated at one side of the mobile terminal 100 by touching any region on the peripheral region of the mobile terminal 100, by touching a part of the terminal body or the web page, or by manipulating the input key 206 (refer to FIG. 3). The input region 102 may also be set to have a size in proportion to an output region of the web page 310.

Further, the first input region 102-1 and the second input region 102-2 shown in FIG. 6 may be selectively activated. For instance, while controlling the web page 310 by touching the first input region 102-1 with the pen unit 200, the second input region 102-2 may be activated. The first input region 102-1 may be deactivated by touching any region on the peripheral region of the mobile terminal.

If the second input region 102-2 is activated by touching the first input region 102-1 with the pen unit 200, a moving object controllable by the pen unit 200 may be displayed on the web page 310. The moving object may include a pointer 311a (or cursor) for selecting link information on the web page 310 by moving on the web page 310. The input region 102 may be set so that the pen unit 200 can be positioned at a central part of the input region 102. In addition, the pointer 311a may be positioned on a central part of the web page 310. The user may also select a position of the input region 102 by selecting a touch point of the pen unit 200.

Figure 27B:
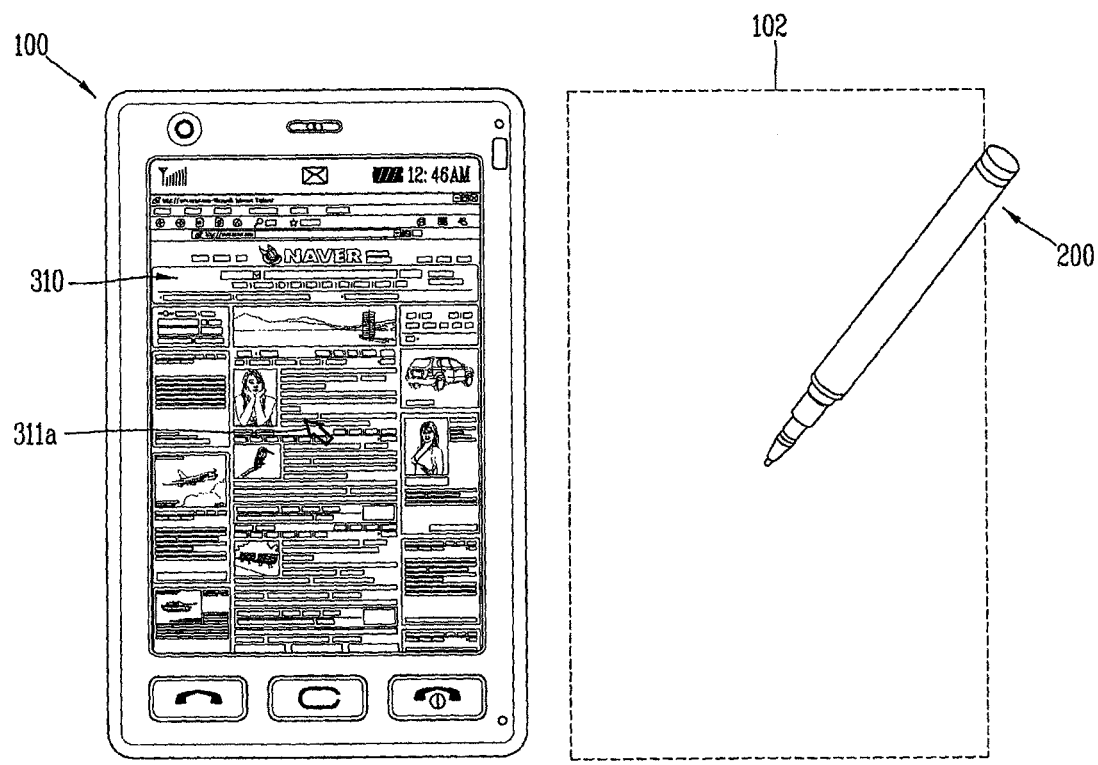
Figure 27C:
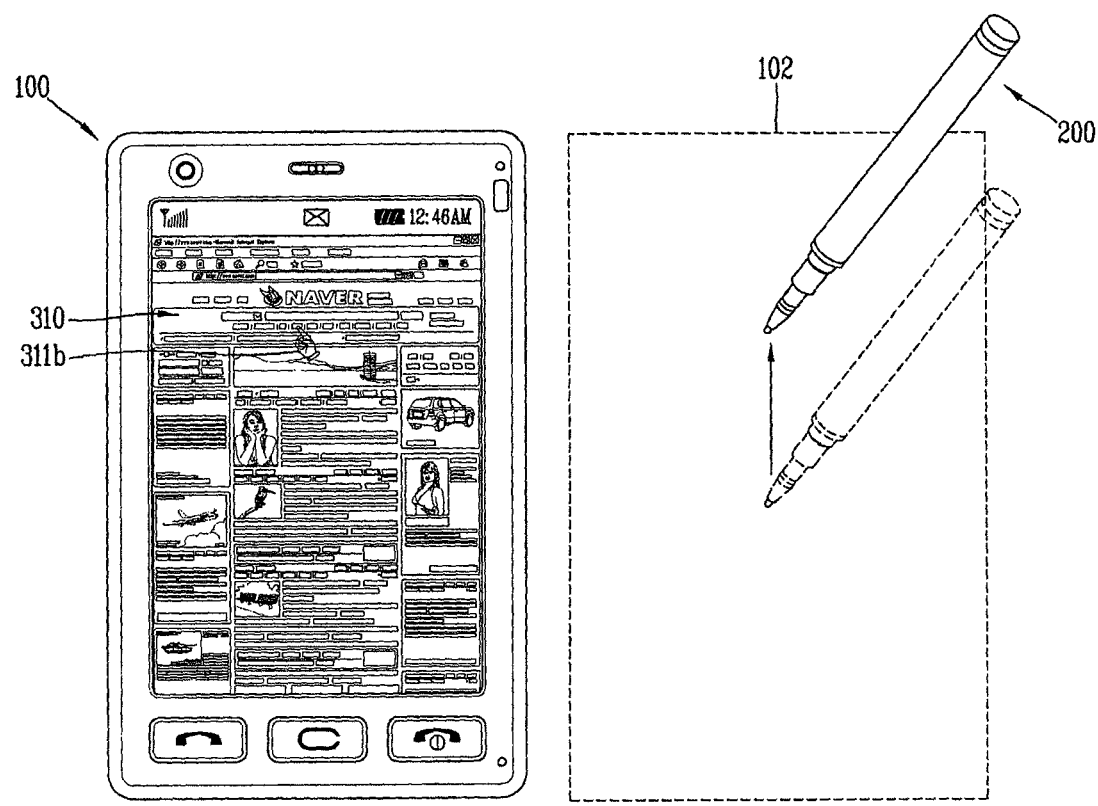

Referring to FIG. 27B, the pointer 311a moves on the web page 310 with a locus corresponding to a locus of the pen unit 200. For instance, if the pen unit 200 is upwardly moved in a state spacing from an object (e.g., paper surface, supporting surface, etc.) (hereinafter, will be referred to as 'proximity motion'), the pointer 311a is also moved toward an upper side of the web page 310. Here, a moving distance of the pen unit 200 may be set in proportion to a moving distance of the pointer 311a. If the pointer 311a is moved to be positioned on a selectable item (e.g., link information) on the web page 310, the pointer 311a may be converted into other type or shape of pointer 311b as shown in FIG. 27C.

An item (e.g., link information, image, etc.) may also be selected or executed through a preset motion of the pen unit 200. For instance, when performing a motion of the pen unit 200 for contacting an object (hereinafter, will be referred to as 'contact motion'), a corresponding item where the pointer is located may be selected or executed. As different motions such as a first motion (e.g., contact motion) and a second motion (e.g., proximity motion) of the pen unit 200 are performed, the web page executes different operations. This may also be applied when controlling the web page in a web browsing mode, and when executing two different operations in a specific operation mode.

At least one of the contact motion and the proximity motion may include a motion that a locus of the pen unit 200 has a specific directivity. The motion having a specific directivity may include dragging, dragging after holding, flicking, swirling, etc. During this operation, a moving direction of the pen unit 200 may include at least one of an upper and lower direction, a right and left direction, and a diagonal direction of the web page 310. At least one of the contact motion and the proximity motion may include motion of the pen unit 200 having a locus, the motion forming at least one of symbols, characters, and numbers.

Figure 27D:
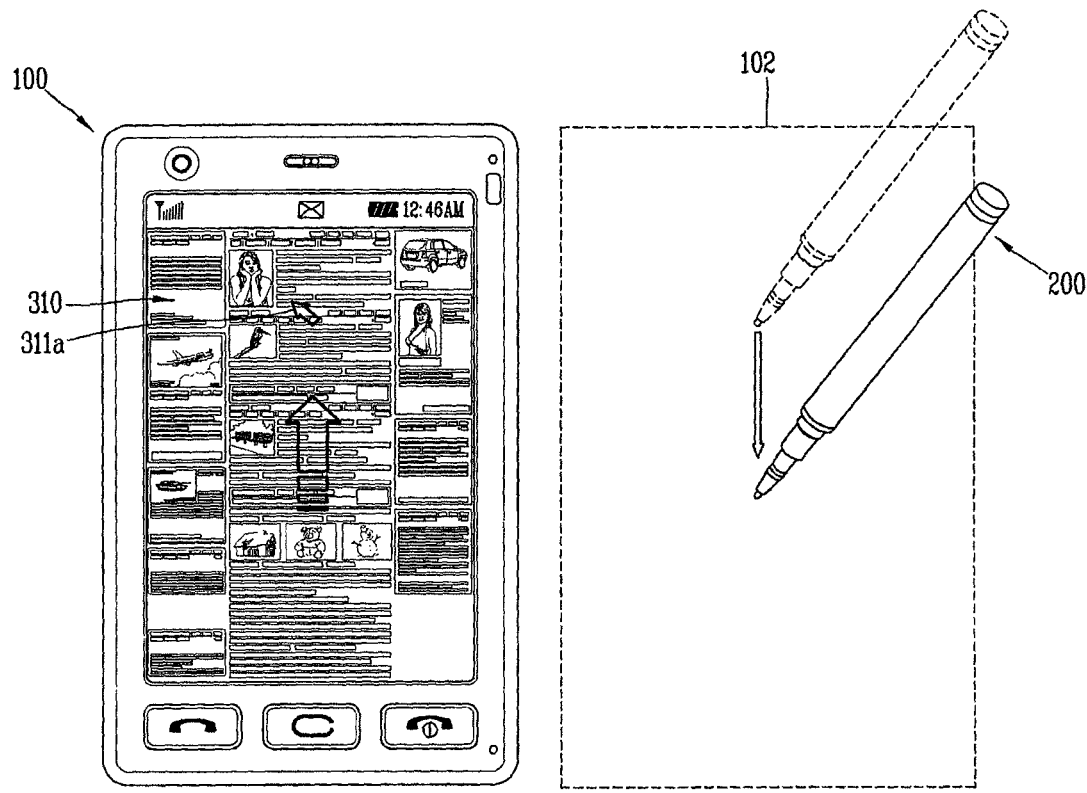

Referring to FIG. 27D, the web page 310 may be set so that at least one part thereof can be scrolled (or moved) with directivity according to a contact motion or a proximity motion. Referring to FIG. 27D, when performing a contact motion toward a lower side of the web page 310 with the pen unit 200, any region on the web page 310 may be upwardly (or downwardly) moved to be displayed on the display 113.

Further, a region downwardly extending from the any region may be displayed on the display 113.

The contact motion of the pen unit 200 may also be variously set, e.g., by downwardly dragging the pen unit 200 after touching a paper surface (after "holding") for a predetermined time with the pen unit 200, or by downwardly flicking the pen unit 200, etc. This input method using the pen unit 200 provides a web browsing and scrolling method that is an improvement over scrolling a wheel of a mouse when performing a web browsing using a personal computer (PC).

Figure 27E:
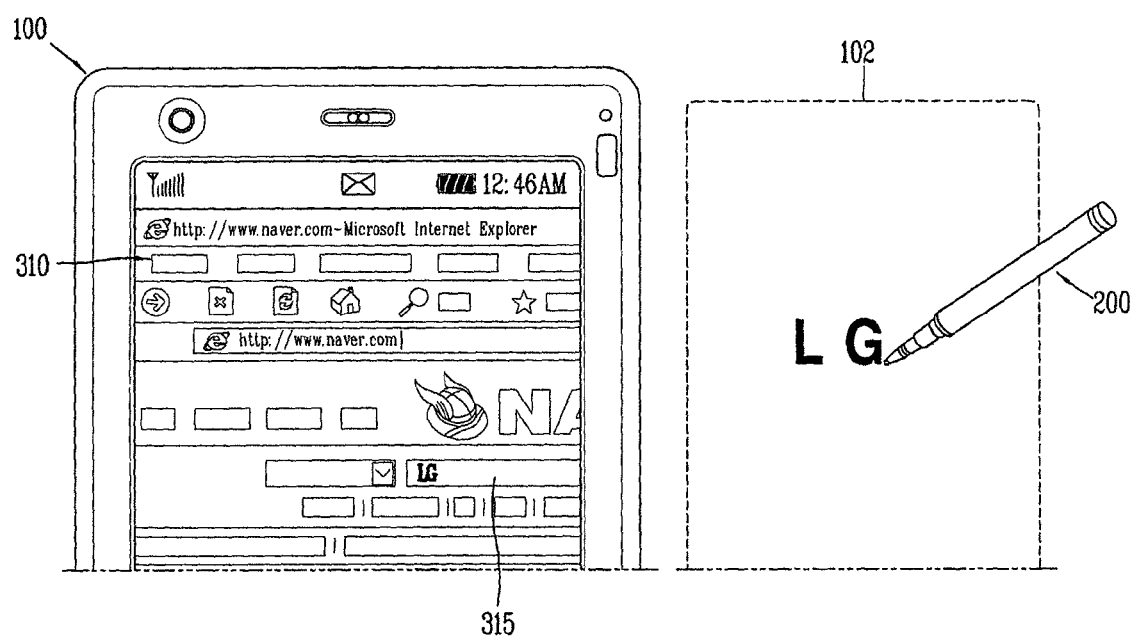

Referring to FIG. 27E, text information may be input to a text input window 315 by performing a contact motion with the pen unit 200. FIG. 27E shows a search window for inputting a search word on the web page 310 for information search (e.g., search engine) as one example of the text input window 315. If the pointer is positioned on the text input window 315 as a proximity motion of the pen unit 200 is performed on a first virtual region (I) or a second virtual region (II), a text input mode of the text input window 315 may be activated. The user may input a search word (e.g., "LG") on the input region 102 by performing a contact motion with the pen unit 200. The search word input by the user is converted into text information, and then is output to the text input window 315.

Figure 28A:
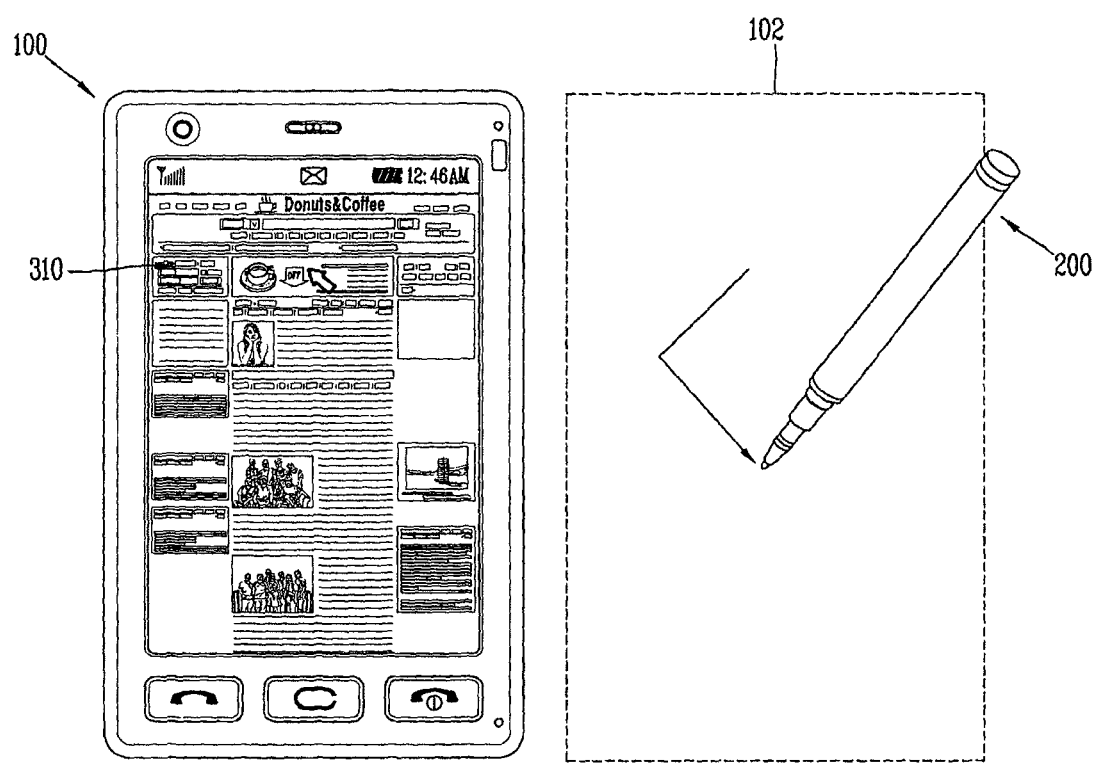
FIGS. 28A and 28B are views respectively showing a method for providing a user interface of a mobile terminal according to another embodiment of the present invention.
Figure 28B:
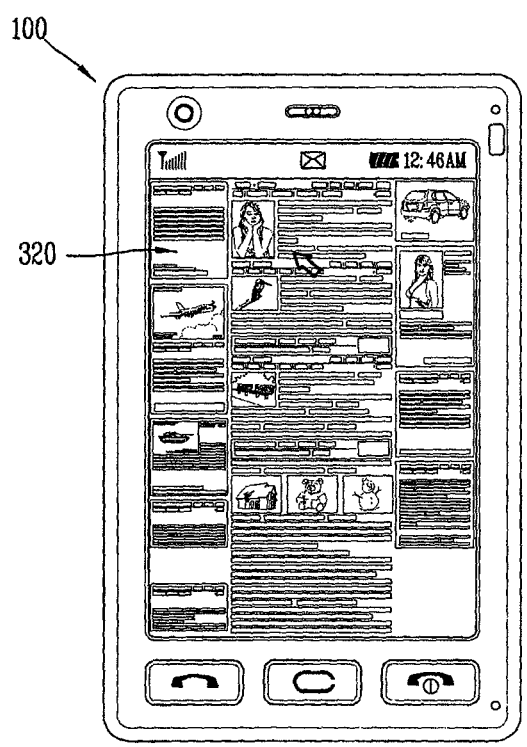

FIGS. 28A and 28B are views respectively showing a method for providing a user interface of a mobile terminal according to another embodiment of the present invention. In this embodiment, the current web page 310 is moved to the previous page or the next page as a specific motion of the pen unit 200 is performed.

In particular, FIG. 28A shows that the web page 310 has been output to the display 113. Further, when touching the peripheral region of the mobile terminal 100 while performing a web browsing by touching the display 113, the input region 102 may be activated. If a contact motion of the pen unit 200 is performed on the input region 102 as shown in FIG. 28A, the previous page 320 of the web page 310 is displayed as shown in FIG. 28B. Referring to FIG. 28A, the contact motion of the pen unit 200 may be set to draw '<'.

The motion of the pen unit 200 may also be variously set according to a control command of the web page 310. For instance, '>' of the pen unit 200 may be set to display the next page, and 'x' may be set as a command for stopping display of the web page 310. The motion of the pen unit 200 for controlling the web page 310 may include at least one of symbols, characters, numbers, and specific shapes.

Figure 29:
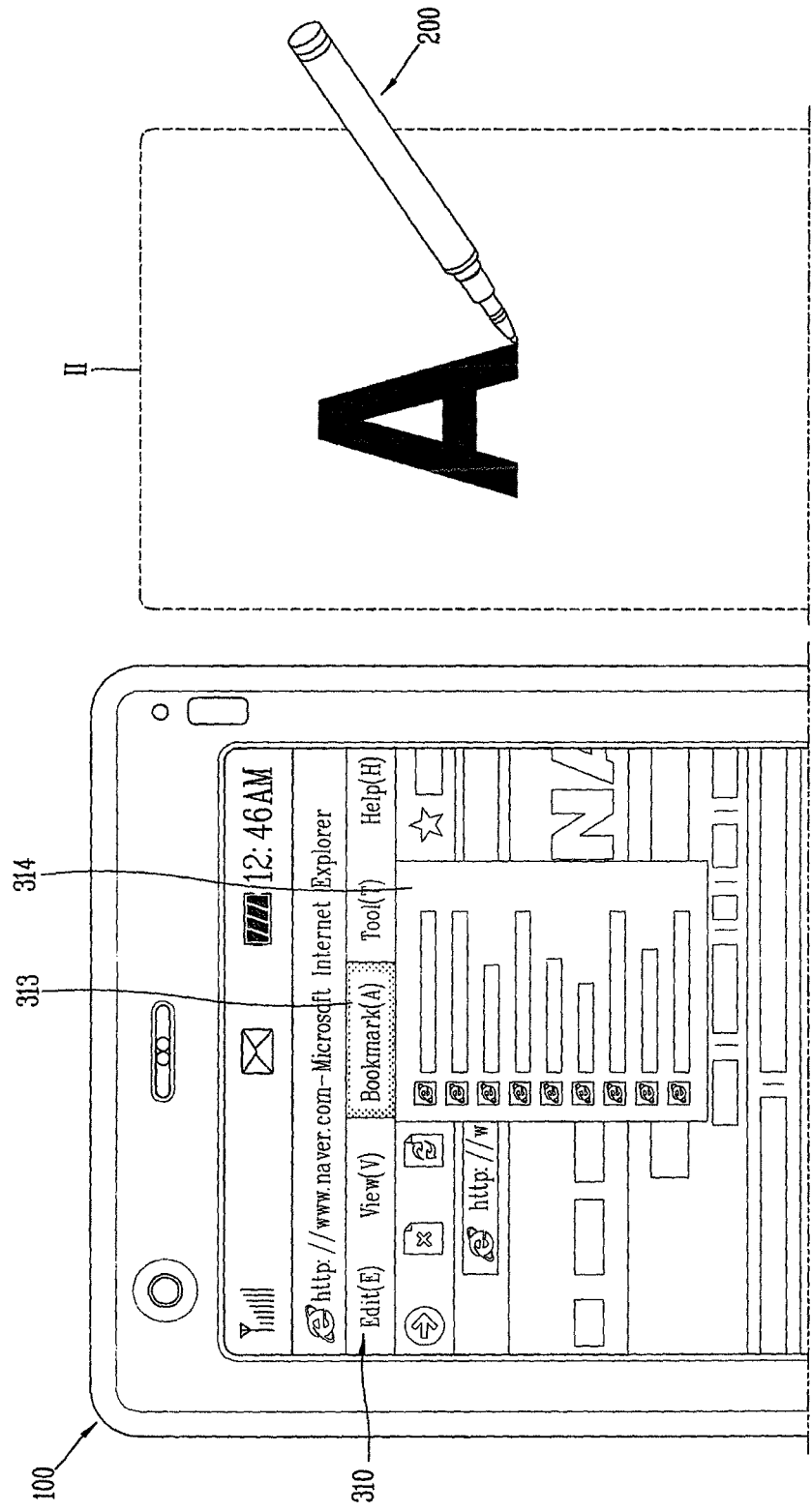
FIG. 29 is a view showing a method for providing a user interface of a mobile terminal according to another embodiment of the present invention.

FIG. 29 is a view showing a method for providing a user interface of a mobile terminal according to another embodiment of the present invention. In this embodiment, lower items 314 of menus 313 on the web page are displayed through motions of the pen unit 200. The displayed menus 313 are for selecting or executing a specific function or address of the web page 310. The lower items 314 of the menus 313 output to the web page 310 may be displayed on the web page 310 through a preset motion of the pen unit 200.

Referring to FIG. 29, the motion of the pen unit 200 for outputting the lower items 314 of the menus 313 may include a contact motion having a specific shape or type of character (e.g., 'A'). If the 'A' is written on the input region 102 by dragging the pen unit 200, the lower items 314 of the menus 313 may be displayed on the web page 310. Under this state, a proximity motion of the pen unit 200 is performed to position the pointer 311a on a specific item, and then a contact motion of the pen unit 200 is performed by touching one point of the input region 102. As a result, a corresponding item may be selected or executed.

Figure 30A:
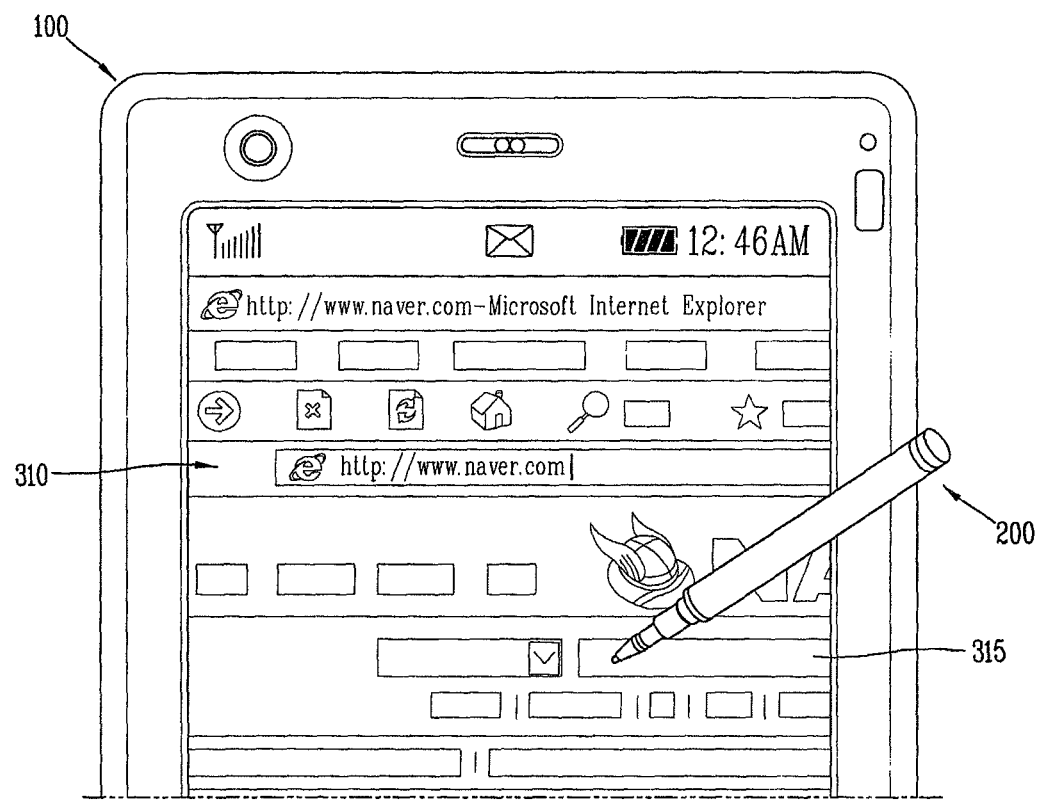
FIGS. 30A and 30B are views respectively showing a method for providing a user interface of a mobile terminal according to another embodiment of the present invention.
Figure 30B:
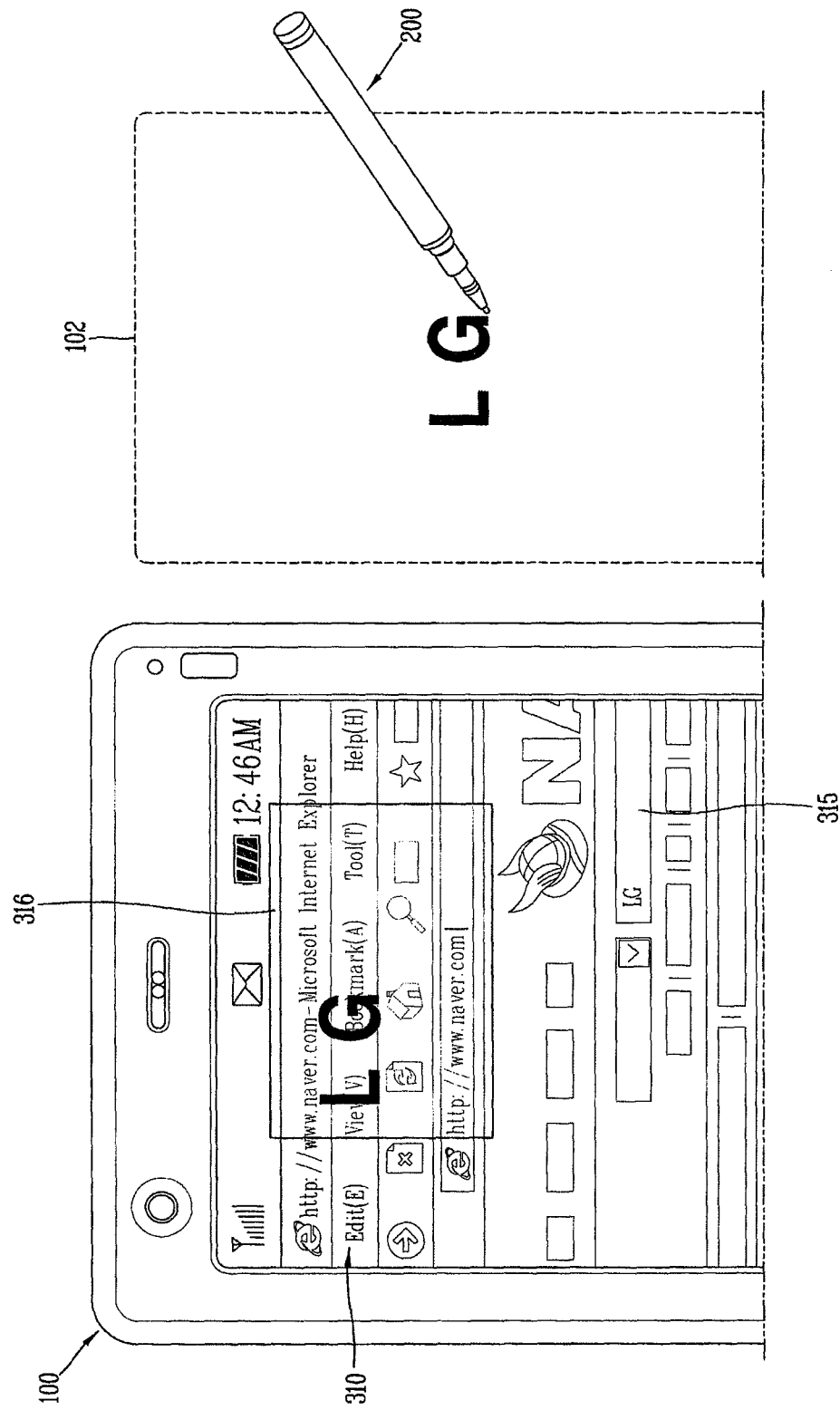

FIGS. 30A and 30B are views respectively showing a method for providing a user interface of a mobile terminal according to another embodiment of the present invention. In this embodiment, an input window on the web page is selected, and motion information of the pen unit 200 matches the input region. Referring to FIG. 30A, a text input window 315 is implemented as an input window on the web page 310. In this example, the text input window 315 is a search window for inputting a search word onto the web page 310 (e.g., search engine) for information search. The text input window 315 may be selected in various manners.

As the text input window 315 is selected, a text input mode (or text editing mode) for inputting a text to the mobile terminal 100 is executed. For instance, the text input window 315 may be selected by directly touching the text input window 315 with the pen unit 200, by performing a proximity motion of the pen unit 200 on the input region 102 so as to position the pointer on the text input window 315 and then by performing a contact motion of the pen unit 200, etc.

Further, FIG. 30A shows that the text input window 315 is selected by directly touching the text input window 315 with the pen unit 200. Referring to FIG. 30A, as the text input window 315 is selected, a text input mode is automatically executed. The text input mode may be executed by a preset specific motion of the pen unit 200. Referring to FIG. 30B, while the text input mode is executed, the input region 102 for inputting a text may be activated. The user may then write a search word (e.g., "LG") on the input region 102 through a contact motion of the pen unit 200. An output window 316 for displaying information corresponding to a locus of the pen unit 200 can also be displayed on the web page 310.

The information corresponding to a locus of the pen unit 200 may be converted to text information, and the converted text information may be displayed on the text input window 315. That is, text information input with the pen unit 200 matches the text input window 315. The user may complete the text input through a preset motion of the pen unit 200, e.g., by re-touching the text input window 315 with the pen unit 200, or by touching one point on the input region 102.

Figure 31A:
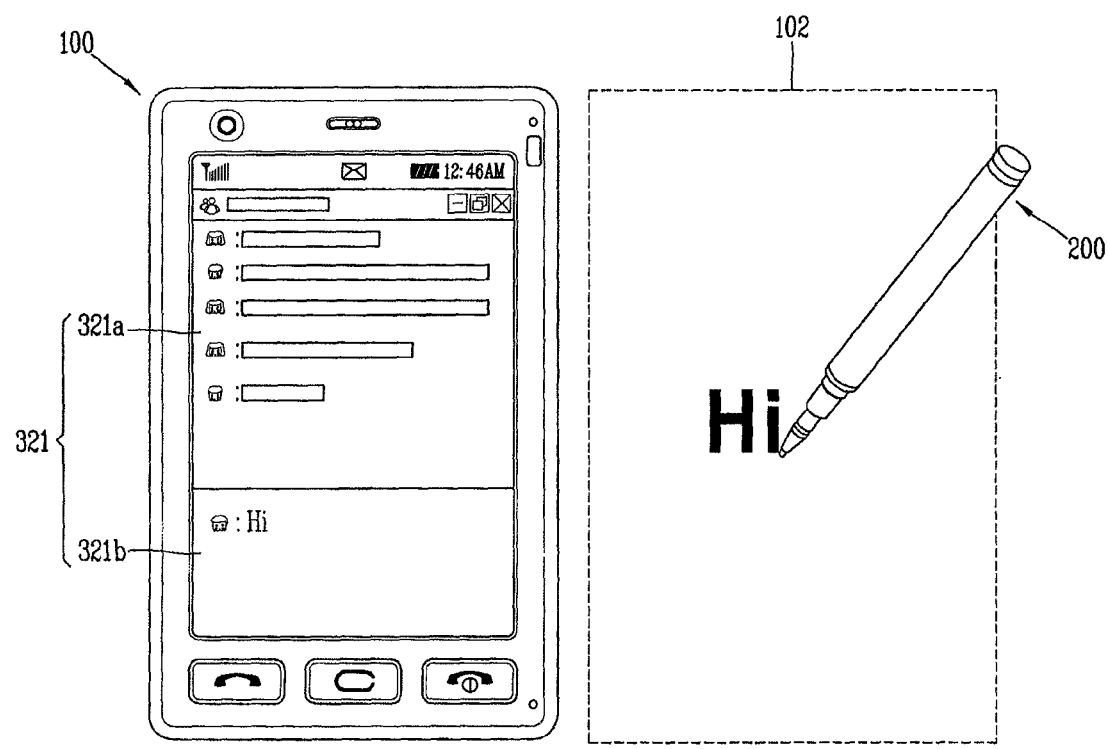
FIGS. 31A to 31C are views respectively showing a method for providing a user interface of a mobile terminal according to another embodiment of the present invention.
Figure 31B:
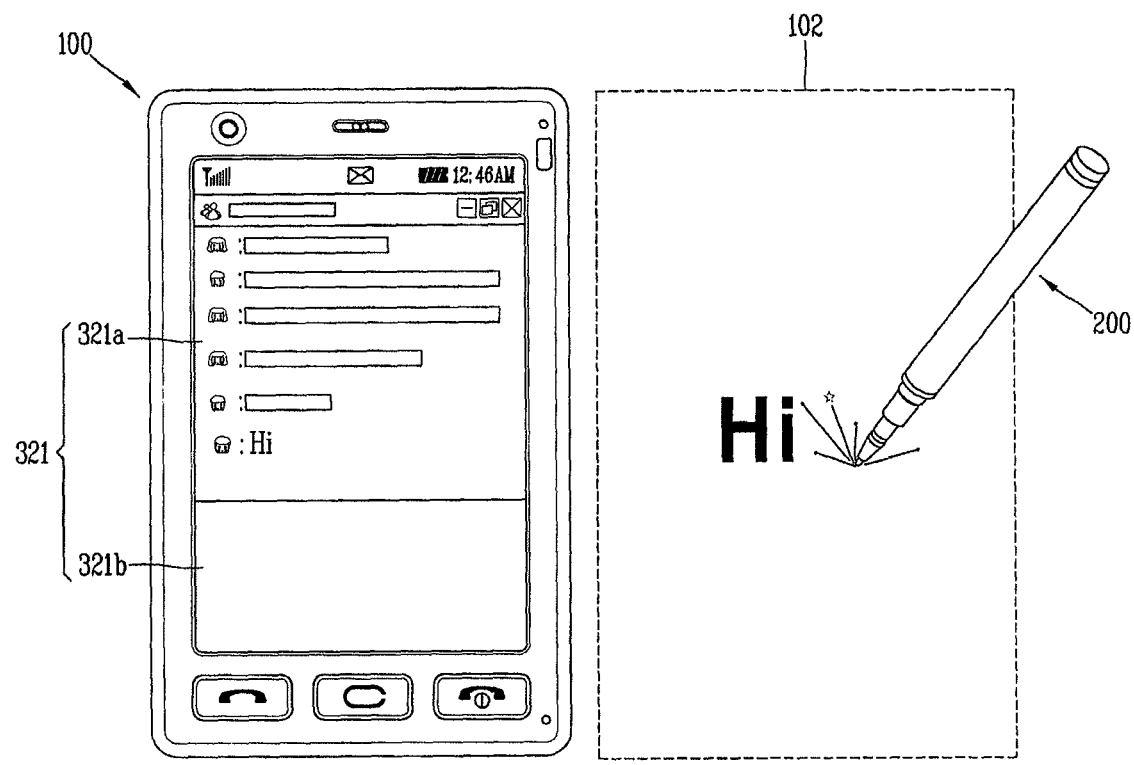
Figure 31C:
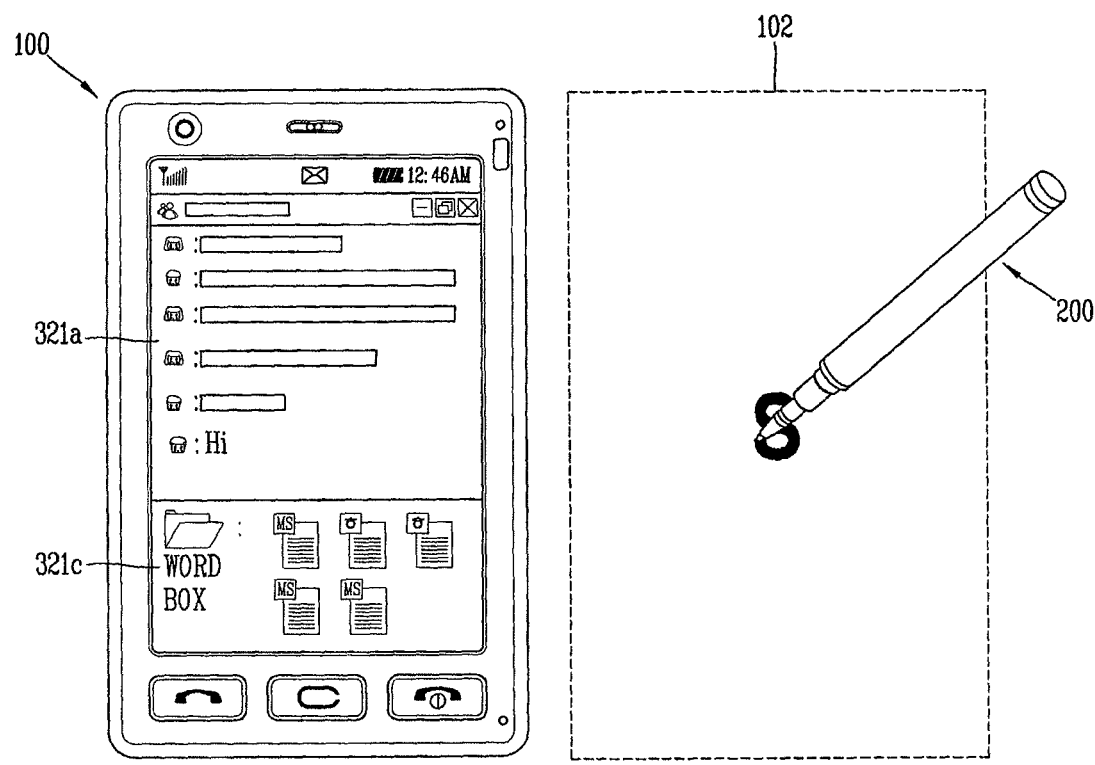

FIGS. 31A to 31C are views respectively showing a method for providing a user interface of a mobile terminal according to another embodiment of the present invention. In this embodiment, a screen 321 for web chatting is displayed on the display 113 as the current operation mode. Referring to FIG. 31A, an output window 321a for displaying conversation content (chatting content) between the user and a call party, and an input window 321b for inputting a message by the user may be output to the display 113. The user may input conversation content by touching soft keys output to the display 113, or through writings using the pen unit 200.

The input region 102 may be activated by touching the input window 321b with the pen unit 200, or by touching one point on the peripheral region of the mobile terminal with the pen unit 200. And, a text input mode (or writing mode) may be executed by using the pen unit 200. If the pen unit 200 makes a contact motion corresponding to a text to be input (e.g., "Hi") on the input region 102, information corresponding to a locus of the pen unit 200 is converted to text information thus to be displayed on the input window 321b. Referring to FIG. 31A, the text information ("Hi") written by the user is displayed on the input window 321b.

Referring to FIG. 31B, if a specific motion of the pen unit 200 is performed as the user touches one point of the input region 102 with the pen unit 200, etc., text information output to the input window 321b is displayed on the output window 321a. This may be implemented as the mobile terminal 100 is set so that a specific motion of the pen unit 200 is allocated to a value of an 'ENTER' key. The mobile terminal 100 may be set so that a specific motion of the pen unit 200 can be allocated to a specific key value for text input. The mobile terminal 100 may be also controlled so that an operation mode relating to web browsing can be executed through a preset motion of the pen unit 200.

Referring to FIG. 31C, if a specific motion of the pen unit 200 is performed during a web chatting, a file sending mode for sending a file to a call party may be executed on the web page. For instance, if an 'S' is written on the input region 102 through a contact motion of the pen unit 200, a file sending window 321c for file sending may be activated.

The operation mode executed through a preset motion of the pen unit 200 may include not only an operation mode relating to a web browsing such as a text editing mode and an image editing mode, but also an operation mode relating to an operation of the mobile terminal such as a call mode, a text message transmission/reception mode, and a multimedia mode.

Figure 32A:
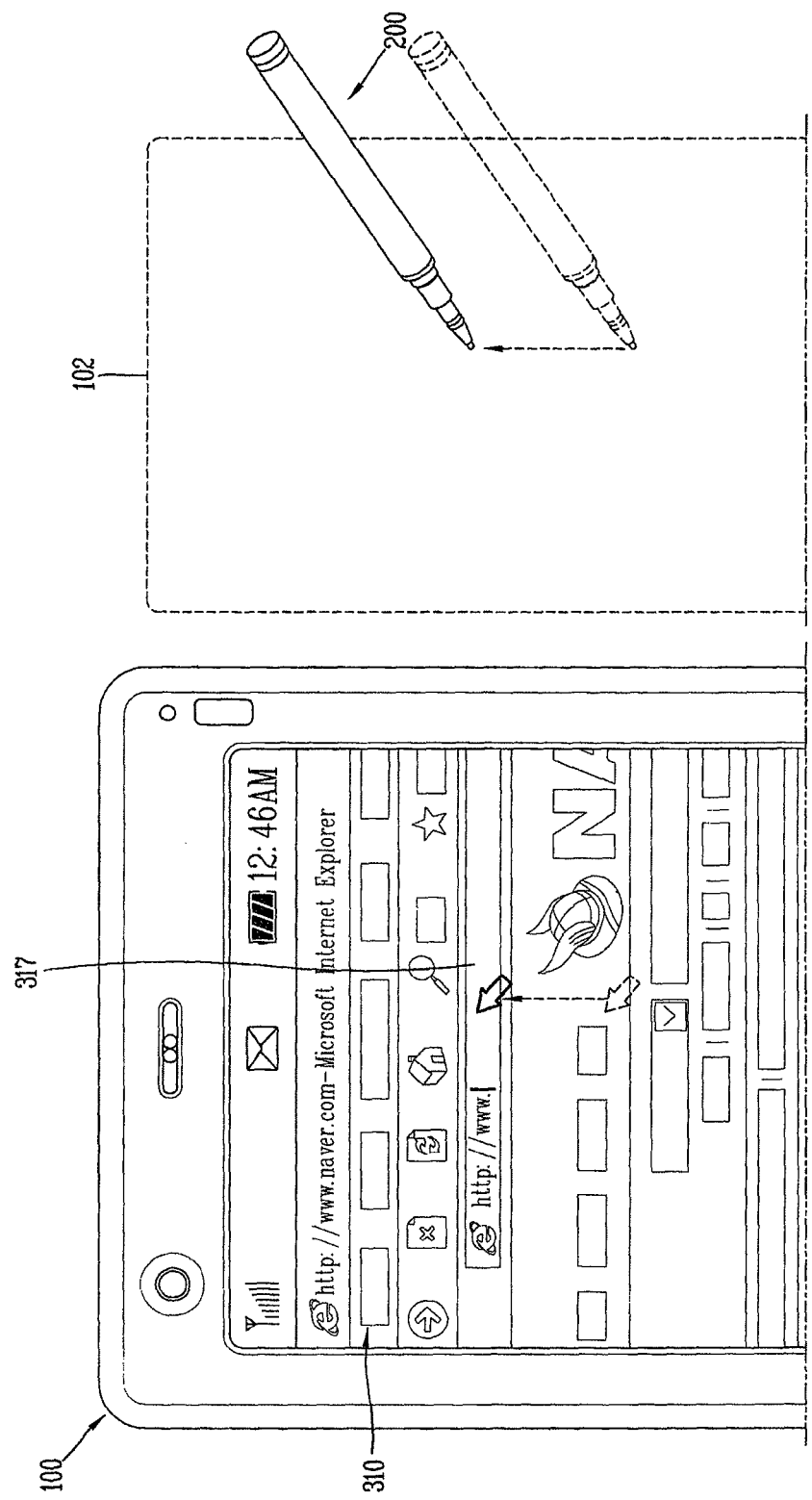
Figure 32B:
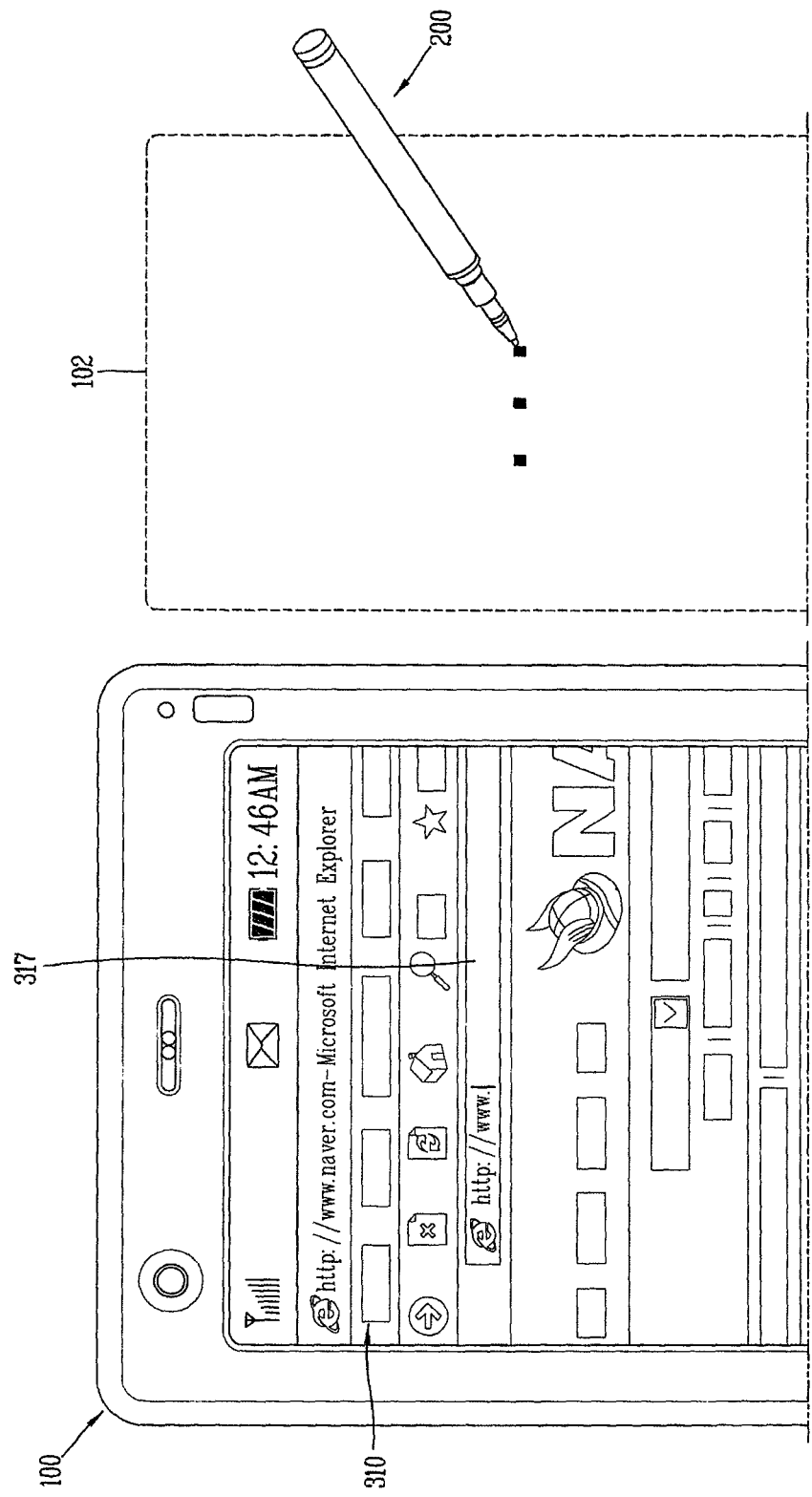

FIGS. 32A to 32C are views respectively showing a method for providing a user interface of a mobile terminal according to another embodiment of the present invention. In this embodiment, an input window relating to a web browsing output to the web page is selected, and information input through the pen unit 200 matches the input window. In one embodiment, a text input window 317 is shown as one example of the input window.

Referring to FIG. 32A, the text input window 317 displayed on the web page 310 may be an address window 317 for inputting an address of the web page 310. The address window 317 may be automatically selected by positioning the pointer 311a on the address window 317 through a proximity motion of the pen unit 200 on the input region 102. In a text input mode for address input, a specific motion of the pen unit 200 may be set so as to be allocated to a specific key value for address input. For instance, as shown in FIG. 32B, a contact motion of the pen unit 200 for touching a paper surface may be set so as to be allocated to a 'W' key value in a text input mode.

By touching the paper surface three times with the pen unit 200 under this setting, a text corresponding to "www" may match the address window 317. Alternatively, the "www" may be input through motions of the pen unit 200, e.g., by holding the pen unit 200 on the paper surface. Referring to FIG. 32C, the user may input an address of the web page on the address window 317 by writing the rest address on the input region 102. And, the corresponding web page may be displayed by touching the address window 317 once more with the pen unit 200.

Figure 33A:
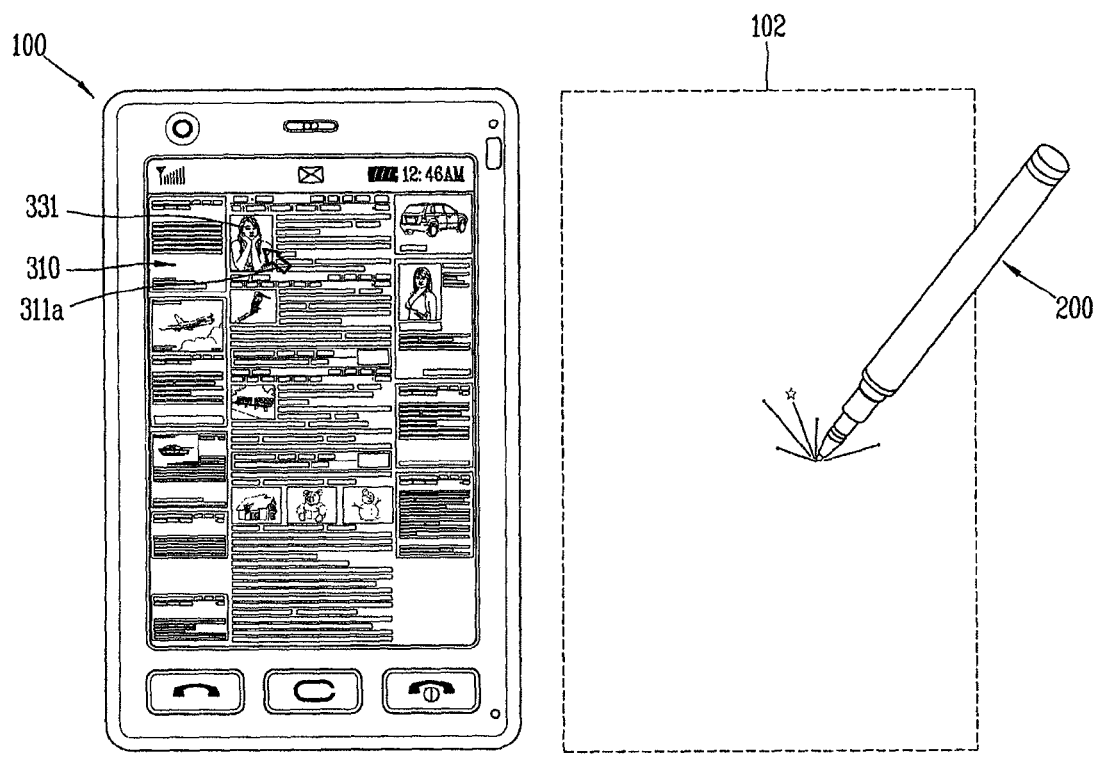
FIGS. 33A and 33B are views respectively showing a method for providing a user interface of a mobile terminal according to another embodiment of the present invention.
Figure 33B:
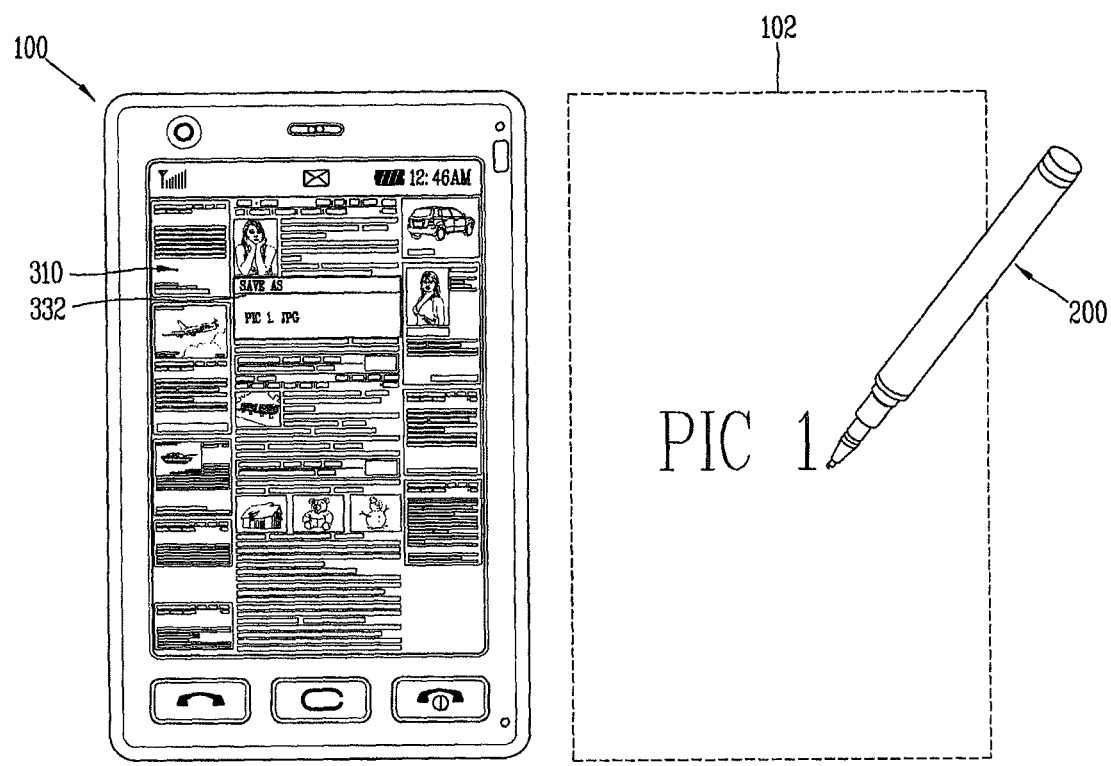

FIGS. 33A and 33B are views respectively showing a method for providing a user interface of a mobile terminal according to another embodiment of the present invention. In this embodiment, an image 331 such as a photo or a picture displayed on the web page is selected by the pen unit 200. And, a specific operation mode (e.g., image editing mode or image storage mode) is executed through a specific motion of the pen unit 200.

Referring to FIG. 33A, the pointer 311a may be positioned on the image 331 as a proximity motion of the pen unit 200 is performed on the input region 102. Referring to FIG. 33B, as the pen unit 200 makes a preset motion (or a motion for maintaining a touched state) such as a contact motion in a state that the pointer 311a is positioned on the image 331, an image storage mode may be executed. As a result, an image storage menu 332 may be displayed on the web page 310. A file name for image storage may be written on the input region 102, and the written file name may be displayed on the image storage menu 332. And, the image may be stored through a specific motion of the pen unit 200, and the image storage mode may be ended.

Figure 34:
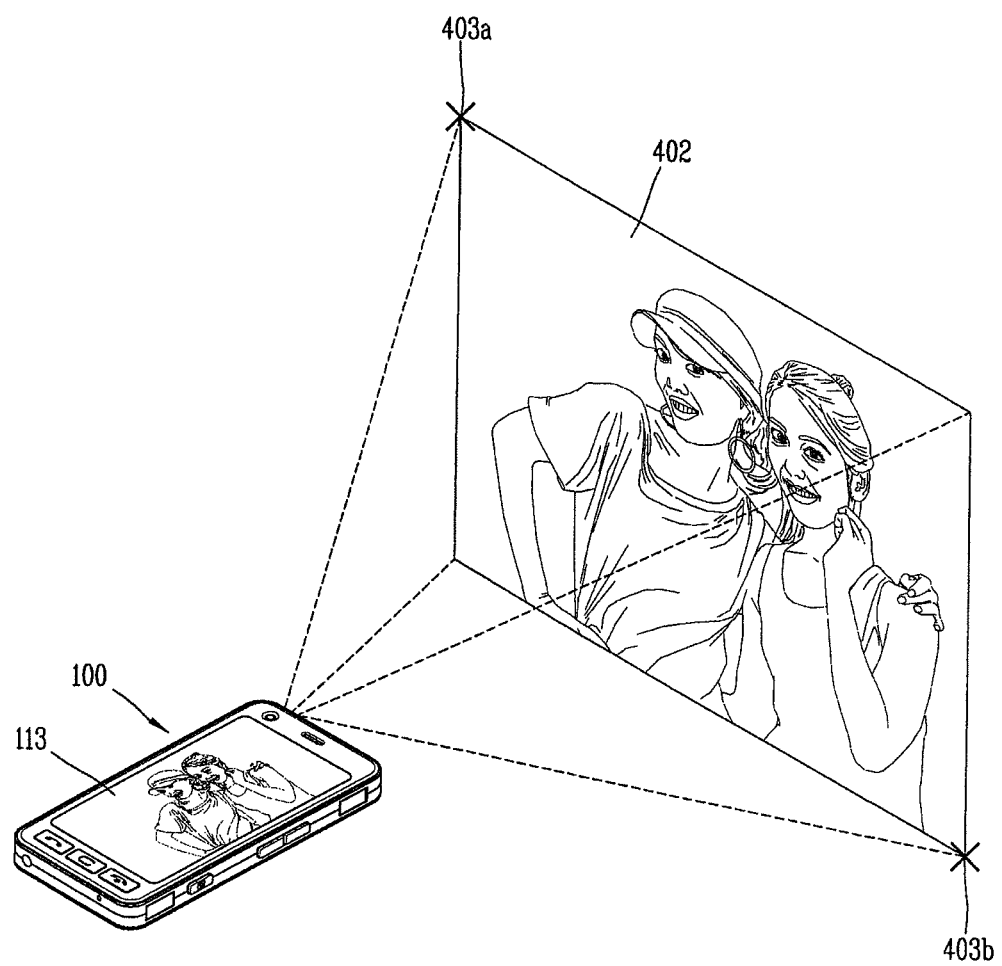
FIG. 34 is a view showing a method for providing a user interface of a mobile terminal according to another embodiment of the present invention.

FIG. 34 is a view showing a method for providing a user interface of a mobile terminal according to another embodiment of the present invention. The mobile terminal 100 is formed so as to project image information such as image information displayed on the display 113, to outside of the terminal body. For this, an image projecting apparatus such as a projector module may be mounted to the mobile terminal 100.

The projected image information is displayed on a screen 402 in the form of an image that can be recognized by the user. The screen 402 may be set as the input region 102. Accordingly, the user can control image information displayed on the display 113 and projected image information through motions of the pen unit 200 (refer to FIG. 20A) on the screen 402. This allows a user interface to be implemented, the user interface for displaying a text on image information by inputting the text on the screen 402.

Hereinafter, a method for providing a user interface according to the present invention will be explained. The mobile terminal 100 receives at least one of position information and size information of the screen 402 where projected image information is formed, and matches the input region with the position information of the screen 402. Referring to FIG. 34, the mobile terminal 100 performs the receiving and matching operations by setting two points 403a and 403b of the screen 402 with the pen unit 200. A position of the input region 102 with respect to the terminal body 100a may be calculated by touching one point 403a of the screen 402. A size of the input region 102 may be calculated by touching the other point 403b of the screen 402. If the size of the input region 102 is determined, the determined size is made to match the display 113 proportionally.

Figure 35:
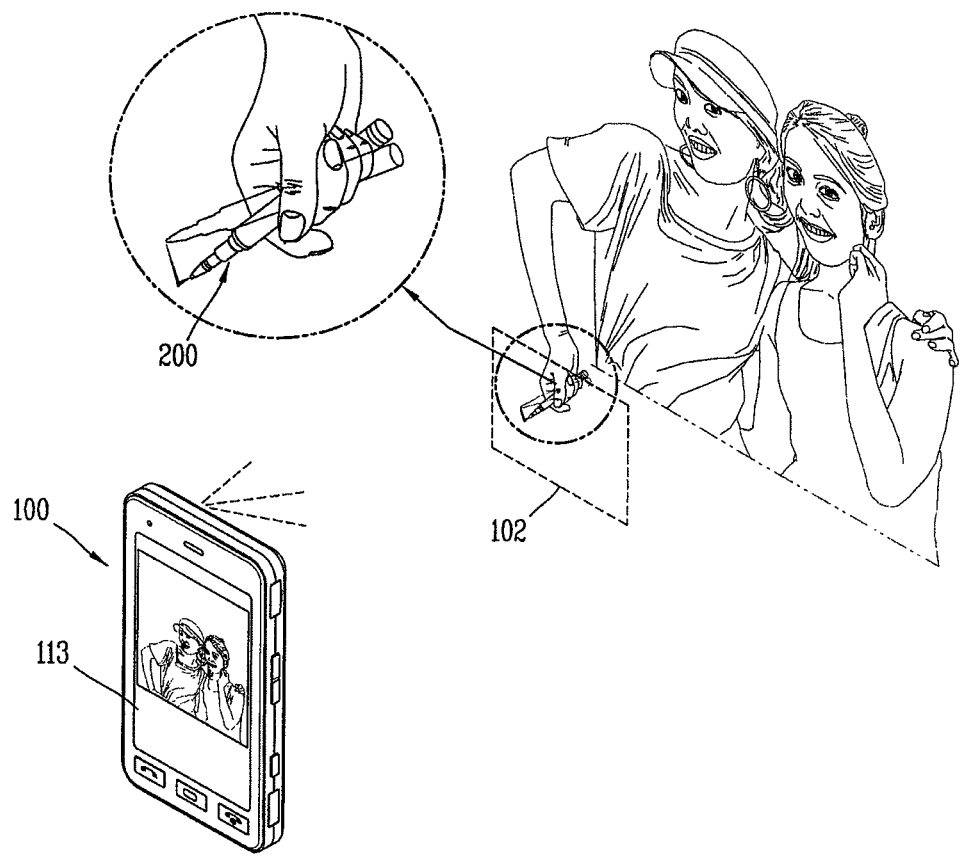
FIG. 35 is a view showing a method for providing a user interface of a mobile terminal according to another embodiment of the present invention.

FIG. 35 is a view showing a method for providing a user interface of a mobile terminal 100 according to another embodiment of the present invention. In this embodiment, when the current operation mode is a mode relating to image capturing by the camera 151, a command for capturing an image by the camera 151 is performed according to motions of the pen unit 200. The controller 117 executes the command for capturing an image by the camera 151 according to one of the motions of the pen unit 200.

As shown, the input region 102 may be formed so as to be spaced from the terminal body in a direction perpendicular to the screen surface of the display 113. Under this configuration, the user inputs the command for capturing an image by the camera 151 on the input region 102 spacing from the terminal body 100a through motions of the pen unit 200. However, the present invention is not limited to this. For example, the controller 117 may perform the command for capturing an image by the camera 151 according to one of motions of the pen unit 200.

A specific pattern corresponding to the command for capturing an image by the camera 151 may be set by the user. For instance, the mobile terminal 100 sets the specific pattern as indication of a check mark (√) using the pen unit 200. Then, when the user indicates a check mark (√) with the pen unit 200 at a position spacing from the mobile terminal, the command for capturing an image by the camera 151 is executed.

Figure 36:
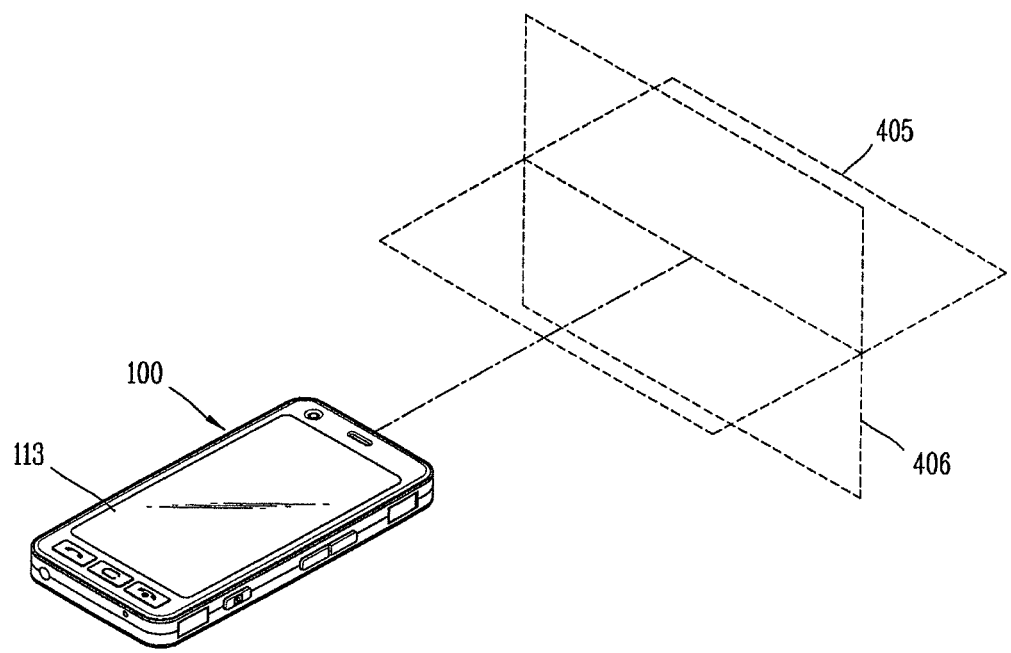
FIG. 36 is a view showing a method for providing a user interface of a mobile terminal according to another embodiment of the present invention.

FIG. 36 is a view showing a method for providing a user interface of a mobile terminal according to another embodiment of the present invention. Position information of the pen unit 200 includes information of first and second positions formed in directions perpendicular to each other. That is, ultrasonic waves generated from the pen unit 200 are sensed, and first and second position are calculated based on information relating to the sensed ultrasonic waves.

The specific pattern is set to be formed in three-dimensional space. The controller 117 controls image information displayed on the display 113 so as to correspond to motions of the pen unit 200 formed in three-dimensional space.

Referring to FIG. 36, first and second input regions 405 and 406 may be formed in parallel on two planes perpendicular to each other. The controller 117 may calculate first and second movement paths of the pen unit 200 which moves on the first and second input regions 405 and 406, respectively by sensing ultrasonic waves generated from the pen unit 200. Based on the first and second movement paths of the pen unit 200, a movement path of the pen unit 200 in three-dimensional space may be calculated. As image information is controlled through motions of the pen unit 200 formed in three-dimensional space, a new user interface may be implemented.

FIG. 37 is a block diagram of a mobile terminal according to an embodiment of the present invention. In particular, the mobile terminal 100 may include a wireless communication unit 140, an Audio/Video (NV) input unit 150, a user input unit 130, a sensing unit 120, an output unit 160, a memory 118, an interface unit 171, a controller 117, a power supply 173, etc. The components shown in FIG. 37 are not necessarily implemented. Accordingly, the mobile terminal 100 may have a larger or smaller number of components than the components shown in FIG. 37.

Hereinafter, the components will be explained in more detail.

The wireless communication unit 140 may include one or more modules configured to permit wireless communication between the mobile terminal 100 and a wireless communication system or network within which the mobile terminal 100 is located. For instance, the wireless communication unit 140 may include a broadcast receiving module 141, a mobile communication module 142, a wireless Internet module 143, a short-range communication module 144, a position information module 145, etc.

The broadcast receiving module 141 receives a broadcast signal and/or broadcast associated information from an external broadcast managing entity via a broadcast channel. The broadcast channel may include a satellite channel and a terrestrial channel. In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal. The broadcast receiving module 141 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 141 may be stored in a suitable device, such as a memory 118.

The wireless communication unit 140 also includes a mobile communication module 142 that transmits/receives wireless signals to/from one or more network entities (e.g., base station, Node-B). Such signals may represent audio, video, multimedia, control signaling, and data, among others.

Also included is a wireless Internet module 143 that supports Internet access for the mobile terminal. The module 143 may be internally or externally coupled to the terminal. The wireless communication unit 140 also includes a short-range communication module 144 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 145 is also included in the wireless communication unit 140 and identifies or otherwise obtains the location of the mobile terminal 100. The position-location module 145 may be implemented using global positioning system (GPS) components which cooperate with associated satellites, network components, and combinations thereof.

The Audio/video (NV) input unit 150 provides audio or video signals to the mobile terminal 100. The NV input unit 150 includes a camera 151 and a microphone 152. The camera 151 receives and processes image frames of still pictures or video.

Further, the microphone 152 receives an external audio signal while the portable device is in a particular mode, such as a phone call mode, recording mode and voice recognition mode. The received audio signal is then processed and converted into digital data. Also, the portable device, and in particular, the A/V input unit 150, includes assorted noise removing algorithms to remove noise generated in the course of receiving the external audio signal. In addition, data created by the A/V input unit 150 may be stored in the memory 118, utilized by the output unit 160, or transmitted via one or more modules of the communication unit 140. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch.

The sensing unit 120 provides status measurements of various aspects of the mobile terminal 100. For instance, the sensing unit 120 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc. As an example, when the mobile terminal 100 is a slide-type mobile terminal, the sensing unit 120 may sense whether a sliding portion of the mobile terminal 100 is open or closed. Other examples include the sensing unit 120 sensing the presence or absence of power provided by the power supply 173, the presence or absence of a coupling or other connection between the interface unit 171 and an external device, etc. The sensing unit 120 may include a proximity sensor 123.

The sensing unit 120 may include detecting sensors 121 and 122. The detecting sensors 121 and 122 may be configured as sensors for sensing wave motions. The output unit 160 is configured to generate visible, audible or tactile outputs. The output unit 160 may include a display 113, a sound output module 162, an alarm unit 163, a haptic module 164, etc.

The display 113 displays (outputs) information processed by the mobile terminal 100. For instance, when the mobile terminal is in a call mode, a user interface (UI) or a graphic user interface (GUI) relating to calling is displayed. When the mobile terminal 100 is in a video call mode or an image capturing mode, captured and/or received images or UI and GUI are displayed. The display 113 may be implemented using display technologies including, for example, a liquid crystal display (LCD), a thin film transistor-liquid crystal display (TFT-LCD), an organic light-emitting diode display (OLED), a flexible display and a three-dimensional display.

Some of such displays 113 may be implemented as a transparent type or an optical transparent type through which the exterior is visible, which is referred to as 'transparent display'. A representative example of the transparent display may include a Transparent OLED (TOLED), and the like. The rear surface of the display 113 may also be implemented to be optically transparent. Under this configuration, a user can view an object positioned at a rear side of a terminal body through a region occupied by the display 113 of the terminal body.

The display 113 may be implemented in two or more in number according to a configured aspect of the mobile terminal 100. For instance, a plurality of the displays 113 may be arranged on one surface to be spaced apart from or integrated with each other, or may be arranged on different surfaces of the mobile terminal 100. Here, if the display 113 and a touch sensitive sensor (referred to as a touch sensor) have a layered structure therebetween, the structure may be referred to as a first touch screen. The display 113 may be used as an input device rather than an output device. The touch sensor may be implemented as a touch film, a touch sheet, a touch pad, and the like.

The touch sensor may be configured to convert changes of a pressure applied to a specific part of the display 113, or a capacitance occurring from a specific part of the display 113, into electric input signals. Also, the touch sensor may be configured to sense not only a touched position and a touched area, but also a touch pressure. When touch inputs are sensed by the touch sensors, corresponding signals are transmitted to a touch controller (not shown). The touch controller processes the received signals, and then transmits corresponding data to the controller 117. Accordingly, the controller 180 may sense which region of the display 113 has been touched.

A proximity sensor 123 may be arranged at an inner region of the portable terminal 100 covered by the first touch screen, or near the first touch screen. The proximity sensor 123 indicates a sensor to sense presence or absence of an object approaching to a surface to be sensed, or an object disposed near a surface to be sensed, by using an electromagnetic field or infrared rays without a mechanical contact. The proximity sensor 123 has a longer lifespan and a more enhanced utility than a contact sensor.

The proximity sensor 123 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the first touch screen without contact will be referred to as 'proximity touch', whereas a status that the pointer substantially comes in contact with the first touch screen will be referred to as 'contact touch'. For the position corresponding to the proximity touch of the pointer on the first touch screen, such position corresponds to a position where the pointer faces perpendicular to the first touch screen upon the proximity touch of the pointer.

The proximity sensor 123 senses proximity touch, and proximity touch patterns (e.g., distance, direction, speed, time, position, moving status, etc.). Information relating to the sensed proximity touch and the sensed proximity touch patterns may be output onto the first touch screen.

If the display 113 and a sensor for detecting wave motions have a combined structure, the structure may be referred to as a second touch screen. The display 113 may be used as an input device rather than an output device. When touch input is generated on the display 113, corresponding wave motion signals are sent to a wave motion sensing controller. The wave motion sensing controller processes the signals as position information, and sends corresponding data to the controller 117. This may allow the controller 117 to identify which region of the display 113 has been touched.

The audio output module 162 may output audio data received from the wireless communication unit 110 or stored in the memory 118, in a call-receiving mode, a call-placing mode, a recording mode, a voice recognition mode, a broadcast reception mode, and so on. The audio output module 162 may output audio signals relating to functions performed in the mobile terminal 100, e.g., sound alarming a call received or a message received, and so on. The audio output module 162 may include a receiver, a speaker, a buzzer, and so on.

The alarm 163 outputs signals notifying occurrence of events from the mobile terminal 100. The events occurring from the mobile terminal 100 may include call received, message received, key signal input, touch input, and so on. The alarm 163 may output not only video or audio signals, but also other types of signals such as signals notifying occurrence of events in a vibration manner. Since the video or audio signals can be output through the display 113 or the audio output module 162, the display 113 and the audio output module 162 may be categorized into a part of the alarm 163.

The haptic module 164 generates various tactile effects which a user can feel. A representative example of the tactile effects generated by the haptic module 164 includes vibration. Vibration generated by the haptic module 164 may have a controllable intensity, a controllable pattern, and so on. For instance, different vibration may be output in a synthesized manner or in a sequential manner.

The haptic module 164 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 164 may be configured to transmit tactile effects (signals) through a user's direct contact, or a user's muscular sense using a finger or a hand. The haptic module 164 may be implemented in two or more in number according to the configuration of the mobile terminal 100.

An input region forming unit 115 is configured to form an input region including at least one of the terminal body and a region rather than the terminal body. The input region forming unit 115 may be separately formed from the controller 117, and may be integrally formed with the controller 117.

The memory 118 may store a program for the processing and control of the controller 117. Alternatively, the memory 118 may temporarily store input/output data (e.g., phonebook data, messages, still images, video and the like). Also, the memory 118 may store data related to various patterns of vibrations and audio output upon the touch input on the first and second touch screens. The memory 118 may also store data corresponding to position information of wave motions.

The memory 118 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 118 on the Internet.

The interface unit 171 may generally be implemented to interface the portable terminal with external devices. The interface unit 171 may allow a data reception from an external device, a power delivery to each component in the mobile terminal 100, or a data transmission from the mobile terminal 100 to an external device. The interface unit 171 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 171 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 117 typically controls the overall operations of the mobile terminal 100. For example, the controller 117 performs the control and processing associated with telephony calls, data communications, video calls, and the like. The controller 117 may include a multimedia module 172 which provides multimedia playback. The multimedia module 172 may be configured as part of the controller 117 or as a separate component.

The controller 117 can perform a pattern recognition processing so as to recognize writing or drawing input on the first and second touch screens as text or image. The power supply 173 provides power required by various components under the control of the controller 117. The provided power may be internal power, external power, or combination thereof.

Various embodiments described herein may be implemented in a computer-readable medium using, for example, software, hardware, or some combination thereof. For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 117.

For a software implementation, the embodiments such as procedures and functions may be implemented together with separate software modules each of which performs at least one of functions and operations. The software codes can be implemented with a software application written in any suitable programming language. Also, the software codes may be stored in the memory 118 and executed by the controller 117. The mobile terminal 100 includes the pen unit 200, and the pen unit 200 is formed to generate wave motions. Wave motions generated from the pen unit 200 may be sensed by the optical sensor 121 and the ultrasonic sensor 122.

As aforementioned, in the present invention, there is provided an input method using the pen unit on the input region. This may extend the input region for controlling the mobile terminal 100. Furthermore, in the present invention, various input methods are implemented by using the pen unit 200. This allows a user interface to be implemented in a more convenient input manner.

Also, embodiments of the present invention provide an input method by detecting motions of the pen unit with ultrasonic waves. This enhances the accuracy of touch input, and a reaction speed with respect to the touch input.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a controller configured to execute an operation mode relating to one or more functions of the mobile terminal;
    a sensor configured to detect a motion of a pen unit by sensing ultrasonic waves generated by the pen unit;
    a display configured to display information; and
    a wireless communication unit configured to wirelessly communicate with at least one other mobile terminal,
    wherein the controller is further configured to compare the motion of the pen unit with a preset specific pattern, and to execute an operation corresponding to the specific pattern based on a result of the comparison,
    wherein the motions are motions on a region not connected to the mobile terminal, wherein the current operation mode is a first operation mode and the operation corresponding to the specific pattern is a second operation mode different than the first operation mode, wherein one of the first and second operation modes is a mobile terminal locking mode where some of input keys are in a deactivated state, wherein another of the first and second operation modes is one of a call transmission/reception mode, a message transmission/reception mode, a text or image input mode, a camera mode, a music or moving image reproduction mode, an image information editing mode, a web browsing mode, a standby screen display mode where a standby screen is displayed on a display of the mobile terminal, and a menu display mode where one or more selectable menus are displayed on the display, and wherein the sensor starts to detect the motion of the pen unit when one of the input keys is manipulated in the mobile terminal locking mode.

2. The mobile terminal of claim 1, wherein when the operation mode is a text input mode, the controller is further configured to display on the display text corresponding to the specific pattern, wherein when the operation mode is an image input mode, the controller is further configured to display on the display an image corresponding to the specific pattern, wherein when the operation mode is an image editing mode, the controller is further configured to display on the display an image corresponding to the specific pattern on a pre-stored image, wherein when the operation mode is a moving image reproduction mode or a music reproduction mode, the controller is further configured to perform a corresponding moving image reproduction operation or a music reproduction operation, wherein the operation mode is an information search mode the controller is further configured to one of designate a search object according to a user's input and perform a search, wherein when the operation mode is a camera image capturing mode, the controller is further configured to capture an image by a camera of the mobile terminal, and wherein when the operation mode is one of a web browsing mode and a web page display mode, the controller is further configured to perform one of web browsing and display a web page on the display.

3. The mobile terminal of claim 1, wherein one of the first and second operation modes is one of a) a mobile terminal idle mode where the display is in a deactivated state, b) a standby screen display mode where a standby screen is displayed on the display, or a menu display mode where one or more selectable menus are displayed on the display, and c) one of a camera mode, a music mode, a moving image mode, and a web browsing mode, and wherein another of the first and second operation modes is one of a) a mobile terminal active mode where the display is in an activated state, b) a call transmission/reception mode, a message transmission/reception mode, a text or image input mode, a camera mode, a music or moving image reproduction mode, an image information editing mode, or a web browsing mode, and c) a call transmission/reception mode or a message transmission/reception mode, respectively.

4. A method of controlling a mobile terminal, the method comprising:

executing, by a controller, a first operation mode relating to one or more functions of the mobile terminal;

detecting, by a sensor, a motion of a pen unit by sensing ultrasonic waves generated by the pen unit;

comparing, by the controller, the motion of the pen unit with a preset specific pattern; and executing, by the controller, a second operation mode corresponding to the specific pattern based on a result of the comparison, wherein one of the first and second operation modes is a mobile terminal locking mode where some of input keys are in a deactivated state, wherein another of the first and second operation modes is one of a call transmission/reception mode, a message transmission/reception mode, a text or image input mode, a camera mode, a music or moving image reproduction mode, an image information editing mode, a web browsing mode, a standby screen display mode where a standby screen is displayed on a display of the mobile terminal, and a menu display mode where one or more selectable menus are displayed on the display, and wherein the sensor starts to detect the motion of the pen unit when one of the input keys is manipulated in the mobile terminal locking mode.

5. The method of claim 4, wherein one of the first and second operation modes is a mobile terminal idle mode where the display is in a deactivated state, and wherein another of the first and second operation modes is a mobile terminal active mode where the display is in an activated state.

6. The method of claim 4, wherein one of the first and second operation modes is a standby screen display mode where a standby screen is displayed on a display of the mobile terminal, or a menu display mode where one or more selectable menus are displayed on the display, and wherein another of the first and second operation modes is one of a call transmission/reception mode, a message transmission/reception mode, a text or image input mode, a camera mode, a music or moving image reproduction mode, an image information editing mode, and a web browsing mode.

* * * * *